United States Patent
Murabe et al.

(10) Patent No.: US 7,360,950 B2
(45) Date of Patent: Apr. 22, 2008

(54) HYDRODYNAMIC BEARING ASSEMBLY

(75) Inventors: Kaoru Murabe, Itami (JP); Makoto Otsuki, Itami (JP); Osamu Komura, Itami (JP); Hisao Takeuchi, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/293,103

(22) Filed: Dec. 5, 2005

(65) Prior Publication Data

US 2006/0072864 A1    Apr. 6, 2006

Related U.S. Application Data

(62) Division of application No. 10/852,267, filed on May 25, 2004, now Pat. No. 7,033,078, which is a division of application No. 09/830,997, filed as application No. PCT/JP00/05949 on Sep. 1, 2000, now Pat. No. 6,749,339.

(30) Foreign Application Priority Data

| Sep. 3, 1999 | (JP) | ................... 11-250094 |
| Sep. 17, 1999 | (JP) | ................... 11-263598 |
| Sep. 17, 1999 | (JP) | ................... 11-263608 |
| Oct. 18, 1999 | (JP) | ................... 11-295449 |
| Oct. 22, 1999 | (JP) | ................... 11-300881 |
| Oct. 27, 1999 | (JP) | ................... 11-305372 |
| Mar. 3, 2000 | (JP) | ................... 2000-58719 |

(51) Int. Cl.
*F16C 32/06* (2006.01)

(52) U.S. Cl. ....................................... 384/114

(58) Field of Classification Search ............... 384/100, 384/114, 115, 450
See application file for complete search history.

(56) References Cited

U.S. PATENT DOCUMENTS

| 5,181,783 A | 1/1993 | Sherman et al. |
| 5,224,782 A | 7/1993 | Miwa et al. |
| 5,271,677 A | 12/1993 | Sherman et al. |
| 5,628,567 A | 5/1997 | Murabe et al. |
| 5,688,053 A | 11/1997 | Itoh et al. |
| 5,731,831 A | 3/1998 | Murabe et al. |
| 5,835,124 A | 11/1998 | Fukita et al. |
| 6,338,574 B1 | 1/2002 | Shimizu et al. |
| 6,402,385 B1 | 6/2002 | Hayakawa et al. |

FOREIGN PATENT DOCUMENTS

| JP | 55-36456 | 8/1953 |
| JP | 57-92418 | 6/1982 |

(Continued)

*Primary Examiner*—Xuan Lan Nguyen
(74) *Attorney, Agent, or Firm*—McDermott Will & Emery LLP

(57) ABSTRACT

This invention provides a hydrodynamic bearing assembly which realizes a high rotation rate in a stable manner with robust rigidity. The hydrodynamic bearing assembly has a total radial gap of 3 microns or less for preventing contact with the thrust bearing. The thrust bearing is a pump-out type, and the radial bearing has offset grooves on the surface thereof to supply fluid flow to the thrust bearing. A depth ratio of the grooves relative to the diameter of the shaft is preferably 0.005 or less to avoid reduced translational rigidity.

9 Claims, 37 Drawing Sheets

FOREIGN PATENT DOCUMENTS

| | | |
|---|---|---|
| JP | 2-89807 | 3/1990 |
| JP | 2-93115 | 4/1990 |
| JP | 2-150504 | 6/1990 |
| JP | 3-85715 | 8/1991 |
| JP | 5-240241 | 9/1993 |
| JP | 5-332354 | 12/1993 |
| JP | 7-27130 | 1/1995 |
| JP | 7-279963 | 10/1995 |
| JP | 8-21435 | 1/1996 |
| JP | 8-121471 | 5/1996 |
| JP | 8-338960 | 12/1996 |
| JP | 9-229053 | 9/1997 |
| JP | 11-18357 | 1/1999 |
| JP | 11-55918 | 2/1999 |
| JP | 2000-50568 | 2/2000 |
| JP | 2000-170749 | 6/2000 |

(a)

(b)

(c)

(d)

(a)  (b)  (c)

F = f1 + f2, D = d1 + d2

F = f₁ + f₂    D = d₁ + d₂

(a)

(b)

(a)            (b)

(a)

(b)

(c)

HYDRODYNAMIC BEARING ASSEMBLY

RELATED APPLICATIONS

This application is a divisional of U.S. patent application Ser. No. 10/852,267, filed May 25, 2004, now U.S. Pat. No. 7,033,078, which is a divisional of U.S. patent application Ser. No. 09/830,997, filed Aug. 7, 2001, now U.S. Pat. No. 6,749,339, which is a 371 of PCT/JP00/05949, filed Sep. 1, 2000, based on Japanese Patent Applications 11-250094, filed Sep. 3, 1999, 11-263598, filed Sep. 17, 1999, 11-263608, filed Sep. 17, 1999, 11-295449, filed Oct. 18, 1999, 11-300881, filed Oct. 22, 1999, 11-305372, filed Oct. 27, 1999 and 2000-58719, filed Mar. 3, 2000, the contents of all of which are hereby incorporated by reference.

TECHNICAL FIELD

This invention relates to a hydrodynamic bearing assembly, and in particular, relates to the hydrodynamic bearing assembly incorporated with a spindle motor used for driving a memory device such as a hard disk drive (referred to as a "HDD", hereinafter), or bar code reader. This invention also relates to the spindle motor including the hydrodynamic bearing assembly, as well as the memory device and the bar code reader including the spindle motor.

BACKGROUND ART

The conventional spindle motors used for driving the memory device such as the HDD or a bar code reader, includes a hydrodynamic bearing assembly implementing high rotation in a stable manner for a long effective lifetime. Among various features of the hydrodynamic bearing assembly, since rotational member and stationary member of the hydrodynamic bearing assembly operate without contact to each other, the rotation thereof causes mechanical friction therebetween less than that of another contacting type of the bearing assemblies such as a ball bearing. In comparison with the hydrodynamic bearing assembly using oil for generating dynamic pressure, in particular, the hydrodynamic bearing assembly using gas as fluid has further advantages to reduce the coom caused by shattering lubricant such as oil and grease in addition to the reduced friction.

FIG. 42 shows an exemplary spindle motor with a conventional hydrodynamic bearing assembly. In the drawing, the hydrodynamic bearing assembly comprises, on a base plate 200, a column shaft 201, a sleeve 202 rotatably arranged around the shaft 201 leaving a predetermined gap along the axis direction of the shaft 201 for relative rotation therebetween. The hydrodynamic bearing assembly also comprises a thrust plate 202, which is arranged perpendicular to the shaft 201 and opposes to the bottom surface of the sleeve 202. A radial bearing is formed between an outer surface of the shaft 201 and the inner surface of the sleeve 202. Also, a thrust bearing is formed between the bottom surface of the sleeve 202 and the thrust plate 203. The thrust plate 203 includes grooves 205 for generating thrust dynamic pressure, formed on the surface opposing to the bottom surface of the sleeve 202, as illustrated by a dashed line.

In this specification, the bottom surface opposing to the thrust plate 203 and defining the thrust bearing in cooperation therewith is referred to as a thrust opposing surface. In FIG. 42, one of the end surfaces in the axis direction is the thrust opposing surface 204. A rotor 207 attached with the sleeve 202 can be rotated about the shaft 201 with the sleeve 202. The rotor 207 has a rotor magnet 208 arranged on the inner surface of a skirt 207a of the rotor 207. The rotor magnet 208 opposes to the electromagnet 209 arranged on the base plate 200. In case of the HDD, a plurality of memory media are mounted on the outer surface, also in case of the bar code reader, a polygonal mirror is mounted on the rotor 207, both of which rotate with the rotor 207.

According to the spindle motor constructed as described above, an alternating current supplied to the electromagnet 209 causes the attraction and/or repulsion forces between the electromagnet 209 and the rotor magnet 208. This provides the rotor 207 supporting the rotor magnet 208 with a rotation drive force so that the rotor 207 and the sleeve 202 attached therewith together rotate around the axis of the shaft 201. The rotation causes the relative movement between the shaft 201 and sleeve 202, generating the radial dynamic pressure due to the fluid in the radial bearing. In general, although air is often used for the fluid intervening between the shaft 201 and sleeve 202 when the spindle motor is used in the atmosphere, particular gas or oil may be used as the fluid. In this specification, the intervening object for generating the dynamic pressure is referred to as the "fluid". The aforementioned rotation also causes the relative movement between the thrust opposing surface 204 of the sleeve 202 and the thrust plate 203, thereby generating another dynamic pressure in a thrust direction due to the grooves 205. To this end, this thrust dynamic pressure allows the rotational member such as sleeve 202 and rotor 207 to rotate about the shaft 201 keeping the rotational member away from the stationary member such as shaft 201 and the base 200.

FIG. 43 shows the thrust grooves 205 formed on the surface of the thrust plate 203 for generating the thrust dynamic pressure in the thrust bearing. As shown, the grooves 205 include a plurality of a spiral groove, each of which is angled at a predetermined angle with the circle on the thrust plate 203, and has a depth in a range of 1 micron through 10 microns. The thrust opposing surface 204 of the sleeve 202 rotates in a direction indicated by the arrow 206 against the grooves 205 so that the fluid such as air is convolved in the grooves 205. The fluid is pressed along the spiral grooves 205 towards the axis due to the viscosity of the fluid during the above-mentioned rotation, hereby to generate the pressure (dynamic pressure). This dynamic pressure operates the thrust opposing surface 204 to push up the rotational member such as sleeve 202. Such bearing assembly, which conducts the fluid from the circumference towards the axis of the thrust bearing assembly to generate the dynamic pressure, is referred to as a "pump-in" bearing assembly. The pump-in bearing assembly is commonly used for the hydrodynamic bearing assembly.

A need has been existed in the market to a compact and lightweight hydrodynamic bearing assembly implementing the rotation at high rate and heavy load in a stable manner. There are some problems to be solved for the hydrodynamic bearing assembly to satisfy such market's needs. Firstly, the rotation should be stable in particular at the high rotation rate. Secondary, the bearing assembly should have a certain rigidity sufficient to bear against the oscillation forces provided from external circumstances. Thirdly, the bearing assembly has to be improved in the activation feature to activate rotation of the rotational member in contact with the stationary member. Fourthly, the bearing assembly should be more compact and lightweight. Details for those problems to be solved will be described hereinafter.

(First Problem)

In order to address the first problem, i.e., to realize the high rotation rate in a stable manner, it is necessary to eliminate a phenomenon, so-called half-whirl. The half-whirl is the phenomenon appeared due to the rotation of sleeve 202 relative to the shaft 201 with a predetermined gap for keeping thereof away to each other. The fluid intervening between the outer surface of the shaft 201 and the inner surface of the sleeve 202 for generating the dynamic pressure causes a continuous pressure distribution therebetween due to the relative rotation. When the external disturbance causes either one of the shaft 201 or sleeve 202 to deflect from the rotation axis, the force due to the dynamic pressure is offset to the rotation axis so that the horizontal component of the force revolves the rotational member around the rotation axis without returning the rotational member to its original position. The convergence of the revolution returns the rotational member to the original position so that the rotational member rotates in a stable manner. On the contrary, if the revolution is kept, the rotational member whirls around the central axis of the stationary member resulting in the unstable rotation. This phenomenon is referred to as the half-whirl. The present inventors have discovered that the revolution is likely to be kept with the bearing assembly having the continuous pressure distribution in comparison with one having a discontinuous pressure distribution.

FIG. 44 schematically illustrates the half-whirl phenomenon, showing a cross section along the rotation axis of the stationary shaft 201 and the rotating sleeve 202 of the hydrodynamic bearing assembly. In the normal operation, the sleeve 202 rotates around a rotation center concentric with the stationary axis I of the shaft 201 as indicated by the cross (+) in the direction of the arrow 215. When the external disturbance causes the sleeve 202 to deflect relatively to the shaft 201, the rotation center of the sleeve 202 of the rotational member is shifted from the stationary axis I to the position C as indicated by the alphabet (X). The force generated by the dynamic pressure having the deflecting direction as well as the continuous pressure distribution rotates the sleeve 202 on its own axis, and also revolves the rotation axis C of the sleeve 202 around the stationary axis I along the arrow 216 in a whirling manner. For example, the dashed line illustrates the sleeve 202a after the rotation axis C of the sleeve 202 indicated by the solid line revolves 180 degrees around the stationary axis I. In this instance, the rotation axis C of the sleeve 202 is shifted along the arrow 216 to the rotation axis C'. The half-whirl whirls the rotational member (such as sleeve 202 in FIG. 44) relatively to the stationary member (such as shaft 201 in FIG. 44) so that the bearing assembly loses the stability in rotation, thereby to cause undesired oscillation and/or malfunction of the bearing assembly used for the HDD or bar code reader.

(Second Problem)

The second problem to be solved, i.e., the rigidity/stiffness of the hydrodynamic bearing assembly will be discussed with reference of FIG. 45. This drawing is the enlarged view of the hydrodynamic bearing assembly of FIG. 42, in which similar reference numerals denote the similar components. In the drawing, the parallel lines schematically illustrate the dynamic pressure distribution generated during the rotation of the hydrodynamic bearing assembly. The dynamic pressure distribution M is generated in the radial bearing defined between the shaft 201 and the sleeve 202m, thereby to keep them away from each other. On the other hand, the dynamic pressure distribution N is also generated in the thrusts bearing defined between the thrust plate 203 and thrust opposing surface 204 so that no contact is kept therebetween, allowing the sleeve 202 of the rotational member to rotate without any contact.

The hydrodynamic bearing assembly of FIG. 45 receives external forces including a force indicated by the arrow 217 perpendicular to the bearing axis (translation force), a force indicated by the arrow 218 along the bearing axis (elevation force), a force indicated by the arrow 219 around an axis perpendicular to the bearing axis (oscillation force), and the combination thereof. The hydrodynamic bearing assembly is required to have a rigidity against such forces enough to keep the rotational member away from the stationary member and to ensure the stable rotation.

FIG. 46 provides an example where the sleeve 202 is inclined counterclockwise relative to the shaft 201 and the thrust plate 203 because of the disturbance (external forces) to the hydrodynamic bearing assembly during the stable rotation as shown in FIG. 45. In this instance, the shaft 201 moves closer to the sleeve at the right-upper portion indicated by T and at the left-lower portion indicated by U, also the thrust plate 203 moves closer to the thrust opposing surface 204 at the leftmost portion indicated by V. In general, the wedge effect due to the convolution of the fluid between relatively moving bearing members is increased as the gap therebetwen is decreased. Thus, the dynamic pressure distribution is shifted from as illustrated in FIG. 45 to that as shown in FIG. 46. The dynamic pressure is increased between the rotational member and the stationary member at the portions T and U so that the repulsion force is generated to prevent both members from moving closer to each other. The contact between the shaft 201 and the sleeve 202 is avoided unless the disturbance force overcomes the repulsion force.

Meanwhile, the fluid is guided from the circumference of thrust plate 203 towards the axis (the pump-in bearing assembly) so that the dynamic pressure between the thrust plate 203 and the thrust opposing surface 204 is increased towards the bearing axis, as shown by the portion N in FIG. 45. Thus, the peak of the dynamic pressure can disadvantageously be expected at the radially outer portion V shown in FIG. 46, even if the rotational member moves closer to the stationary member. Therefore, when the disturbance force causes oscillation force, the thrust plate 203 is likely to physically contact with the thrust opposing surface 204. Once the thrust plate 203 contacts with the thrust plate 203, the friction force therebetween results the unstable rotation of the rotation members. Further, the rebound followed by the contact causes the undesired impact, which could bring the malfunction of the magnetic head used for the HDD, or result an extensive damage to the spindle motor. Therefore, it is particularly important that the hydrodynamic bearing assembly has sufficient rigidity against the oscillation force, which is referred to as "tilt rigidity". Also, the rigidity against the translation force and the rigidity against the elevation force, which are referred to as the "translation rigidity" and the "elevation rigidity", respectively. Both of the translation rigidity and elevation rigidity can be improved by increasing the radial and thrust dynamic pressure.

FIG. 47 illustrates an exemplary hydrodynamic bearing assembly including the shaft 201 and the thrust plate 203 that is not perpendicularly attached thereto. The shaft 201 is inclined relative to the thrust plate 203, and the sleeve 202 is provided around the shaft 201. During the rotation of the spindle motor, in general, the radial bearing and the thrust bearing of the hydrodynamic bearing assembly have gaps of approximately 3 to 5 microns and approximately 2 to 10 microns, respectively, between the rotational member and the stationary member for the rotation without contact. In order to stabilize the rotation of the bearing assembly, the above-mentioned gaps are kept constant in a precise manner. In the radial bearing, since the inner surface of the sleeve 202 opposes to the outer surface of the shaft 201, the gap therebetween can readily be kept constant. On the other hand, the gap between the thrust opposing surface 204 of the sleeve 202 and the thrust plate 203 in the thrust bearing is more difficult to be kept constant than that in the radial bearing, because the gap in the thrust bearing is more susceptible to the arrangement of the sleeve 202 relative to the shaft 201. Thus, the precise control of the gap in the thrust bearing depends upon directly how the shaft 201 is arranged perpendicularly on the thrust plate 203 in a precise manner. Therefore, as illustrated in FIG. 47, in case where the shaft 201 is inclined to the thrust plate 203, the sleeve 202 rotate about the bearing axis inclined to the thrust plate 203, even if the normal dynamic pressure is generated in the radial bearing. This inclined rotation against the thrust plate 203 may raise a possibility that the sleeve 202 contacts with the thrust plate 203 in the portion V of FIG. 47 due to a slight oscillation force during the rotation.

(Third Problem)

The third problem to be solved is an improvement of the actuation feature of the hydrodynamic bearing assembly. When the hydrodynamic bearing assembly start to rotate, since no rotation generates no dynamic pressure, the sleeve 202 is in contact with the thrust plate 203, and in some cases, the shaft 201 also is in contact with the sleeve 202. Then, when the spindle motor is being actuated, the rotation at a relatively low rate keeps those members in contact with each other. The rotation rate exceeding to a predetermined rate generates the dynamic pressure enough to ensure the rotation without any contacts. This predetermined rotation rate is referred to as a "floating rotation rate", hereinafter. Since the sleeve 202 rotates in contact with the thrust plate 203 before the floating rotation, there are problems of friction and overheat between the rotating and stationary member. Further, a greater driving torque is required to rotate the sleeve 202 in contact with the thrust plate 203. Thus, the higher floating rotation rate requires more time and energy consumption to achieve the rotation without any contacts. Therefore, the hydrodynamic bearing assembly has been demanded such that the floating rotation rate is minimized to rotate the rotational member keeping away from the stationary member within the shortest time in order to realize good endurance and less energy consumption for activation of the bearing assembly.

(Fourth Problem)

The fourth problem to be solved by the present invention is to realize the hydrodynamic bearing assembly to be more compact and lightweight. This need comes from the fact that devices such as memory device incorporating the hydrodynamic bearing assembly are demanded to be more compact and lightweight. Also, the more compact and lightweight bearing assembly advantageously causes the rotation with contact between the rotating and stationary member to wear less at the activation of the bearing assembly.

With respect to each of the problems to be solved as mentioned above, the prior art approaches to address the problems and the deficiencies thereof will independently be described hereinafter.

1. Half-Whirl

To address the problem of the half-whirl, the prior arts has proposed a plurality of notches provided parallel to the bearing axis on either one of the outer surface of the shaft 201 and the inner surface of the sleeve 202, which are opposing and rotates relative to the shaft 202. FIG. 48 is a vertical cross section, and FIG. 49 is a transverse cross section of the bearing assembly. As shown, the sleeve 202 is arranged around the shaft 201 for rotation of the sleeve 202 about the shaft 201. The shaft 201 is secured perpendicular onto the thrust plate 203, which opposes to the bottom surface of the sleeve 202. The hydrodynamic bearing assembly comprises the shaft 201, the sleeve 202, and the thrust plate 203.

As shown in FIG. 48, three longitudinal grooves 221 are formed on the outer surface along the bearing axis. By providing grooves 221, the continuous pressure distribution generated between the rotating and stationary member of the bearing assembly is interrupted to avoid the half-whirl phenomenon.

In general, taking account of the dynamic balance during high rotation, the grooves 221 are provided on the surface of the stationary member, which may be either one of outer surface of the shaft 201 and the inner surface of the sleeve 202. However, similar advantages can be enjoyed by providing the grooves on the surface of the rotational member. The radial dynamic pressure is reduced locally, and if the grooves are formed on the stationary member, then the translation rigidity is reduced along the direction of the arranged grooves. This approach may avoid the half-whirl but remains the disadvantage increasing the tendency to cause the rotational member in contact with the stationary member along the direction of the arranged grooves.

Another prior art has suggested providing either one of the outer surface of the shaft 201 and the inner surface of the sleeve 202 with a cross section of a configuration such as the triangle (the round-apex triangle) shape instead of the circle. This changes the gap between the shaft 201 and the sleeve 202 so that the aforementioned continuous pressure distribution is interrupted. For example, Japanese Patent Laid-Open Publication 02-89807 discloses the non-circular bearing assembly. Yet, the non-circular bearing assembly also causes the dynamic pressure in the broader gaps to reduce the translation rigidity.

Further, another prior art of Japanese Patent Laid-Open Publication 02-150504 discloses a plurality of longitudinal bands in the direction of the bearing axis including circumferential micro ground streaks formed on the inner surface of the sleeve 202. The ground streaks causes the turbulent flow of the fluid in the radial bearing so that the dynamic pressure distribution leading the half-whirl is prevented. FIGS. 50 and 51 are discussed in Japanese Patent Laid-Open Publication 02-150504. FIG. 50 illustrates the shaft 201 surrounded by the inner surface of the sleeve 202. FIG. 51 is an enlarged view of a portion W on the inner surface of the sleeve 202, in which the streak band 223 comprises circumferential micro ground streaks 222. A plurality of streak bands is formed in the direction of the bearing axis with a predetermined distance to each other. This overcomes the half-whirl while maintaining the translation rigidity, which might be reduced by the grooves formed on the inner surface of the sleeve 202. However, since each streak band 223 has to be scraped one by one, the task for scraping them is burdensome. In case where the inner diameter of the sleeve 202 has a small size, for example, in the order of several millimeters, scraping the streak bands 223 would be difficult.

2. Improvement of Rigidity of Bearing Assembly

Next, some conventional means having a main purpose for improving the rigidity of the bearing assembly will be described hereinafter. Japanese Patent Laid-Open Publication 08-338960 discloses an improvement of the radial rigidity by providing a plurality of shallow longitudinal grooves along the axis and an annular groove across the longitudinal grooves on the outer surface of the shaft of the hydrodynamic bearing assembly used for an optical scan device. This structure supports the sleeve on multi points against the radial motion so that the radial rigidity of the bearing assembly is improved. FIG. 52 is a vertical cross section of the optical scan device incorporating the hydrodynamic bearing assembly. In the hydrodynamic bearing assembly, the shaft 231 is mounted on the housing 230, and the shaft 231 is rotatably arranged around the shaft 231. A flange 233 made of metal such as aluminum and brass is secured on the outer surface. A polygonal mirror 234 for deflecting a laser beam is arranged on the top surface of the flange 233 by means of the spring 235. Also, a driving magnet 236 is bonded on the bottom surface at the perimeter of the flange 233 by the adhesive. A stator 238 is provided on the substrate 237 secured on the housing 230 so as to oppose to the driving magnet 236.

FIG. 53 is the enlarged view of the shaft 231 alone illustrating its detailed aspect and a schematic pattern of the dynamic pressure distribution (with its peaks). As shown, two of the parallel shallow grooves 241, 242 are formed on the surface for generating the dynamic pressure. Also, the annular groove 243 is formed on the surface of the shaft 231. The annular groove 243 divides the peak of the dynamic pressure distribution into two peaks Q1, Q2. This prevents the rotating sleeve 232 in contact with the shaft 231, thereby to avoid the damages to each other. It is understood that since the dynamic pressure distribution has two peaks, the bearing assembly with the annular groove 243 has greater anti-moment rigidity against the external moment than that without the annular groove. However, the dynamic pressure at the portions adjacent to the longitudinal grooves 241, 242 formed on the outer surface of the shaft 231 is reduced to decrease the translation rigidity at those portions. Also, other factors such as dimensions and weights of the annular grooves 243 further reduces the translation rigidity.

Another conventional technique has proposed biasing the rotational member in the radial bearing along a particular direction. This defines the minimum gap between the shaft and the sleeve at a predetermined point where the high dynamic pressure is generated. Thus, it is understood that the bearing rigidity is improved because of the high dynamic pressure generated on the point where the minimum gap is defined, and that the half-whirl can advantageously be avoided. This is true as well for a complex radial-thrust bearing assembly, in which the radial bearing assembly and the thrust bearing assembly are continuously formed.

In particular, according to Japanese Patent Laid-Open Publication 11-18357 and Japanese Patent Laid-Open Publication 11-55918, the rotor magnet is positioned eccentrically to the coil so that the shaft is biased against the sleeve in the predetermined direction for the stable rotation. FIG. 54 shows one example disclosed in Japanese Patent Laid-Open Publication 11-55918. The rotor 252 is arranged around the stator 251, the rotor magnet 253 attached to the inner surface of the rotor 252 is opposed to the stator 251 for driving the torque. As shown in FIG. 54, one stator 251a has an arm shorter than those of the remaining stators 251. This causes the gap h1 between the stator 251a and the rotor magnet 253 greater than the gap h2 between the stator 251 and the rotor magnet 253. Thus, the attraction force (or the repulsion force) is reduced in the gap h1 so that the rotor is biased against the stator in the predetermined direction. The stator 251 is secured concentrically to the shaft, the rotor 252 is biased against the shaft in the predetermined direction. However, in order to bias the shaft against the sleeve with use of the method, the stator 251 is required to be positioned concentrically to the baring axis. In practical, the alignment of the stator 251 is often impossible because of the design constraint.

Japanese Utility Model Laid-Open Publication 55-36456 discloses the stationary permanent magnet attached to the housing so as to oppose to the rotor magnet for tilting the rotor towards the predetermined direction for rotation. However, this approach causes the lifetime of the bearing assembly shorter because the distal edge of the shaft 255 contacts with the sleeve 254.

Some other prior arts use a pump-out type hydrodynamic bearing assembly to improve the bearing rigidity. The hydrodynamic bearing assembly, in which the fluid is conducted from the center towards the circumference, is referred to as the pump-out type hydrodynamic bearing assembly. Briefly speaking, the pump-out type hydrodynamic bearing assembly has spiral grooves 205 having the angle with the circle, or the rotating direction reversed to one indicated by the arrow 206 of FIG. 43. Since the pump-in type hydrodynamic bearing assembly has the dynamic pressure distribution with the peak adjacent to the axis, it is relatively susceptible to the external disturbance. Meanwhile, the pump-out type hydrodynamic bearing assembly has the peak of the dynamic pressure distribution at the outermost edge of the thrust plate 203, thereby to improve the rigidity against the disturbing motion.

FIGS. 55 and 56 illustrate one embodiment to implement the pump-out type hydrodynamic bearing assembly according to Japanese Patent Laid-Open Publication 9-229053. In FIG. 55, the sleeve 272 is arranged around the shaft 271. Also, the shaft 271 has the thrust plate 273, which is integrally formed and is flush with the surface perpendicular to the bearing axis. The shaft 271 and the thrust plate 273 together rotate within the chamber defined by the sleeve 272. The shaft 271 has herringbone grooves 274 on the outer surface.

FIG. 56 is a top view of the shaft 271 and the thrust plate 273 of FIG. 55. The thrust plate 273 includes a plurality of spiral grooves 275 for generating the dynamic pressure on both surfaces of the thrust plate 273 (including opposite surface of the drawing). The arrow 276 shows the rotational direction of the shaft 271 of the bearing assembly. As illustrated, the spiral grooves 275 on both surfaces of the thrust plate 273 are formed with the tilt so that they conduct the fluid within the bearing assembly radially from the center to the circumference. Also, the thrust plate 273 has a plurality of through-holes extending along the bearing axis adjacent to the shaft 271.

In FIG. 55, during the rotation of the bearing assembly, the herringbone grooves 274 guide the fluid away from the thrust plate 273. Contrary, the spiral grooves 275 of the pump-out type hydrodynamic bearing assembly conduct the fluid to the thrust bearing and the circumference of the thrust plate 273. To this end, the dynamic pressure distribution has a peak adjacent to the circumference of the thrust plate 273. The long and short dotted line 278 in FIG. 55 schematically shows the dynamic pressure distribution. The pump-out type hydrodynamic bearing assembly generates the peak dynamic pressure at the circumference so as to realize the robust rigidity against the disturbance motion when the fluid is supplied to the thrust member. The through-holes keeps the dynamic pressure above and under the thrust plate 273 even to stabilize the rotation of the bearing assembly.

As illustrated in FIG. 55, in the structure of the complex radial-thrust bearing assembly wherein the radial bearing and the thrust bearing are continuously formed, the thrust bearing requires the fluid supplied from the radial bearing to the thrust bearing, to be enough for generating the dynamic pressure. The fluid is supplied from the upper end of the shaft through the radial gap between the shaft 271 and the sleeve 272 during the rotation of the shaft 271. However, if the shaft 271 has a circular cross section as shown in FIG. 55, a sufficient amount of the fluid is hardly delivered to the trust plate 273. Also, the herringbone grooves 274 in the radial bearing generates a peak of the radial dynamic pressure distribution at the middle portion of the radial bearing (at the middle portion of the herringbones with the V-shaped indication in the drawing). The fluid for generating this peak at the middle portion of the herringbones comes towards the radial bearing so that the fluid supplied to the radial bearing is likely to be short even if the pump-out type spiral grooves 275 are provided on the thrust plate 273. When the fluid supplied to the thrust bearing is short, the dynamic pressure in the thrusting direction cannot be generated so that the supporting force is also short. To this end, this causes the rotational member and the stationary member to be in contact with each other.

The need has been existed for a simple fastening mechanism for perpendicularly fastening the shaft with the thrust plate in a precise manner, in order to improve the bearing rigidity. Some conventional fastening methods and problems thereof will be described hereinafter. The fastening mechanism may bond the shaft directly with the thrust plate. This mechanism has a difficulty to keep the accuracy of the perpendicularity due to an uneven thickness of the adhesive. The tolerance limits of the perpendicularity is 0.3 microns measured as the tilt relative to the thrust plate diameter of 20 millimeters. When the shaft has the diameter of 4 millimeters or more, it is hardly possible to meet the tolerance limits even if the adhesive is cured while held correctly.

As shown in FIG. 57(a), the fastening mechanism comprises a hollow cylindrical shaft 281, a thrust plate 283, and a volt extending therethrough for fastening the shaft and thrust plate. However, an uneven pressure biased by the bolt 286 or the washer 287 causes the elastic deformation of the shaft 281, thereby to result the malfunction of the bearing assembly in this mechanism. Even a rubber pad attached to the end of the hollow space of the shaft 281 provides the same result. The present inventors have found that the perpendicularity was 1.2 micron due to the uneven pressure biased by the bolt 286 and it was 1.0 micron with use of the rubber pad. It is hardly possible to reduce the deviation of the radial component of the fastening force with use of this mechanism.

Also, another fastening mechanism comprises the cylindrical hollow shaft 281, the thrust plate 283', and a core member 288 secured on the thrust plate 283' and connected with the shaft 281 by the shrink fitting. However, when cooled down to the room temperature, the outer surface of the shaft 281 radially expands with the elastic deformation so that the radial gap between the shaft and the sleeve has an unwanted influences. The present inventors have found that the outer diameter of the shaft 281 radially expanded by 3 microns due to the shrink fitting and the bearing assembly could not practically be used.

Another prior arts fastening mechanism fastens the shaft and thrust plate by screwing a bolt onto the shaft 281 and the thrust plate 283. This fastening mechanism is simple and keeps the perpendicularity in a precise manner. If the shaft 281 is made of stainless steel, then this fastening mechanism can be used. However, if the shaft 281 is made of ceramics material, in which it is difficult to make a thread, the mechanism can hardly be utilized in practical.

(Third Problem)

To address the third problem, i.e., the improvement of the activation feature, many approaches have been proposed, for example by developing an effective spiral grooves in generating the thrust dynamic pressure. One of the solutions is reducing the floating rotation rate. Other solutions include increasing the acceleration at the beginning of the activation to minimize the time period in rotating with contact, and reducing the mass of the rotational member. Unless the rotation with contact is avoided, at the beginning of the activation, a significant activation torque is required and the bearing assembly wears quickly. Thus, the activation feature has to be further improved in future.

(Fourth Problem)

With respect to the fourth problem, i.e., an implementation of the compact and lightweight bearing assembly, the hydrodynamic bearing assembly has achieved the improvement in comparison with the ball bearing assembly. However, in any event, the market still needs the bearing assembly to be more compact and lightweight, thus, a further improvement is required.

Problems to be Solved

The conventional approaches for overcoming the half-whirl of the bearing assembly and for improving the bearing rigidity have each deficiencies as described above. Therefore, a purpose of the present invention is to provide the hydrodynamic bearing assembly eliminating the half-whirl and improving the rigidity against the disturbance.

Another purpose of the present invention is to provide the hydrodynamic bearing assembly improving the activation feature and satisfying the compact and lightweight requirement.

SUMMARY OF THE INVENTION

The first aspect of the present invention is to provide the hydrodynamic bearing assembly eliminating the half-whirl and rotating at a high rotation rate in a stable manner. In particular, the hydrodynamic bearing assembly comprises a column shaft having an outer surface parallel to an axis; a hollow cylindrical sleeve having an inner surface rotatably arranged around the outer surface of the shaft; and a radial bearing for generating a radial dynamic pressure due to a relative rotation between the sleeve and the shaft to keep them away from each other; wherein a total radial gap of a pair of side radial gaps along a diameter defined between the outer surface of the shaft and the inner surface of the sleeve is approximately 3 microns or less, more preferably approximately 2 microns or less. If the radial gap is designed to be extremely narrow, a fluid turbulence generated by the surface roughness of the rotating and stationary member defining the radial bearing interrupts the continuous dynamic pressure distribution so as to prevent the half-whirl. Further, if the radial gap is extremely narrow, in the complex radial-thrust bearing assembly, in which the radial and thrust bearings are combined, the relative tilt between the thrust plate and the thrust opposing surface in the thrust bearing can be reduced to avoid the contact therebetween, thereby to improve the tilt rigidity.

Alternatively, a plurality of scratched notches are formed on the surfaces defining the radial bearing so that a fluid turbulence is generated to avoid the half-whirl phenomenon. In particular, the hydrodynamic bearing assembly comprises: a column shaft having an outer surface parallel to an axis; a hollow cylindrical sleeve having an inner surface rotatably arranged around the outer surface of the shaft; and a radial bearing for generating a radial dynamic pressure due to a relative rotation between the sleeve and the shaft to keep them away from each other; wherein either one of the outer surface of the shaft and the inner surface of the sleeve has a plurality of notches parallel to the axis, each notch extends from both ends or from positions adjacent to the both ends of the bearing assembly, and has length of at least one-fourth (¼) of that of the bearing assembly, wherein one to ten of the scratched notches are formed on the surface within an arc of 200 microns, each notch has a depth within the range of approximately 1 micron to approximately 20 microns and a width within the range of approximately 10 microns to approximately 200 microns, alternatively, wherein each scratched notch is formed on the surface with an interval of an arc of at least 200 microns to another notch, each notch has a depth within the range of approximately 1 micron to approximately 20 microns and a width within the range of approximately 200 microns to approximately 500 microns.

The second aspect of the present invention is to provide the hydrodynamic bearing assembly, in which the bearing rigidity is improved by forming a various configurations or grooves on the surfaces of the members defining the radial bearing. Thus, the hydrodynamic bearing assembly comprises: a column shaft having an outer surface parallel to an axis; a hollow cylindrical sleeve having an inner surface rotatably arranged around the outer surface of the shaft; and a radial bearing for generating a radial dynamic pressure due to a relative rotation between the sleeve and the shaft to keep them away from each other; wherein either one of the outer surface of the shaft and the inner surface of the sleeve includes at lest one annular groove perpendicular to the axis, the annular groove is such that a depth ratio defined by the depth of the annular groove relative to a diameter of the surface is approximately 0.01 or less, and a width ratio defined by the width of the annular groove relative to a length of the bearing assembly is approximately 0.2 or less. The peak of the radial dynamic pressure distribution can be divided by providing the annular grooves so as to endure itself against the tilt motion. Also, the aforementioned dimension range of the annular grooves can minimize the reduction of the dynamic pressure.

Alternatively, the hydrodynamic bearing assembly comprises: a column shaft having an outer surface parallel to an axis; a hollow cylindrical sleeve having an inner surface rotatably arranged around the outer surface of the shaft; and a radial bearing for generating a radial dynamic pressure due to a relative rotation between the sleeve and the shaft to keep them away from each other; wherein the outer surface of the shaft and the inner surface of the sleeve together defining a gap therebetween are designed to have a configuration such that the gap is continuously and gradually enlarged substantially from a mid portion of the bearing assembly towards both ends along the axis when the shaft and the sleeve are positioned concentrically, and such that the outer surface of the shaft is substantially parallel to the inner surface of the sleeve at the portions where the shaft and the sleeve are positioned most closely because of a relative slope between the shaft and the sleeve. In order for the gap to continuously and gradually be enlarged substantially from the mid portion of the bearing assembly towards both ends along the axis, a hollow space of the sleeve may be continuously and gradually enlarged substantially from the middle portion of the bearing assembly towards both ends along the axis, or a diameter of the shaft may be continuously and gradually shrunk substantially from the middle portion of the bearing assembly towards both ends along the axis. Also, both approaches may be combined.

An another approach to keep the thrust gap in the thrust bearing to be constant is to keep the relative dimensions between the radial gap and the thrust gap to fall within the particular range. Therefore, the hydrodynamic bearing assembly comprises: a radial bearing including a column shaft having an outer surface parallel to an axis, and a hollow cylindrical sleeve having an inner surface rotatably arranged around the outer surface of the shaft, the radial bearing for generating a radial dynamic pressure due to a relative rotation between the sleeve and the shaft; and a pair of thrust bearings, each including at least one thrust plate formed or secured onto either one of the shaft and the sleeve, and a pair of thrust opposing surfaces formed or secured onto the other one of the shaft and the sleeve, the thrust bearing for generating a thrust dynamic pressure due to the relative rotation between the thrust plate and the thrust opposing surface; wherein a total radial gap F of a pair of side radial gaps along a diameter in the radial bearing, a length L of the bearing assembly along the axis, and an outer diameter G in the thrust bearing satisfy the following condition; $(F/L)<(D/G)$. Alternatively, the total radial gap F, and a total thrust gap D satisfy the following condition; $kF<D$, wherein k is constant in the range of 2 to 10.

The third aspect of the present invention is to provide the hydrodynamic bearing assembly, in which the bearing rigidity is improved by providing a pump-out type hydrodynamic bearing assembly and by supplying a sufficient amount of the fluid with the pump-out type hydrodynamic bearing assembly. Thus, the hydrodynamic bearing assembly comprises: a radial bearing including a column shaft having an outer surface parallel to an axis, and a hollow cylindrical sleeve having an inner surface rotatably arranged around the outer surface of the shaft, the radial bearing for generating a radial dynamic pressure due to a relative rotation between the sleeve and the shaft; and a thrust bearing including a thrust plate formed or secured onto either one of the shaft and the sleeve, and a thrust opposing surface formed or secured onto the other one of the shaft and the sleeve, the thrust bearing for generating a thrust dynamic pressure due to the relative rotation between the thrust plate and the thrust opposing surface; wherein the thrust bearing is a pump-out type, and conducts the fluid in the thrust bearing in the direction from the axis to circumference, and wherein at least one longitudinal groove formed on either one of the outer surface of the shaft and the inner surface of the sleeve, the longitudinal groove extending parallel or offset to the axis through both ends along the axis.

Alternatively, the pair of the thrust bearings connect with the radial bearing, the thrust gap is kept constant, and at least one of thrust bearings is the pump-out type one, so that a more robust rigidity can be realized. In particular, the hydrodynamic bearing assembly comprises: a column shaft having a pair of small columns concentrically formed on end surfaces; a hollow cylindrical sleeve rotatably arranged around an outer surface of the shaft parallel to the axis of the shaft; and a pair of donut-shaped thrust plates arranged on both ends of the sleeve, each of the thrust plate including a through-hole, through which the small column extends; a radial bearing defined between the outer surface of the shaft and the inner surface of the sleeve; and a thrust bearing defined between the pair of thrust plates and thrust opposing surfaces opposing to the thrust plates; wherein each thrust bearing communicating in fluid with the radial bearing, and grooves are formed on either one of the thrust plate and thrust opposing surface to generate a thrust dynamic pressure due to a relative rotation between the thrust plate and thrust opposing surface, and wherein the grooves of at least one of the thrust bearings being a pump-out type groove for conducting the fluid in the direction from the axis to a circumference thereof.

The fourth aspect of the present invention is to provide the hydrodynamic bearing assembly, in which the bearing rigidity is improved by increasing the perpendicularity between the shaft and the thrust plate and by fastening thereof. In particular, the hydrodynamic bearing assembly comprises: a radial bearing including a hollow cylindrical shaft having an outer surface parallel to an axis, a hollow cylindrical sleeve having an inner surface rotatably arranged around the outer surface of the shaft, the radial bearing for generating a radial dynamic pressure due to a relative rotation between the sleeve and the shaft; and a thrust bearing including a disk-shaped thrust plate secured perpendicularly onto one end of the axis of the shaft the thrust plate having a through-hole formed concentrically to the axis, and a thrust opposing surface of one end surface of the sleeve, opposing to the thrust plate, the thrust bearing for generating a thrust dynamic pressure due to the relative rotation between the thrust plate and the thrust opposing surface; a constraint member closely fit within the inner surface of a hollow space of the shaft for securing the shaft thereto; and a fastening member having means for engaging with the constraint member; wherein the engaging means extends through the through-hole of the thrust plate to engage with the constraint member so that the shaft and the sleeve are secured. The constraint member may have a cylindrical extension member extending along the axis beyond an end surface of the thrust plate for closely fitting within the through-hole of the thrust plate. The engaging means may include a male screw extending from either one of the constraint member and the fastening member and a female screw.

The fifth aspect of the present invention is to provide the hydrodynamic bearing assembly, in which the endurance and the reliablity thereof are improved by improving the activation feature. In particular, the hydrodynamic bearing assembly comprises: a radial bearing including a column shaft having an outer surface parallel to an axis, and a hollow cylindrical sleeve having an inner surface rotatably arranged around the outer surface of the shaft, the radial bearing for generating a radial dynamic pressure due to a relative rotation between the sleeve and the shaft; and a thrust bearing including a thrust plate formed or secured onto either one of the shaft and the sleeve, and a thrust opposing surface formed or secured onto the other one of the shaft and the sleeve, the thrust bearing for generating a thrust dynamic pressure due to the relative rotation between the thrust plate and the thrust opposing surface; wherein the radial bearing connects with the thrust bearing adjacent connecting portions forming conduits for a fluid, the fluid is communicated via a the conduit having the corn portions or the continuous and smooth curve portions without bending points, a first and second distances m and n defined between two symmetry ascending positions to the axis of the corn or curve portion of the sleeve and the thrust plate, respectively, satisfy a following condition; m<n, so that the radial bearing and the thrust bearings adjacent connecting portions are formed as corn portions or continuous and smooth curve portions without bending points.

An another approach to keep the thrust gap in the thrust bearing to be constant is to provide the hydrodynamic bearing assembly comprises: a radial bearing including a column shaft having an outer surface parallel to an axis, and a hollow cylindrical sleeve having an inner surface rotatably arranged around the outer surface of the shaft, the radial bearing for generating a radial dynamic pressure due to a relative rotation between the sleeve and the shaft; and a pair of thrust bearings, each including at least one thrust plate formed or secured onto either one of the shaft and the sleeve, and a pair of thrust opposing surfaces formed or secured onto the other one of the shaft and the sleeve, the thrust bearing for generating a thrust dynamic pressure due to the relative rotation between the thrust plate and the thrust opposing surface; wherein the radial bearing connects with the pair of the thrust bearings adjacent connecting portions forming conduits for a fluid, the radial bearing and the thrust bearings adjacent connecting portions are formed as corn portions or continuous and smooth curve portions without bending points, and wherein, when the shaft and the sleeve are positioned so that they are concentric and each thrust gap is the same, a one-side radial gap F/2 along the radius in the radial bearing, a one-side thrust gap D/2 in the thrust bearing, and a gap distance S/2 of the conduits adjacent connecting portions satisfy the following condition; F<S<D.

The sixth aspect of the present invention is to provide the compact and lightweight hydrodynamic bearing assembly. In particular, the hydrodynamic bearing assembly includes opposing portions among the shaft, the sleeve, the thrust plate, and at least one of the thrust opposing surfaces, which are made of ceramics material. The ceramics material is selected from a group consisting of alumina, zirconia, silicon carbide, silicon nitride, and sialon.

The seventh aspect of the present invention is to provide a spindle motor as well as a memory device and bar code reader incorporating the spindle motor, which are able to rotate in a stable manner and are robust against the external motions.

PREFERRED EMBODIMENTS OF THE INVENTION

Figure 44:
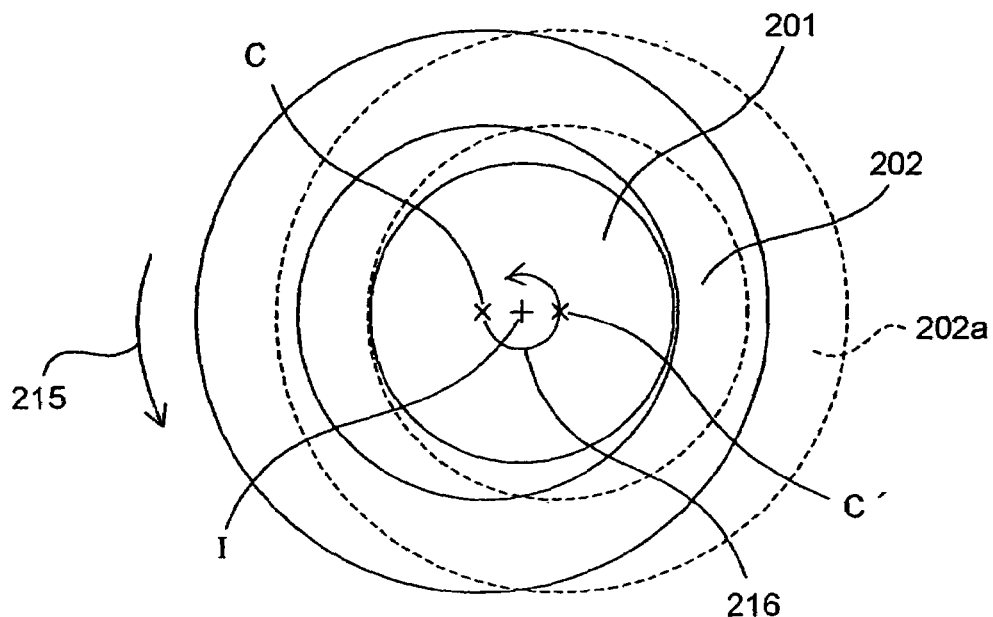
FIG. 44 is a transverse cross sectional view of the shaft, illustrating the half-whirl of the hydrodynamic bearing assembly.
Figure 45:
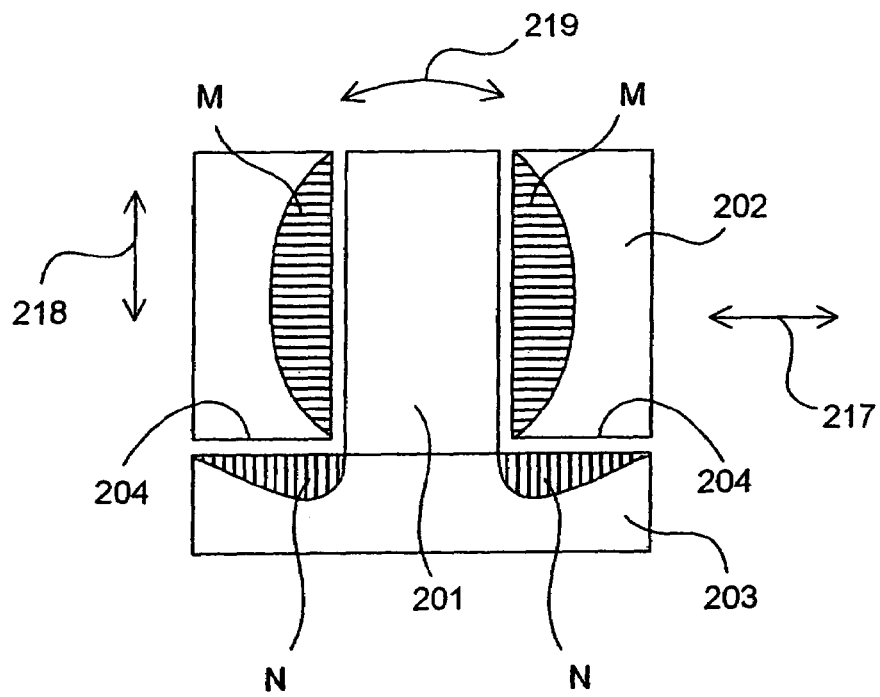
FIG. 45 is a cross sectional view of the hydrodynamic bearing assembly, illustrating a dynamic pressure distribution of the hydrodynamic bearing assembly.
Figure 46:
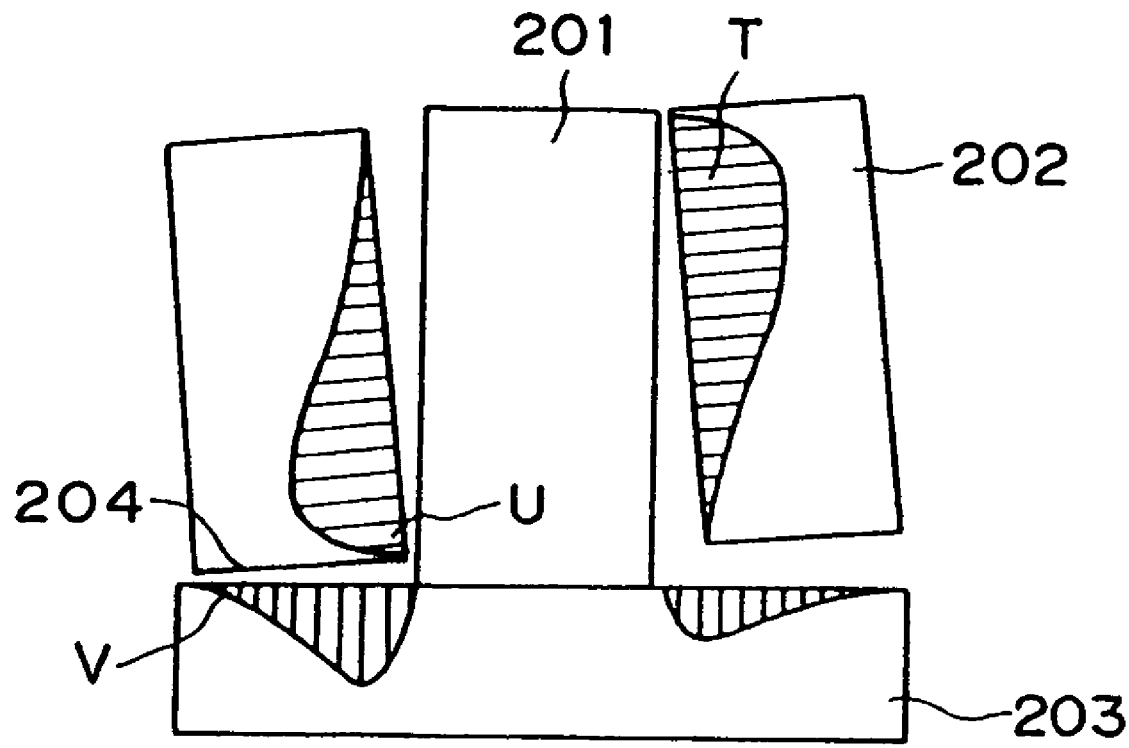
FIG. 46 is a cross sectional view of the hydrodynamic bearing assembly, illustrating another dynamic pressure distribution of the hydrodynamic bearing assembly.
Figure 47:
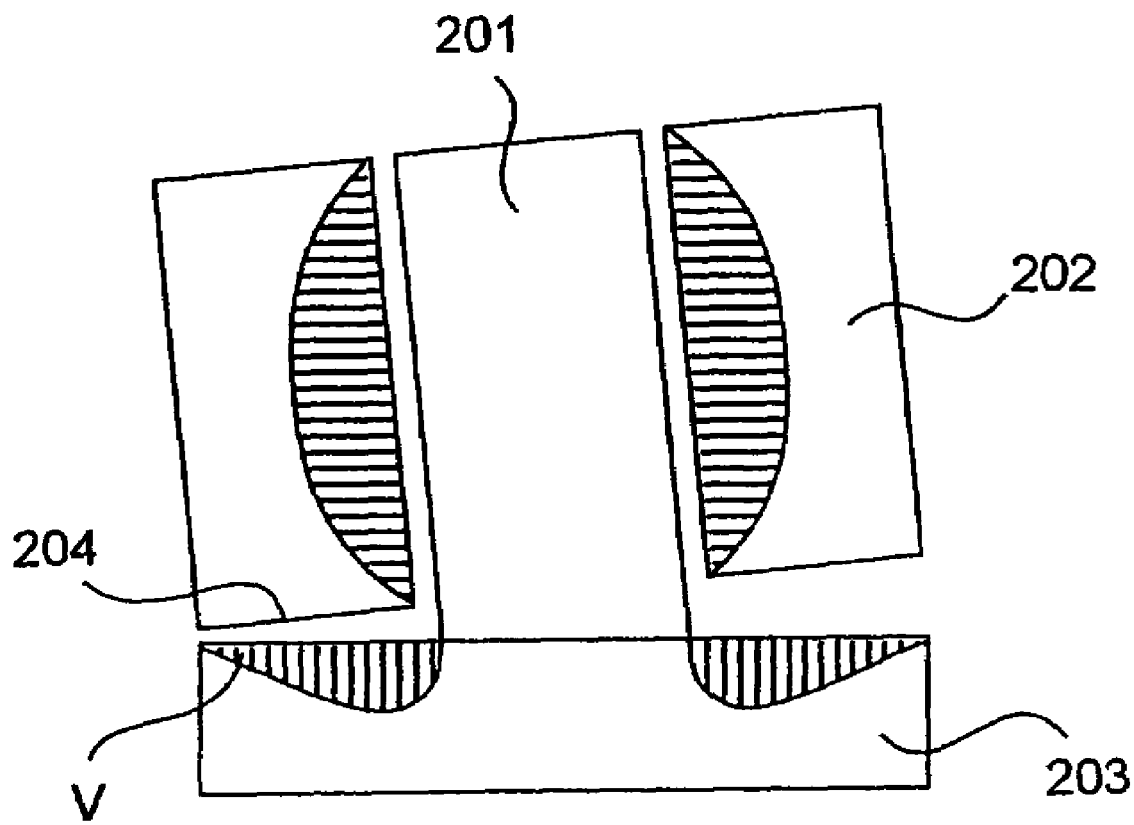
FIG. 47 is a cross sectional view of the hydrodynamic bearing assembly, illustrating further another dynamic pressure distribution of the hydrodynamic bearing assembly.

The first aspect of the present invention is to address overcoming a half-whirl. As discussed above with reference to FIG. 44, the half-whirl is a phenomenon where the rotational member (either one of the shaft and sleeve) whirls relatively to the stationary member (the other one of the shaft and sleeve). In order to achieve the relative rotation without contact between the rotational member and the stationary member, a certain gap is essential between the opposing surfaces of both members. It is understood that the half-whirl phenomenon is theoretically unavoidable under the existence of the gap, First Embodiment The first embodiment of the hydrodynamic bearing assembly according to the present invention, which mainly address overcoming the half-whirl, will be described hereinafter. The present inventors have found no half-whirl phenomenon appeared if a radial gap between the outer surface of a shaft and the inner surface of a sleeve, both of which define a radial bearing, is extremely narrow. For example, the difference between the outer diameter of the shaft and the inner diameter is preferably about 3 microns or less and more preferably about 2 microns or less so that no half-whirl phenomenon is observed. There seems some reasons as follows. The outer surface of a shaft or the inner surface of a sleeve still has a certain roughness remaining even after the smoothening process. This surface roughness causes a turbulence of the fluid between the rotating and stationary member. As discussed above, the continuous dynamic pressure distribution causes the half-whirl. It is understood that the fluid turbulence, which is greater as the radial gap is narrower, interrupts the continuous dynamic pressure distribution so that the half-whirl is prevented. The embodiment relates to the hydrodynamic bearing assembly, in which the total radial i.e., the difference between the outer diameter of the shaft and the inner diameter, is preferably about 3 microns or less and more preferably about 2 microns or less. Although the radial gap may be designed to be zero theoretically, then there is a high possibility that the sleeve cannot be arranged around the shaft or no rotation can be possible due to the manufacturing accuracy of the sleeve and the shaft. To avoid such possibility, the gap is designed to be more than about 1 micron.

When the radial gap is extremely narrow as described above, it is understood that the outer surface of the shaft and the inner surface of the sleeve keep in contact with each other while the spindle motor is halted. If both of the opposing surfaces have such roughness, then the friction between the opposing surfaces is greater. This causes the shaft and the sleeve to wear quickly, and the greater torque is required to start rotating the spindle motor. The increased torque due to the friction of the opposing contact surfaces can be avoided by further smoothening either one of the opposing surfaces so that the friction between the opposing surfaces is reduced. Also, even when one of the opposing surfaces is smoothened considerably, the other one of the opposing surfaces may have the appropriate roughness remaining to generate the fluid turbulence in the dynamic pressure distribution for preventing the half-whirl.

When the outer surface of the shaft is further smoothened, it has the surface roughness Rp, preferably about 0.2 micron or less, or more preferably about 0.15 micron or less. On the other hand, when the inner surface of the sleeve is further smoothened, taking account of the difficulty to smoothen, it has the surface roughness Rp, preferably about 0.4 micron or less, or more preferably about 0.35 micron or less. The surface roughness Rp is representative of the deviation from the average of the roughness curve to the measured curve. Although the surface roughness Rp may be designed to be zero theoretically, it is determined based upon the restriction condition of the smoothening accuracy and the cost for smoothening. In addition, in order to ensure the narrow radial gap between the shaft and the sleeve according to the present invention, preferably, the circularity deviation of the cross sections of the shaft and the sleeve are taken into consideration. The outer surface of the shaft has the circularity deviation preferably of about 0.2 microns or less, or more preferably of about 0.12 microns or less. Similarly, the inner surface of the sleeve has the circularity deviation preferably of about 0.7 microns or less, or more preferably of about 0.4 microns or less, taking account of the difficulty to produce. Although the circularity deviation may be designed to be zero theoretically, it is also determined based upon the restriction condition of the production and the manufacturing cost.

Second Embodiment

The second embodiment of the hydrodynamic bearing assembly according to the present invention, which addresses overcoming the half-whirl, will be described hereinafter. The hydrodynamic bearing assembly of the embodiment includes a plurality of scratched notches as means for overcoming the half-whirl, instead of the conventional notches formed either on the outer surface of the shaft or the inner surface of the sleeve. The scratched notches generate the fluid turbulence interrupting the continuous dynamic pressure distribution for eliminating the half-whirl.

Figure 1:
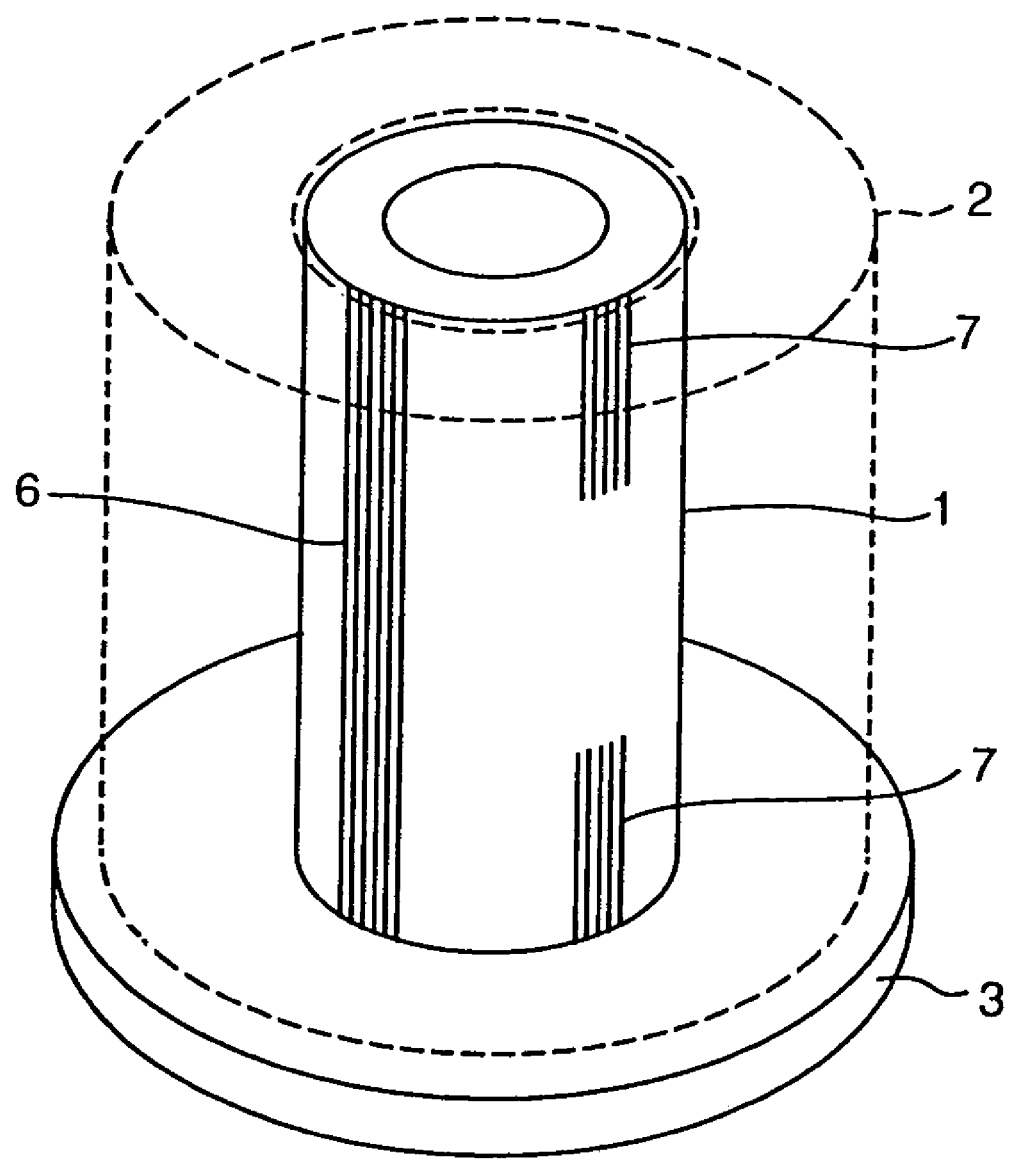
FIG. 1 is a perspective view of one embodiment of the hydrodynamic bearing assembly according to the present invention.
Figure 2:
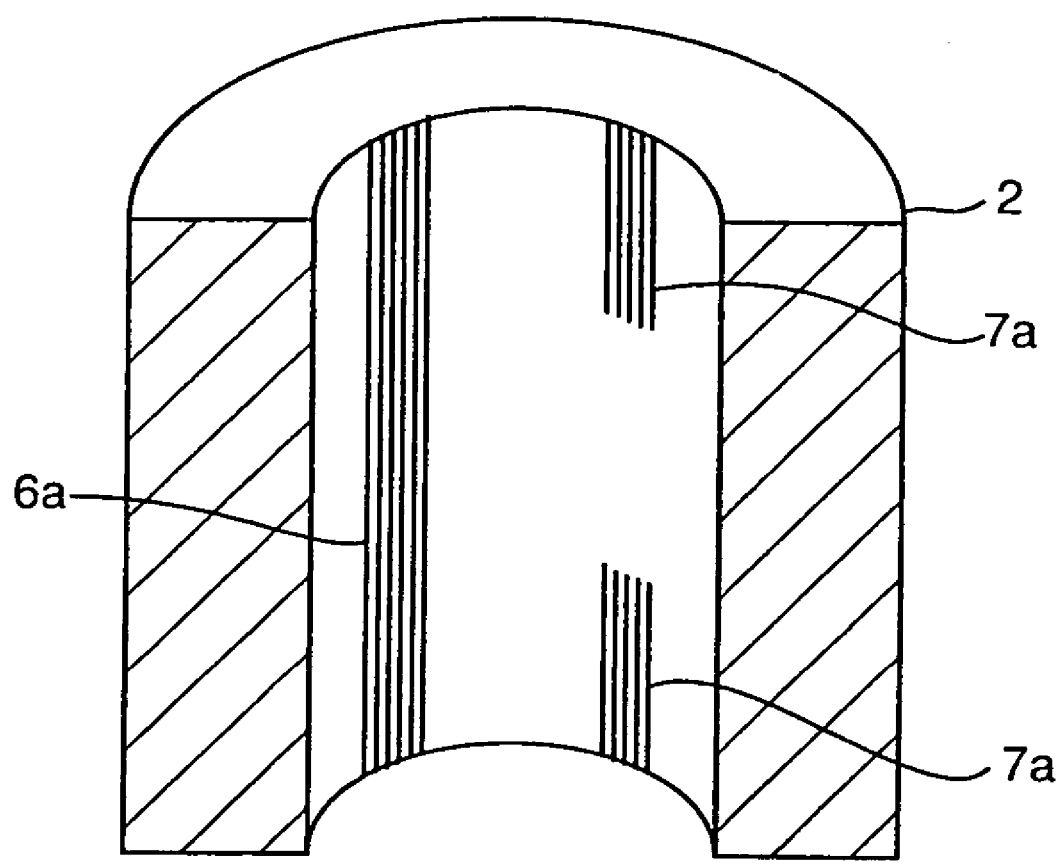
FIG. 2 is a perspective view of the alternative sleeve of the hydrodynamic bearing assembly in FIG. 1.

FIGS. 1 and 2 illustrate the hydrodynamic bearing assembly of the embodiment. The hydrodynamic bearing assembly comprises a shaft 1, a sleeve 2 arranged around the shaft 1 as indicated by the phantom line, and a thrust plate 3 perpendicularly secured to the shaft 1 opposing to the bottom surface (referred to as a thrust opposing surface) of the sleeve 2. The thrust plate 3 includes a plurality of spiral grooves opposing to the thrust opposing surface of the sleeve 2 for generating the thrust dynamic pressure. When the sleeve 2 rotates relative to the shaft 1 and the thrust plate 3, the radial dynamic pressure and the thrust dynamic pressure are generated between the sleeve 2 and the shaft 1, and between the thrust plate 3 and the thrust opposing surface of the sleeve 2, respectively. Such generated dynamic pressures cause the sleeve 2 to rotate relative to the shaft 1 and the thrust plate 3 without any contact therebetween.

Figure 48:
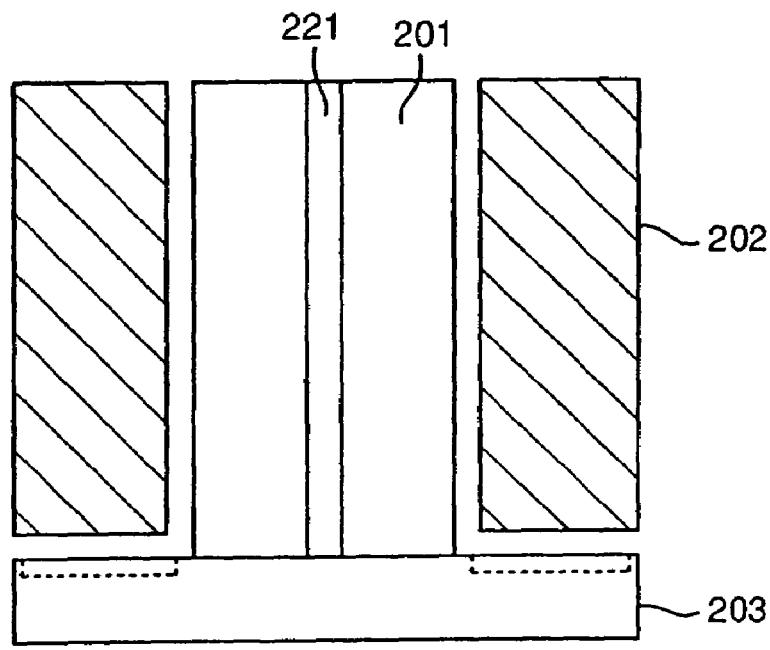
FIG. 48 is a vertical cross sectional view of another conventional hydrodynamic bearing assembly.
Figure 49:
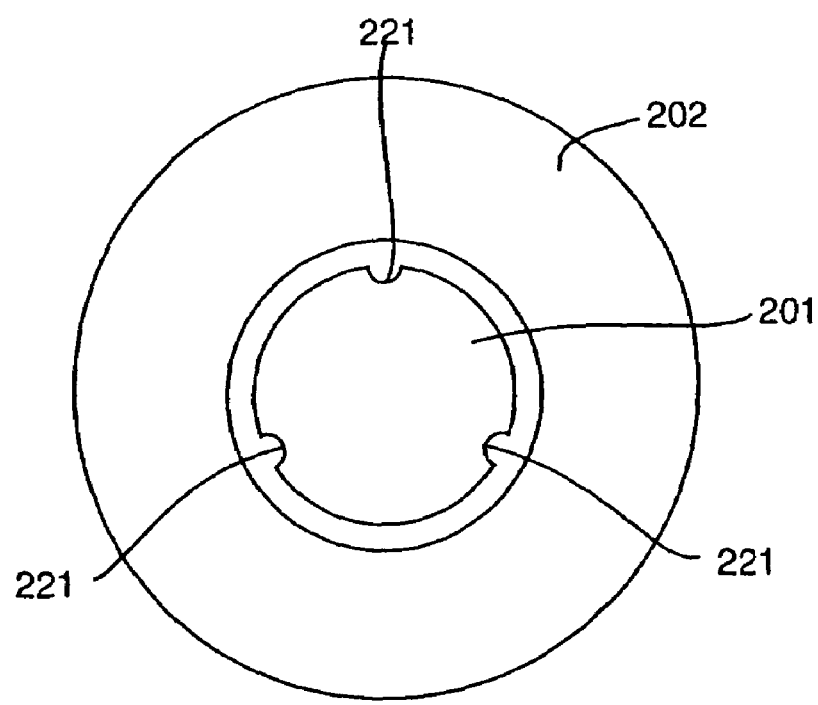
FIG. 49 is a transverse cross sectional view of the hydrodynamic bearing assembly in FIG. 48.
Figure 50:
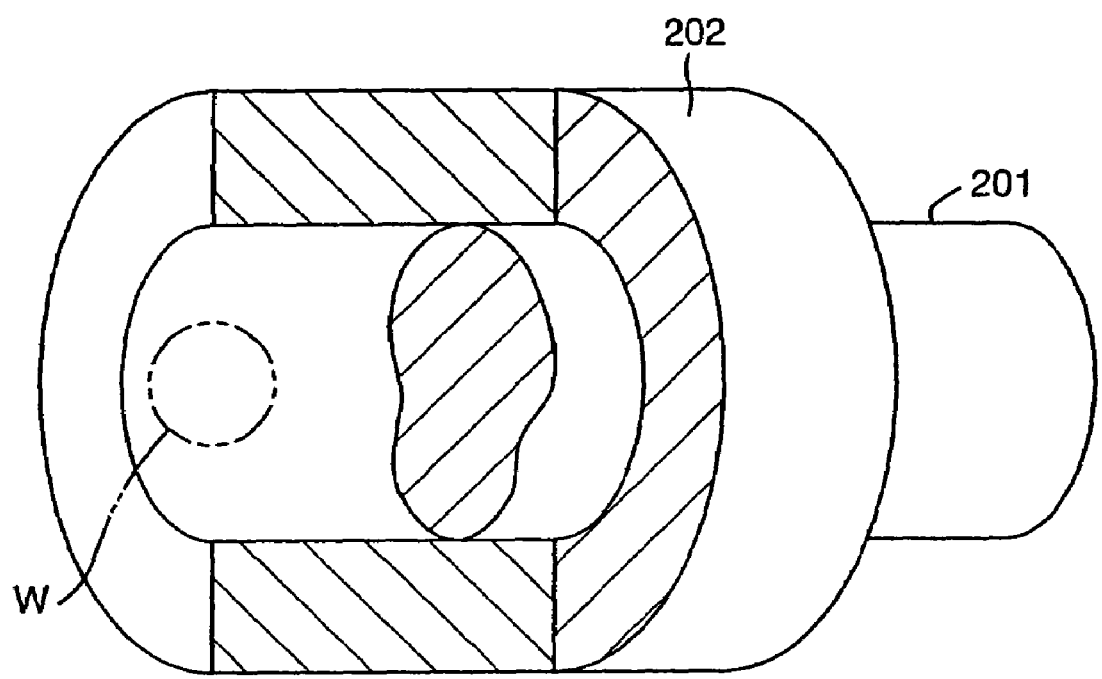
FIG. 50 is a partially fragmentary perspective view of another conventional hydrodynamic bearing assembly.
Figure 51:
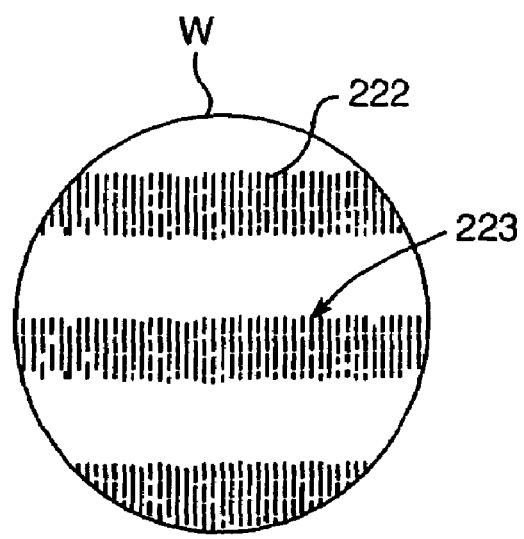
FIG. 51 is an enlarged view of the sleeve of the hydrodynamic bearing assembly in FIG. 50.
Figure 52:
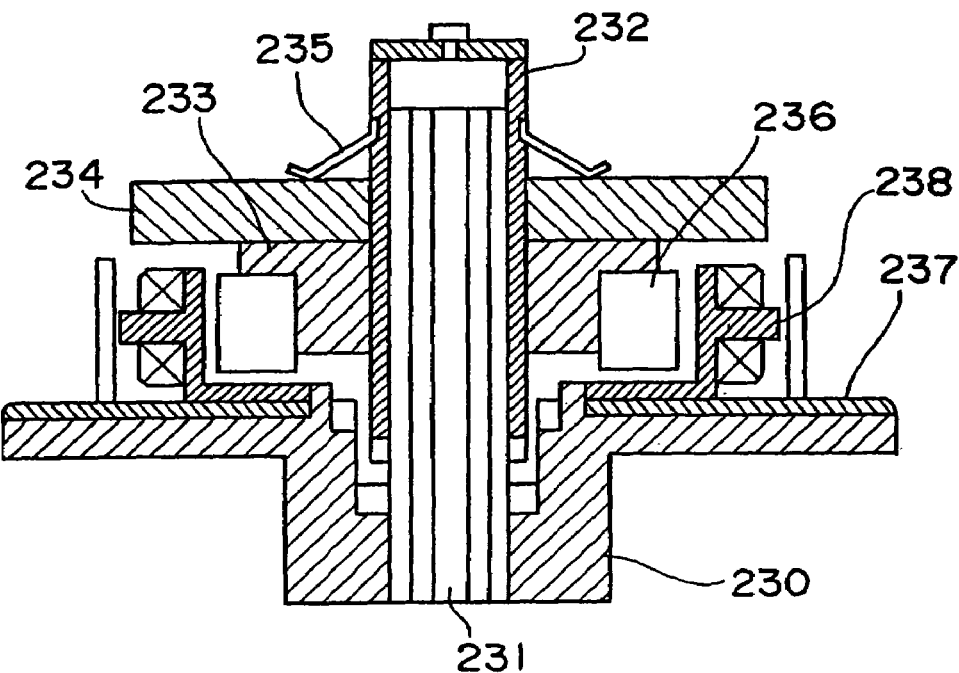
FIG. 52 is a side cross sectional view of another hydrodynamic bearing assembly used for the conventional bar code reader.
Figure 53:
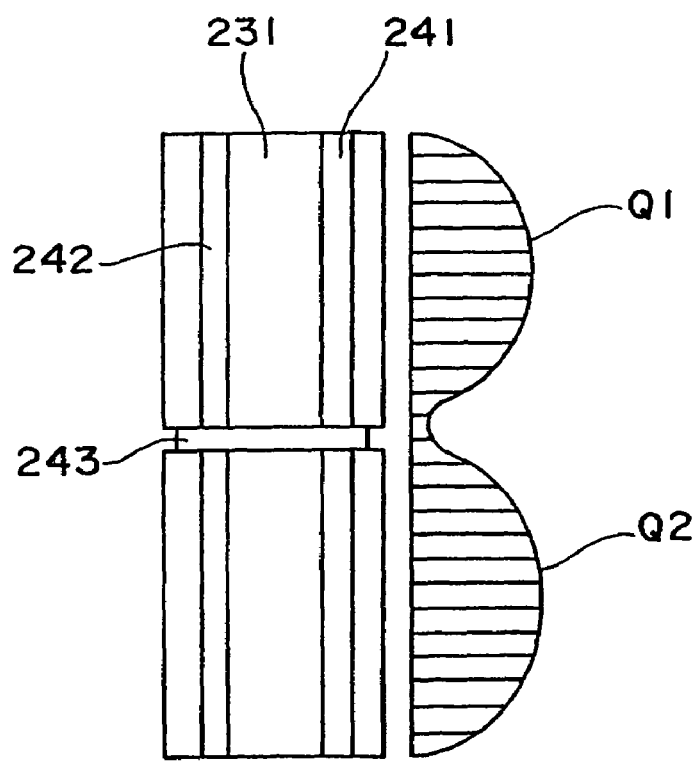
FIG. 53 is a cross sectional view of the hydrodynamic bearing assembly in FIG. 52, illustrating the dynamic pressure distribution thereof.
Figure 54:
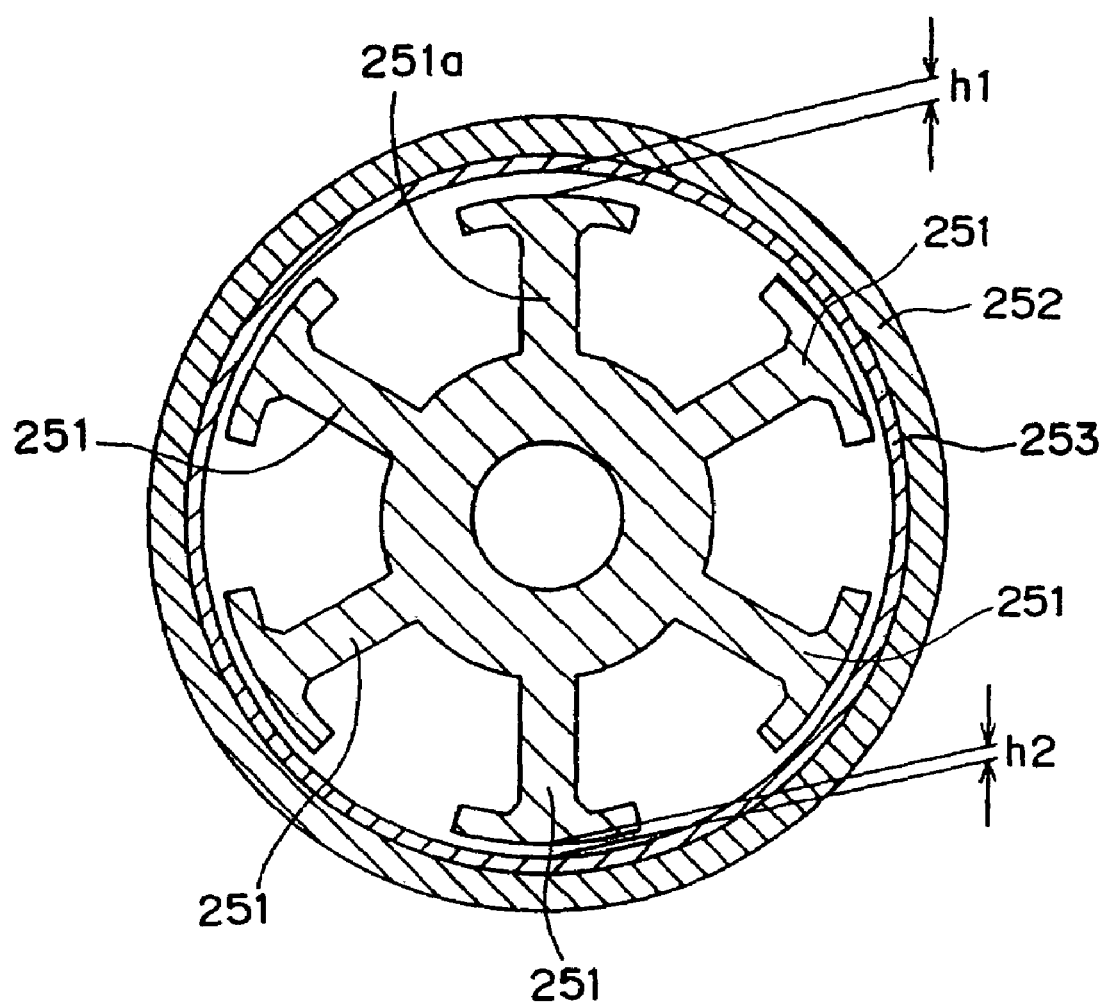
FIG. 54 is a transverse cross sectional view of a conventional biasing means.

As shown in FIG. 1, the outer surface of the shaft 1 include the scratched notches 6, 7. In particular, each of the scratched notches 6, extends across and along the shaft 1, while each of the scratched notches 7 extends along the shaft 1 but is interrupted in part adjacent the mid portion of the sleeve 2. Each of the scratched notches 6 and 7 is much finer than the conventional notch 221 indicated in FIG. 48, which for example, has a depth in the range of about 1 micron to about 20 microns, and a width in the range of about 10 microns to about 500 microns. No problem was found in operation for the scratched notches with the depth of about 20 microns or less, while the depth may be influenced by the scratching process.

The finer scratched notches 6 and 7 formed on the outer surface of the shaft 1 cause the turbulence of the fluid in the radial bearing so as to eliminate the half-whirl. Also, the scratched notches 6 and 7 are so fine that the radial dynamic pressure is maintained in the radial bearing. Therefore, the hydrodynamic bearing assembly of the embodiment raises no problem that the prior art suffers, for example, the reduction of the translation rigidity against the disturbance motion along a predetermined direction, and the increase of the risk of the rotation with contact.

Contrary, each of the scratched notches 7 formed along but not across the shaft 1 extends preferably from the bottom end and/or the top end, or portions adjacent thereto, upwardly and/or downwardly to the middle portion of the shaft 2, respectively. Also, each of the scratched notches 7 has a longitudinal length which is more than one-fourth of the entire length (thus in total, half of the entire length) of the shaft 2. Since the scratched notches 6 and 7 extends from the bottom end and/or the top end of the shaft 2 to cause the inside of the notches to be open to the atmosphere, the continuous dynamic pressure distribution causing the half-whirl can advantageously be interrupted. The prior art (Japanese Patent Laid-Open Publication 2-150504) fails to show this advantage, it discloses a plurality of longitudinal bands in the direction of the bearing axis, which includes circumferential micro ground streaks formed on the inner surface of the sleeve 202.

To eliminate the half-whirl satisfactorily, preferably, about one to ten of the scratched notches 6 and 7 having the width in the range of about 10 microns to about 200 microns is formed within every 200 microns of the length in the direction of the circumference of the shaft 1. Similarly, one of the scratched notches 6 and 7 having the width in the range of about 200 microns to about 500 microns is preferably formed with at intervals of at most 200 microns in the direction of the circumference of the shaft 1. The expression of "with at most 200 microns of an interval to another" means that a plurality of scratched notches with the width in the range of about 200 microns to about 500 microns are arranged away from each other with a interval of at most 200 microns or, preferably less than it. The experiments conducted by the present inventors revealed that when the scratched notches include the depth in the range of one to three microns are arranged away from each other with a space of 200 microns (five notches per one millimeter), the bearing rotation can be implemented in a stable manner.

The scratched notches do not have to be formed on the outer surface of the shaft at a constant interval. Rather, the scratched notches are necessarily formed on the longitudinal width of about more than one-tenth of the circumference in order to prevent the half-whirl. For example, when the circumference of the shaft is 10 millimeters, the longitudinal width where the scratched notches are formed is about more than one millimeter. Also, the scratched notches may be divided on three separate circumferencial portions at the regular interval. While each of the scratched notches 6 and 7 are illustrated as a single continuous fine notch in FIG. 1, such a scratched notch is formed, for example, by pressing the shaft on the rubstone and moving thereof in the axis direction. Alternatively, a group of the intermittent scratched notches along the axis direction may be formed, for example by using a annular rubstone, rotating the shaft around its own axis, and moving therethrough. The axis direction may not be perpendicular to the axis in a precise manner and may be inclined to some extent. This applies for the case indicated in FIG. 2.

FIG. 2 illustrates the sleeve 2 including the inner surface on which the scratched notches 6 and 7 are formed. The scratched notches 6 and 7 of FIG. 2 are formed in a similar manner as those of FIG. 1. While the conventional streak band comprises circumferential micro ground streaks, the scratched notches 6 and 7 of FIG. 2 are formed longitudinally along the sleeve 2. Therefore, advantageously, the scratched notches 6 and 7 are readily formed, for example by a couple of longitudinal movement of a cylindrical rubstone with an appropriate diameter through the sleeve 2 without rotation. In addition, even the sleeve has a small diameter (for example, 2 millimeters), still it can readily be processed.

FIGS. 1 and 2 illustrate that the shaft 1 is the stationary member and the sleeve 2 is the rotational member, however, the present invention is not limited thereto, thus, the shaft 1 may be the rotational member and the sleeve 2 may be the stationary member. In addition, in the drawings, the combination of the scratched notches 6 and 6a extending along and across the shaft 1 and the scratched notches 7 and 7a extending along but partially being interrupted in the mid portion of the shaft 1 are illustrated. However, this is so illustrated just for clarification, and any combinations are acceptable without departing from the scope of the present invention.

The half-whirl is prevented by providing the scratched notches according to the embodiment on either one of the outer surface of the shaft and the inner surface of the sleeve, even when both of the opposing surfaces are further smoothened. To this end, according to the embodiment, the friction between both of the opposing surfaces can be further decreased, and the activation torque can also be reduced.

The second aspect of the present invention is to address improving the bearing rigidity.

Third Embodiment

Figure 3:
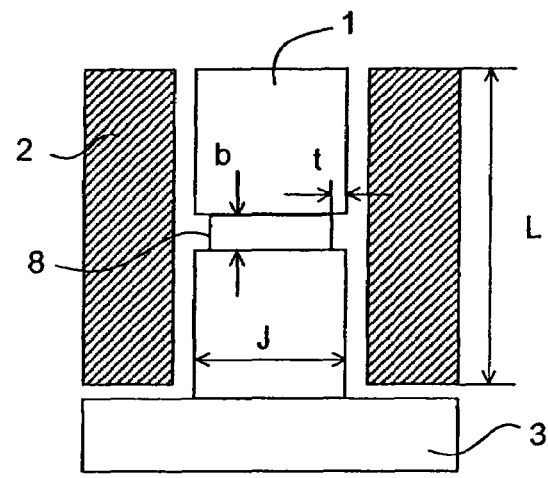
FIG. 3 is a perspective view of another embodiment of the hydrodynamic bearing assembly according to the present invention.

The third embodiment of the hydrodynamic bearing assembly according to the present invention, which addresses improving the bearing rigidity, will be described hereinafter. The third embodiment relates to the restriction conditions in the configurations and the dimensions of the longitudinal grooves extending along the axis direction as well as the annular grooves perpendicularly crossing the longitudinal grooves. As discussed above, it is well known in the art that in order to improve the tilt rigidity as shown in FIG. 3, the annular groove 8 is provided on the outer surface of the shaft 1 at the middle portion in the axis direction, extending substantially perpendicular to the axis direction across the longitudinal grooves for supporting the sleeve 2 at various points. Meantime, the annular grooves 8 reduce the translation rigidity causing further disadvantages as described above. According to the embodiment, the translation rigidity can advantageously be improved, while maintaining the tilt rigidity, by optimizing the width b and the depth t of the annular groove 8. The annular groove 8 has a depth ratio (which is referred to as a ratio of the depth of the annular groove 8 relative to the diameter of the shaft 1) of 0.01 or less, and a width ratio (which is referred to as a ratio of the width of the annular groove 8 relative to the longitudinal length of the sleeve 2) of 0.2 or less. If the depth ratio is 0.01 or more, then the total volume of the gap in the bearing assembly is excessive to cause the reduced translation rigidity. If the width ratio is 0.2 or more, then the tilt-rigidity is reduced. If the depth ratio is 0.0001 or less, or if the width ratio is 0.01 or less, then the peak of the dynamic pressure distribution is not divided due to the annular groove 8.

Figure 4:
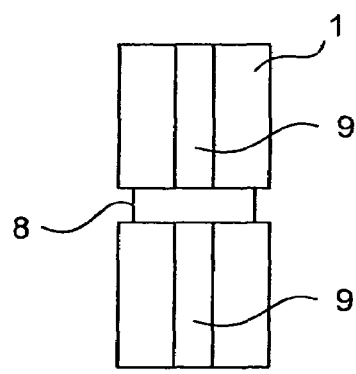
FIG. 4 is a side view of the conventional hydrodynamic bearing assembly.

As discussed above, in the hydrodynamic bearing assembly having the shaft 1 with the outer surface on which longitudinal groove 9 is formed along the axis as shown in FIG. 4, if the disturbance motion is applied in the direction aligning to the longitudinal grooves 9, then the translation rigidity is reduced. In order to overcome the problem, the upper grooves 9a are shifted along the rotating direction relative to the lower groove 9b so that the dependency of the translation rigidity can be reduced.

The reasons leading this conclusion will be described hereinafter. Several samples were prepared varying the dimension of the annular grooves 8 and position of the longitudinal grooves 9, and then were evaluated for the variation with respect to the translation rigidity and the tilt rigidity due to the external force.

Figure 6:
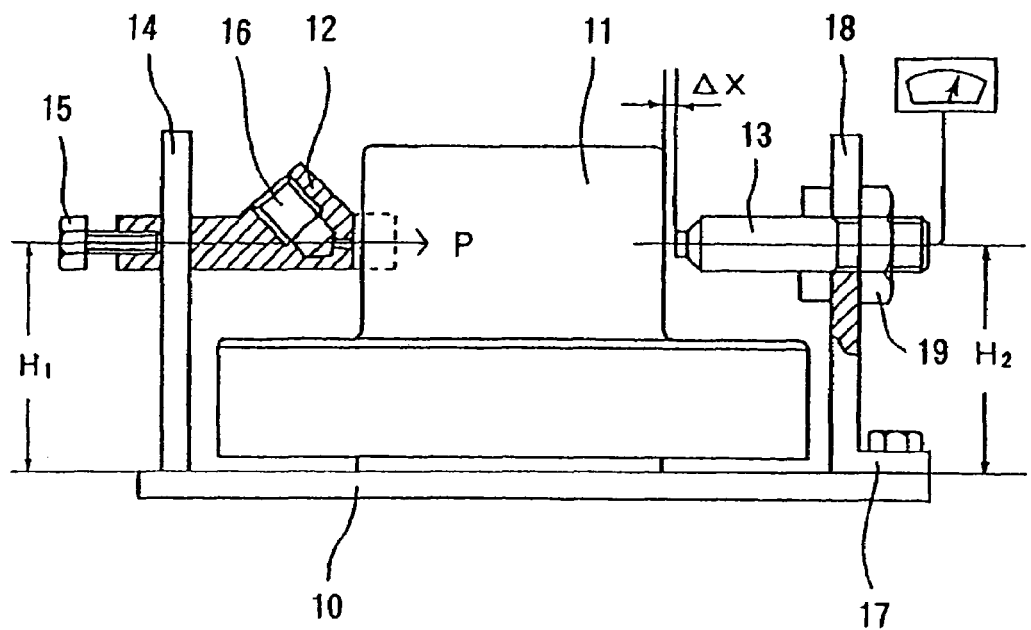
FIG. 6 is a schematic view of an evaluation equipment for a translation rigidity and a tilt rigidity of the hydrodynamic bearing assembly.

FIG. 6 is a schematic view of an evaluation equipment. The evaluation equipment comprises a rotor hub 11 incorporated with the hydrodynamic bearing assembly secured on the base plate 10, an arc nozzle 12 having a wing at the tip for guiding air adjacent to and around rotor hub 11, and a capacitance prove 13 located on the opposite side over the rotor hub 11. The base plate 10 has a supporting column 14 at the end for supporting the arc nozzle 12. The elevation H1 of the arc nozzle 12 can be adjusted by a screw 15. The arc nozzle 12 includes a guiding hole 16 to which compressed air is guided from a compressor through a high-pressure hose (not shown). The external force P to be applied with the rotor hub 11 can be varied by adjusting the air pressure. Meantime, the capacitance prove 13 is secured with an L-shaped flange 17, which is arranged on the base plate 10 at the other end thereof. The elevation H2 of the capacitance prove 13 can also be adjusted by sliding the flange 17 within the longitudinal hole 18 and by fastening it with a nut 19. The capacitance prove 13 measures the variation of distance ($\Delta$x) to the outer surface of the rotor hub 11. In measuring the translation rigidity, the arc nozzle 12 is positioned on one side of the rotor hub 11 and the capacitance prove 13 is located on the other side.

Figure 7:
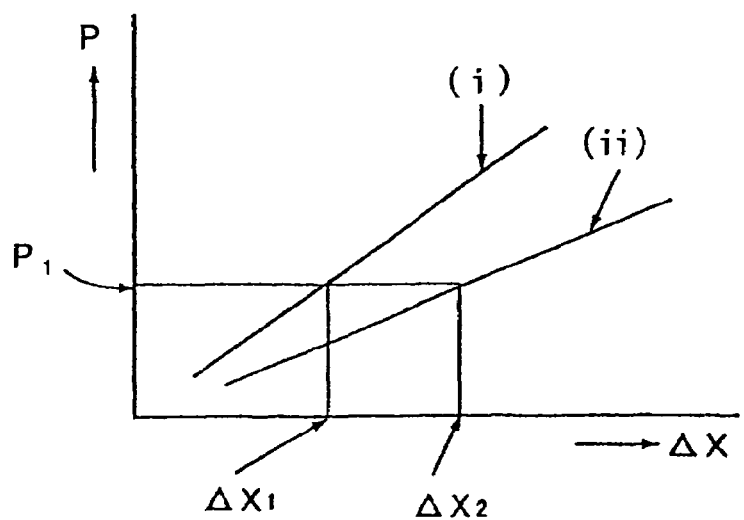
FIG. 7 is a graph showing an evaluation index with use of the evaluation equipment of FIG. 6.

FIG. 7 is a graph having a vertical axis representative of the external force P and horizontal axis representative of the variation of distance ($\Delta$x). If the external force P is applied with the sample (i) and (ii), and the variations of distance ($\Delta$x) of the samples (i) and (ii), respectively, as shown in FIG. 7, then the rigidity of the sample (i) is determined greater than that of sample (ii). The gradients of the lines (i) and (ii) are indicated as an indexes in Tables 2 and 3.

The shaft 1 and the sleeve 2, which have standard dimensions with circularity deviation and cylindricality finished with the accuracy of the class 4 defined by the JIS (Japanese Industrial Standard) B 0401 "System of Limits and Fits", were prepared. Then, the shaft 1 and the sleeve 2 were selected and fit together to make a hydrodynamic bearing assembly with the total radial gap along the diameter of 5 microns or less. The annular groove 8 was provided substantially in the mid portion of the shaft 1. The specification of the annular groove 8 is indicated as dimension ratios of Sample Nos. 1-1 to 1-10. Also in Table 1, the translation rigidity and the tilt rigidity influenced by the annular groove 8 alone without forming the longitudinal groove 9 are indicated as the gradients of FIG. 7, which were obtained by means of the evaluation equipment of FIG. 6. The alphabet L and J are representative of the longitudinal length along the axis direction of the bearing assembly and the diameter of the shaft 1, respectively.

TABLE 1

| Sample No. | Width ratio of annular groove (b/L) | Depth ratio of annular groove (t/J) | Trans. rigidity | Tilt rigidity |
|---|---|---|---|---|
| *1-1 | No annl. grv. | No annl. grv. | 1 | 0 |
| *1-2 | 0.3 | 0.1 | 0.05 | 0.2 |
| *1-3 | 0.3 | 0.01 | 0.08 | 2 |
| *1-4 | 0.3 | 0.005 | 0.1 | 3 |
| *1-5 | 0.2 | 0.1 | 0.06 | 2 |
| 1-6 | 0.2 | 0.01 | 0.8 | 10 |

TABLE 1-continued

| Sample No. | Width ratio of annular groove (b/L) | Depth ratio of annular groove (t/J) | Trans. rigidity | Tilt rigidity |
|---|---|---|---|---|
| 1-7 | 0.2 | 0.005 | 0.9 | 15 |
| *1-8 | 0.1 | 0.1 | 0.08 | 2 |
| 1-9 | 0.1 | 0.01 | 0.8 | 8 |
| 1-10 | 0.1 | 0.005 | 1.0 | 20 |

*comparative data

As can be seen from Table 1, if the width ratio of the annular groove 8 is 0.2 or more, the translation rigidity is noticeably reduced because of the increase the total volume of the gap in the bearing assembly. However, if the depth ratio of the annular groove 8 is 0.01 or less, then the translation rigidity is substantially improved. Apparently, the tilt rigidity is improved due to the existence of the annular groove 8 but insufficiently. As can be seen from Table 1, if the width ratio of the annular groove 8 is set to be 0.01 or less, and if the depth ratio of the annular groove 8 is set to be 0.2 or less, then the tilt rigidity can be remarkably improved without reducing the translation rigidity by the synergism effect.

Figure 5:
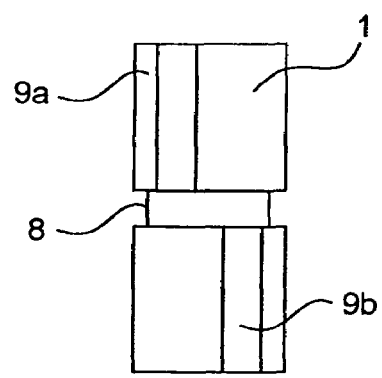
FIG. 5 is a side view of the another embodiment of the hydrodynamic bearing assembly according to the present invention.
Figure 8:
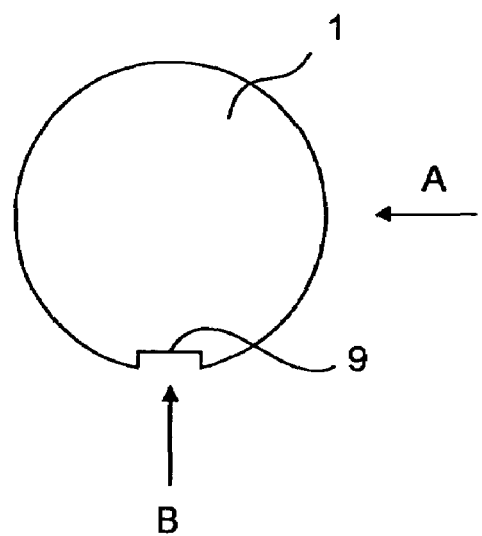
FIGS. 8(*a*) to 8(*d*) are cross sectional views of the shaft illustrating the direction of the external force relative to the longitudinal grooves.
Figure 8:
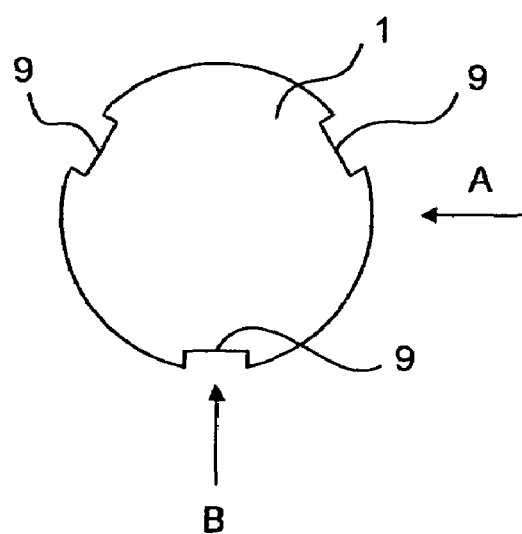
Figure 8:
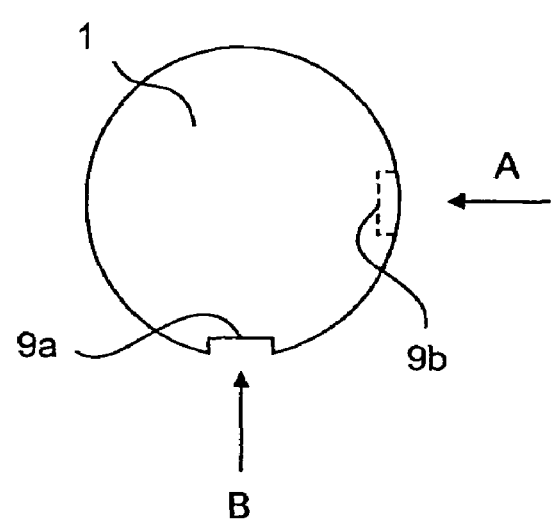
Figure 8:
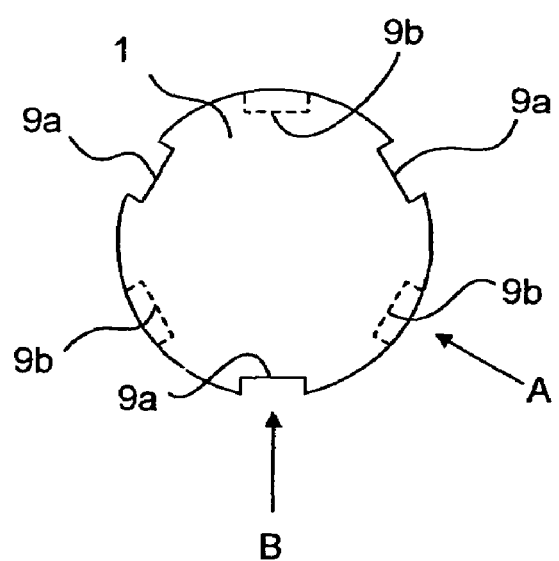

Next, the present inventors investigated how the position of the numbers of the longitudinal grooves 9, and the direction of the external force gives impact on the translation rigidity and the tilt rigidity. Four samples of the shaft 2 having various longitudinal grooves 9 were prepared. FIG. 8 illustrates the cross section of those samples of the shafts. Prepared were the first Sample 2-1, FIG. 8(a) having only one longitudinal groove 9 extending across the annular groove 8 as shown in FIG. 4, the second Sample 2-2, FIG. 8(b) having three longitudinal groove 9 extending across the annular groove 8 with a regular angular interval, the third Sample 2-3, FIG. 8(c) having an upper longitudinal groove 9a and a lower longitudinal groove 9b shifted by 90 degrees relative to the upper one as shown in FIG. 5, and the fourth Sample 2-4, FIG. 8(d) having three upper longitudinal grooves 9a and three lower longitudinal grooves 9b with a regular angular interval and shifted by 60 degrees relative to the upper ones. Each sample has the identical annular groove 8 provided substantially in the mid portion having the depth ratio (the depth relative to the diameter of the shaft) of 0.01 or less and the width ratio (the width relative to the diameter of the shaft) of 0.2 or less. Also, each sample has the longitudinal groove having the same rectangular cors section and the same width ratio (the width relative to the diameter of the shaft) of 0.005. With use of the evaluation equipment of FIG. 6, the translation rigidity and the tilt rigidity were measured with the index (gradient) shown in FIG. 7, when the external force was applied to the directions as indicated by arrows in FIG. 8.

TABLE 2

| | | Trans. Rigidity | | Tilt Rigidity | |
|---|---|---|---|---|---|
| Sample No. | FIG. 8 | A | B | A | B |
| *2-1 | (a) | 1.0 | 0.6 | 16 | 15 |
| *2-2 | (b) | 1.0 | 0.5 | 17 | 16 |
| 2-3 | (c) | 0.9 | 0.9 | 20 | 18 |
| 2-4 | (d) | 0.8 | 0.8 | 18 | 17 |

*comparative data

As can be seen, the comparative samples (2-1) and (2-2) have the translation rigidity against the external force in the A direction greater than that in the B direction, although the samples (2-3) and (2-4) according to the embodiment have the same translation rigidity against the external force in the A and B directions. Also, the samples (2-3) and (2-4) advantageously have the tilt rigidity against the external forces in both directions greater than those of the comparative samples (2-1) and (2-2) because the position of the gaps are radially spread.

The longitudinal grooves 9 can be formed with use of any appropriate processes such as the plasma etching, the shot-blasting, the laser-abrading, the grinding, and the turn-chiseling. Although the embodiment has been discussed as the annular grooves 8 and the longitudinal grooves 9 are provided on the outer surface of the stationary member of the shaft 1, it should be understood that the similar effect can be expected if the annular grooves 8 and the longitudinal grooves 9 are provided on the inner surface of the sleeve 8 when the sleeve 2 is the stationary member.

Fourth Embodiment

Figure 9:
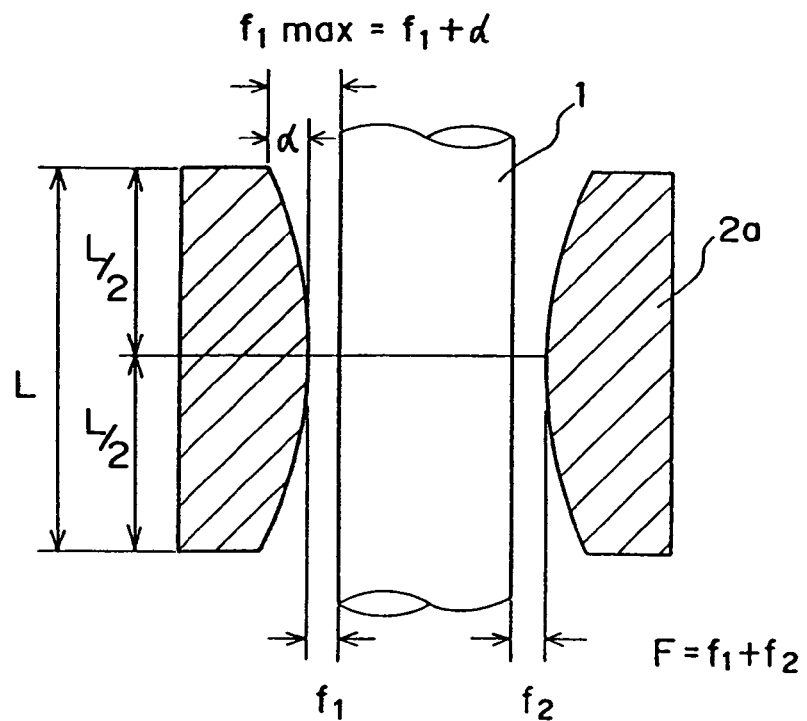
FIG. 9 is a cross sectional view of another embodiment of the hydrodynamic bearing assembly according to the present invention.

The fourth embodiment of the hydrodynamic bearing assembly according to the present invention, which mainly address improving the bearing rigidity, will be described hereinafter, with reference to drawings. FIG. 9 is a cross section of the bearing assembly of the embodiment, illustrating the shaft 1 and the sleeve 2a rotatably arranged around the shaft 1. According to the embodiment, while the shaft 1 is straight and has the transverse circular cross section as being even along the bearing axis, the sleeve 2a has the transverse cross section with an inner diameter continuously increasing towards to the upper and lower ends.

In FIG. 8, when the bearing sleeve 2a has the length L along the axis, the gap between the shaft 1 and the sleeve 2a is the minimum at the position of L/2 from the both edges of the sleeve 2a. When the left side gap and the right side gap between the shaft 1 and the sleeve 2a have the sizes of f1 and f2 at the position of L/2 from the edges, the total gap F at the same position is;

$F=f1+f2$

If the shaft 1 and sleeve 2a are arranged concentrically to each other, then the f1 equals to f2 (f1=f2), which is referred to as a one-side minimum gap f. Thus, the total gap F is 2f (F=2f). The embodiment advantageously has the total gap F to be minimum at the position of L/2 from the edges, the position causing the total gap F to be minimum is unnecessarily the exact mid portion, rather it may be adjacent to the mid portion.

The gaps at the end positions of the sleeve 2a is the maximum, and the left side maximum gap and the right side maximum gap between the shaft 1 and the sleeve 2a have the sizes of f1max and f2max at the end positions.

$f1max=f1+\alpha$ wherein α stands for the increased gap relative to that at the mid position. If the shaft 1 and sleeve 2a are arranged concentrically to each other, then the one-side maximum gap fmax at the end positions is;

$fmax=f+\alpha$

Figure 10:
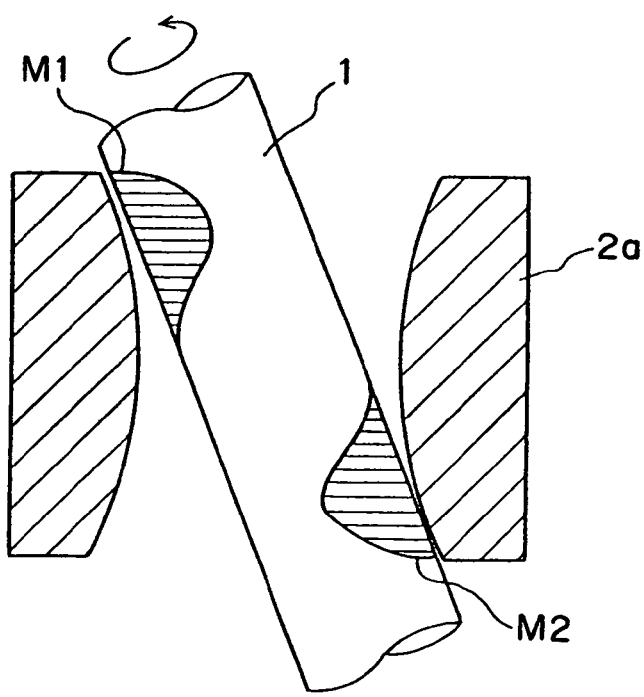
FIG. 10 is a cross sectional view of the hydrodynamic bearing assembly in FIG. 9 during the rotation thereof.

FIG. 10 shows the shaft 1 and sleeve 2a of FIG. 9 during the rotation. The shaft 1 is inclined relative to the shaft 2a because of an external biasing force as will be described below. The gaps become narrower adjacent left upper portion M1 and the right lower portion M2 in FIG. 10, when the spindle motor includes shaft 1 rotating inside the sleeve 2a. The narrower gap generates the higher dynamic pressure, thereby to keep the shaft 1 and the sleeve 2a away from each other during the rotation. This is also true for the spindle motor including sleeve 2a rotating around the shaft 1.

The parallel lines indicated adjacent to the end positions M1 and M2 in FIG. 10, schematically illustrate the dynamic pressure distribution. In order to minimize the whirl of the shaft 1 of the motor during the rotation, the dynamic pressures generated adjacent to the end positions M1 and M2 have to be increased across the extensive area by designing the configuration of the outer surface of the sleeve 2a so that it has tangential lines substantially parallel to the outer surface of the inclined shaft 1 across the wide area.

Figure 11:
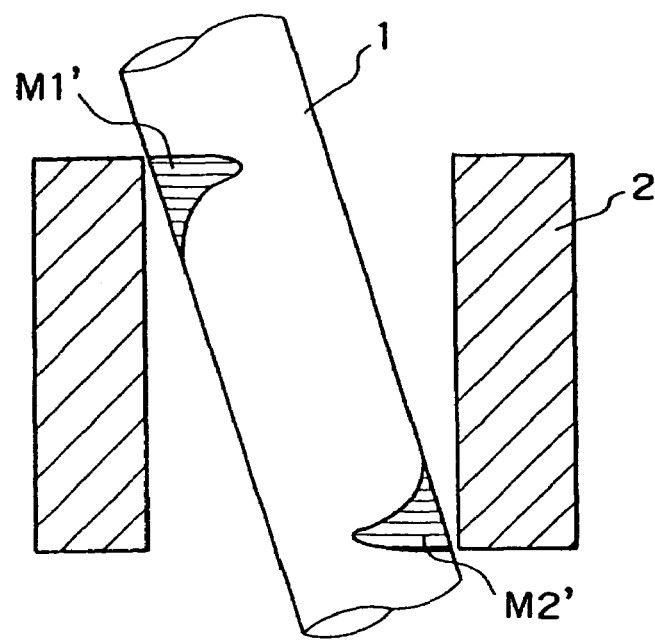
FIG. 11 is a cross sectional view of the conventional hydrodynamic bearing assembly during the rotation thereof.

As can be more clearly understood in comparison with the conventional bearing assembly of FIG. 11, the dynamic pressure adjacent to the end positions M1' and M2' are poorly or unsatisfactorily generated as shown by the parallel lines in FIG. 11, when the shaft 1 is inclined relative to the sleeve 2 and the edge portions of the shaft 1 advance towards the sleeve 2. Because of the insufficient dynamic pressure, when the shaft 1 is externally biased to tilt relative to the sleeve 2 during the rotation, the sleeve 2 is likely contact with the shaft 1 and eventually, a good endurance can hardly be expected for the bearing assembly.

Figure 12:
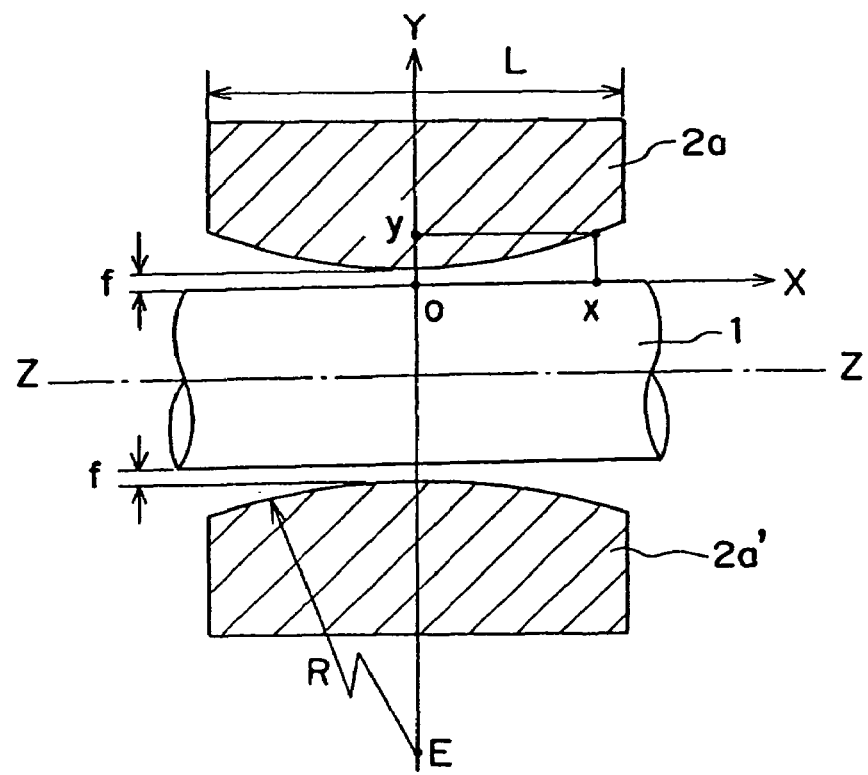
FIG. 12 is a cross sectional view of the hydrodynamic bearing assembly in FIG. 9 illustrating various dimensions thereof.

The configuration of the inner surface of the sleeve 2a of the bearing assembly according to the embodiment, which the present inventors have found advantageous, will be described hereinafter, with reference to the drawings. FIG. 12 is a drawing similar to FIG. 9, but is turned by 90 degrees. The shaft 1 and the sleeve 2a are arranged concentrically. The minimum gaps f are defined between the shaft 1 and the sleeve 2a at the mid portion along the axis. It should be noted that the drawing is separated by the centerline Z-Z of the bearing axis, thus, the upper and lower parts of the drawing illustrate different configuration of the sleeve 2a and are combined together for a simple description.

Firstly, the configuration of the sleeve 2a indicated above the centerline Z-Z of FIG. 12, will be described hereinafter. The origin O is defined by the crossing point of the line perpendicular to the axis and extending through the middle point of the sleeve 2a, and the line of the outer surface (upper edge) of the shaft 1. Also, the X-Y coordinate system is defined including the X-axis parallel to the bearing axis and the Y-axis perpendicular to the X-axis. Then, the gap (y-value) of the advantageous configuration of the sleeve 2a at the position away from the origin (x-value) is defined by the following equation;

$y=k*x^2+f$ (k: constant)

The advantageous configuration of the sleeve 2a has a parabolic curve in the drawing. Thus, the above equation can be represented as follows;

$(y-f) \propto x^2$

This means that the increased gap α, i.e., (y−f) towards both edges of the sleeve 2a is proportional to the square of the distance from the center of the sleeve 2a.

Another favorable configuration of the sleeve 2a has an arc curve instead of the parabola curve. In general, the hydrodynamic bearing assembly has the length L of approximately 20 millimeters, the gap of several microns, and the tilt angle of the shaft relative to the sleeve of approximately 0.05 degrees, which are extremely small values. Thus, the parabola curve can be replaced by a portion of the arc curve having a great radius. The favorable configuration of the sleeve 2a is shown in the lower part of FIG. 12. As mentioned above, the upper and lower parts of the drawing shows different configurations of the sleeve 2a and 2a'. The advantageous configuration of the sleeve 2a' can be defined by the arc (a part of circle) having a center on the y-axis and the radius R expressed by the following formula;

$$R = z*L^2/4f$$

wherein z has a constant value in range within 0.8 to 1.2.

The present inventors have conducted another experiment for the bearing assembly according to the present invention. The bearing assembly has the rotating components including the rotor of 0.1 kilograms weight, and rotates at the rotation rate of 20,000 rpm. Also, the shaft has the diameter of 10 millimeters and the bearing assembly has the length of 20 millimeters. The bearing assembly was oscillated right and left by 90 degrees at the oscillation rate of 90 degrees per 2 seconds. The oscillation number applied to the bearing assembly was counted until the bearing assembly has a malfunction such as the seizure of the shaft and the abrasion waste. The result is indicated in Table 3.

TABLE 3

| | Config. Outter Shaft | Config. Inner Sleeve | Rad. Curve | Min. Gap | Cnt | Oscl. Num. |
|---|---|---|---|---|---|---|
| 3-1 | straight | convex | 80 m | 2 μm | YES | 200,000 |
| 3-2 | straight | convex | 160 m | 1 μm | NO | over 400,000 |
| *3-3 | straight | straight | — | 2 μm | YES | 10,000 |
| *3-4 | straight | concave | 80 m | 2 μm | YES | 1,000 |

*comparative data

Sample (3-1) has the sleeve 2a of the convex configuration with the minimum diameter at the mid portion thereof, and the straight shaft. Also, the inner surface of the sleeve 2a has the radius of 80 meters, and the minimum diameter gap is 2 microns. The hydrodynamic bearing assembly was oscillated around an axis perpendicular to the rotation axis during the rotation. Then, although contacts between the shaft and sleeve were observed, the bearing assembly of Sample (3-1) worked against 200,000 oscillations, and then had a malfunction.

Sample (3-2) is formed similarly to Sample (3-1) except that it has the radius of 160 meters and the minimum diameter gap of 1 micron. The bearing assembly of Sample (3-2) worked bearing against 400,000 oscillations without problems.

Sample (3-3) is the conventional bearing assembly having the straight outer surface of the shaft and the straight inner surface of the sleeve, and also having the minimum diameter gap of 2 microns. The bearing assembly of Sample (3-3) was observed as being worn after 10,000 oscillations.

Sample (3-4) of the bearing assembly has the straight outer surface of the shaft and the concave inner surface of the sleeve with the maximum inner diameter at the middle portion, and also has the minimum diameter gap of 2 microns. The bearing assembly of Sample (3-4) was observed as being worn out after 1,000 oscillations.

Fifth Embodiment

Figure 13:
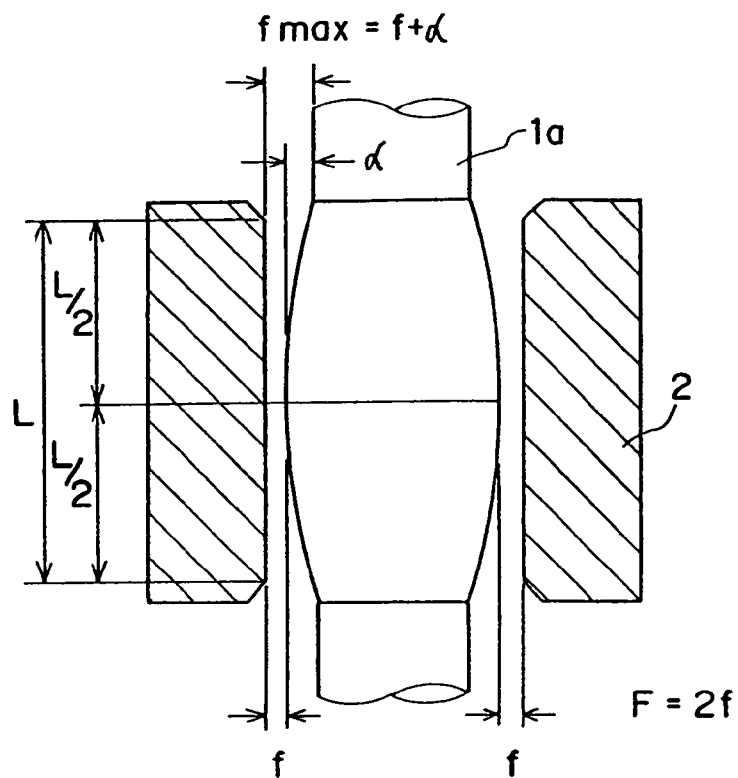
FIG. 13 is a cross sectional view of further another embodiment of the hydrodynamic bearing assembly according to the present invention.

The fifth embodiment of the hydrodynamic bearing assembly according to the present invention, which mainly address improving the bearing rigidity, will be described hereinafter, with reference to drawings. FIG. 13 is a cross section of the hydrodynamic bearing assembly of the embodiment, illustrating sleeve 2 around the shaft 1a with a predetermined gap F. According to the embodiment, while the sleeve 2 is straight and has the transverse circular cross section as being even along the bearing axis, the shaft 1a has a barrel configuration, and also has the transverse cross section with an outer diameter continuously decreasing towards to the upper and lower ends.

Similar to the fourth embodiment, in the hydrodynamic bearing assembly of the embodiment, the bearing sleeve 2 has the length L along the axis, the gap between the shaft 1a and the sleeve 2 is the minimum at the position of L/2 from the both edges of the sleeve 2. When the shaft 1a and sleeve 2 are arranged concentrically to each other, the gap between the shaft 1a and the sleeve 2 is minimized adjacent the middle portion, which is referred to as the one-side minimum gap f. Again similarly, the gap is maximumized adjacent the end portions of the sleeve 2, which is referred to as the one-side maximum gap fmax. The difference between the maximum gap fmax and the minimum gap f corresponds to the increased gap α. In the embodiment, the position causing the total gap F to be minimum is unnecessarily the exact middle portion, rather it may be adjacent to the middle portion.

Figure 14:
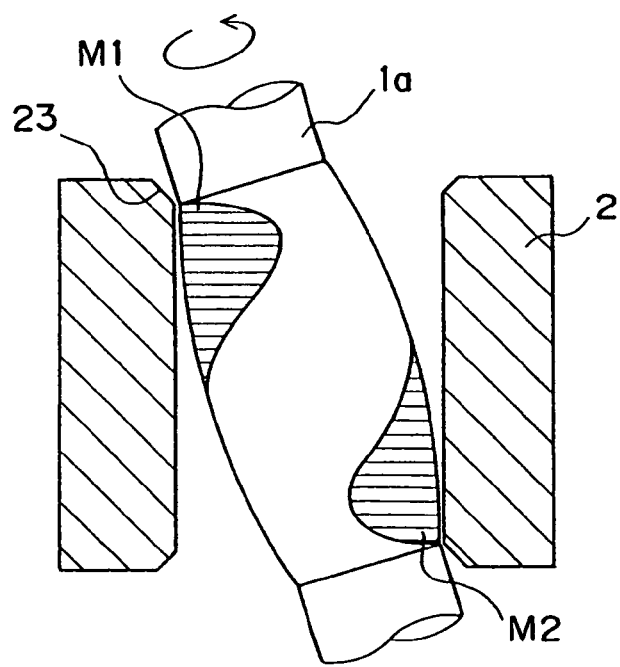
FIG. 14 is a cross sectional view of the hydrodynamic bearing assembly in FIG. 13 during the rotation thereof.
Figure 15:
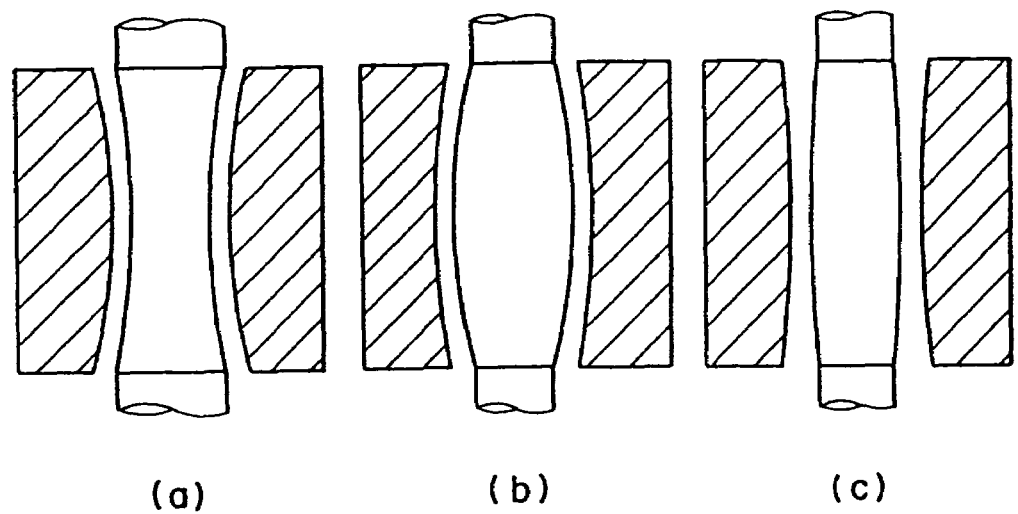
FIGS. 15(a) to 15(c) are cross sectional views of the another embodiments of the hydrodynamic bearing assembly according of the present invention, illustrating a couple of combinations of the shaft and sleeve.

FIG. 14 shows the shaft 1a and sleeve 2 of FIG. 13 during the rotation. The shaft 1a is inclined relative to the shaft 2a because of the external biasing force. The gaps become narrower adjacent left upper portion M1 and the right lower portion M2 in FIG. 10, when the spindle motor includes shaft 1a rotating inside the sleeve 2. The narrower gap generates the higher dynamic pressure, thereby to keep the shaft 1a and the sleeve 2 away from each other during the rotation. This is also true for the spindle motor including sleeve 2 rotating around the shaft 1a.

The parallel lines indicated adjacent to the end positions M1 and M2 in FIG. 14, schematically illustrate the dynamic pressure distribution. In order to minimize the whirl of the shaft 1a of the motor during the rotation, the dynamic pressures generated adjacent to the end positions M1 and M2 have to be increased across the extensive area by designing the configuration of the outer surface of the sleeve 2a so that it has tangential lines substantially parallel to the outer surface of the inclined shaft 1 across the wide area.

The advantageous configuration of the inner surface of the sleeve 2a of the bearing assembly according to the fourth embodiment is applied to the configuration of the outer surface of the shaft 1a of the bearing assembly according to the present embodiment. Thus, while the related drawing is omitted, the origin O is defined by the crossing point of the line perpendicular to the axis and extending through the middle point of the sleeve 2, and the line of the inner surface of the sleeve 2a. Also, the X-Y coordinate system is defined including the X-axis parallel to the bearing axis and the Y-axis perpendicular to the X-axis. Then, the gap (y-value) of the advantageous configuration of the shaft 1a at the position away from the origin (x-value) is defined by the following equation;

$$y = k*x^2 + f \text{ (k: constant)}$$

The advantageous configuration of the shaft 1a has a parabolic curve in the drawing. Thus, the above equation can be represented as follows;

$$(y-f) \propto x^2$$

This means that the increased gap α, i.e., (y−f) towards both edges of the shaft 1a is proportional to the square of the distance from the center of the shaft 1a.

The another favorable configuration of the shaft 1a has an arc curve instead of the parabola curve. Again similar to the fourth embodiment, the advantageous configuration of the shaft 1a is convex at the middle portion, and can be defined by the arc (a part of circle) having a center on the y-axis and the radius R expressed by the following formula;

$$R=z*L^2/4f$$

wherein z has a constant value in range within 0.8 to 1.2.

In FIG. 14, the sleeve 2 includes the bevel portions at the end positions of the sleeve 2 in order to avoid the interference between the shaft 1a and the sleeve 2, when the shaft 1a is inclined relative to the sleeve 2. Alternatively, the convex configuration of the shaft 1a may slightly be extended towards the sleeve 2, instead of forming the bevel portions.

Sixth Embodiment

The sixth embodiment of the hydrodynamic bearing assembly according to the present invention, which addresses improving the bearing rigidity, will be described hereinafter, with reference to drawings. In the vertical cross section of the hydrodynamic bearing assembly of the fourth and fifth embodiments, either one of the shaft and the sleeve has one of the opposing surface of the straight configuration and the other one of the concave or convex curve so that both surfaces oppose parallel with gaps during the rotation even when inclined to each other. Meanwhile, the hydrodynamic bearing assembly of the embodiment includes the shaft and the sleeve both having opposing surface which are convex or concave to realize the similar advantages.

A number of combinations can be conceived for the inner surface of the sleeve and the outer surface of the shaft. The configuration of the inner surface of the sleeve illustrated in FIG. 9 (the fourth embodiment) is referred to as the convex sleeve, and the configuration of the outer surface of the shaft illustrated in FIG. 13 (the fifth embodiment) is referred to as the convex shaft, hereinafter. Then, the combinations of the curved shaft and the sleeve are; (a) the concave shaft and convex sleeve, (b) the convex shaft and concave sleeve, and (c) the convex shaft and convex sleeve. The combination of the concave shaft and concave sleeve is impractical in condition. It should be noted that in any above combinations, the gaps formed between the shaft and the sleeve are increased towards the edge portions along the axis in a continuous and interrupted manner. Also, the gaps are such that the outer surface of the shaft and the inner surface of the sleeve faces substantially parallel adjacent the end portions (the tangential lines for both of outer and inner surfaces are substantially parallel as can be seen in the vertical cross sections), when inclined to each other. In addition, preferably, the configurations (curves) of the shaft and sleeve are smooth without any discrete points.

As discussed above, in accordance with the fourth through sixth embodiments, if the shaft and the sleeve are arranged concentrically to each other, then the one-side maximum gap fmax at the end positions is;

$$fmax=f+\alpha$$

Thus, the gap is increased by α at the end positions. Since the shaft is more inclined relative to the sleeve as the increased gap α is greater, the increased gap α is preferably minimized. According to the embodiment, the increased gap α is preferably about 2 microns or less, and more preferably about 1 micron or less, however, if it is about 0.1 micron or less, then the aforementioned effects can not be achieved because it is too small.

Figure 16:
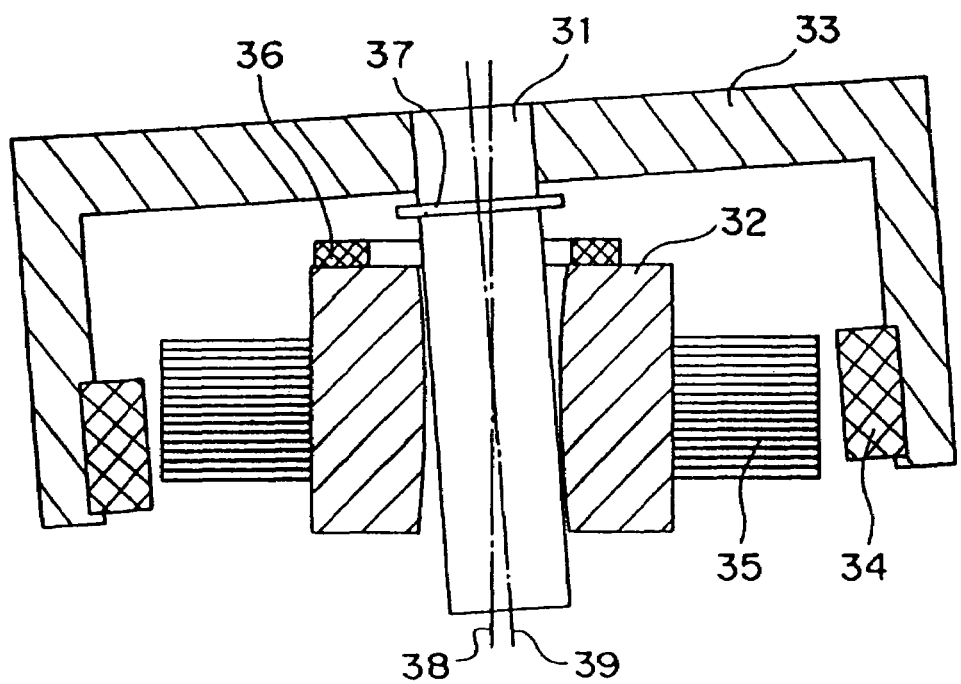
FIG. 16 is a cross sectional view of the spindle motor incorporating the hydrodynamic bearing assembly in FIG. 9.

The fourth through sixth embodiments have been discussed for mainly improving the bearing rigidity by inclining to rotate either one the shaft and the sleeve relative to the other towards the predetermined direction. A device for biasing and inclining either one of the shaft and the sleeve relative to the other towards the predetermined direction will be described hereinafter. FIG. 16 illustrates one example of the biasing device. In FIG. 16, the bearing assembly comprises the shaft 31 and the sleeve 32 arranged around the shaft, in which the sleeve 32 has the inner surface diameter increasing towards the ends of the sleeve 32. The shaft 31 has the rotor 33 secured thereon. The rotor 33 has a skirt with an inner surface provided with a rotor magnet 34, which opposes to the stationary stator 35 secured on the sleeve 32. A ring-shape magnet 36 is attached on the top surface of the sleeve 32, which is eccentric to the axis of the sleeve 32 and opposes to an another ring-shaped magnet 37 provided around the shaft 31. Both magnets 36 and 37 are arranged so that the repulsion force is generated between them.

In the spindle motor so constructed, when a coil (not shown) wound on the stator 35 is energized by the electric flow, to thereby generate the attraction force (or the repulsion force), the rotor 33 rotates with the shaft 31 relative to the sleeve 32. The rotor 33 is kept away from the sleeve 32 due to the repulsion force between two ring-shaped magnets 36 and 37. As described above, the ring-shaped magnet 36 is eccentric to the ring-shaped magnet 37, when the repulsion force is the greatest at the position where two ring-shaped magnets 36 and 37 are closest. This force biases and inclines the shaft in the direction from the closest position to the farthest position. In the drawing, the reference numeral 38 denotes the central axis of the sleeve 32 and the reference numeral 39 denotes the rotation axis of the sleeve 32.

As discussed above, when the shaft 31 is inclined and rotated relative to the sleeve 32, the dynamic pressure generated between the shaft 31 and the sleeve 32 adjacent the portions where the both are closer to each other. The dynamic pressure is such force that the sleeve 32 pushes the shaft 31 away. Therefore, the repulsion force by the magnets 36, 37 and the dynamic pressure together balance the sleeve 32 and the shaft 31, thereby to realize the relative rotation in a stable manner.

In FIG. 16, the ring-shaped magnets 36 and 37 are eccentrically positioned on the top surface of the bearing assembly. However, those eccentric magnets may be provided on the bottom surface of the bearing assembly at such portion that the repulsion force by the magnets biases the shaft in the same direction. Also, two pairs of eccentric magnets may be provided on both top and bottom surfaces of the bearing assembly as well for inclining the shaft in a even more stable manner.

Although FIG. 16 illustrates the shaft 31 as being the rotational member and the sleeve 32 as being the stationary member, they may be changed with each other. In this instance, the eccentric magnet has to be provided on the stationary member. Also, the attraction force, instead of the repulsion force, between the magnets can be used to bias the shaft to the predetermined direction. In this case, one of the magnet may be substituted by a ferromagnet.

Seventh Embodiment

Figure 17:
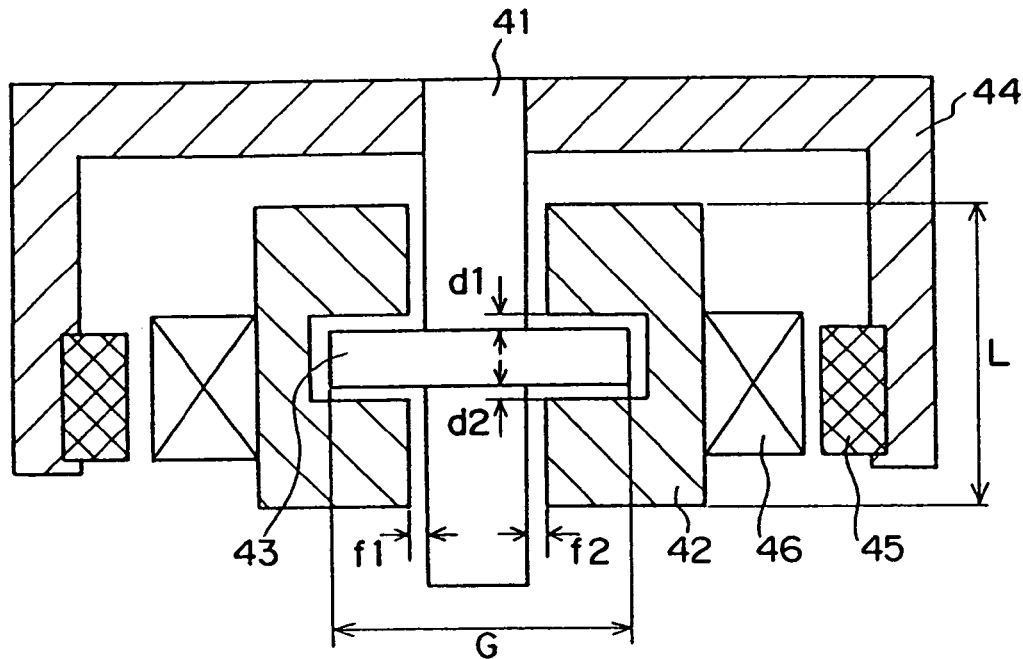
FIG. 17 is a cross sectional view of the spindle motor incorporating the hydrodynamic bearing assembly according to further another embodiment of the present invention.

The seventh embodiment of the hydrodynamic bearing assembly according to the present invention, which mainly addresses improving the bearing rigidity, will be described hereinafter, with reference to drawings. FIG. 17 illustrates one example of the spindle motor incorporating the hydrodynamic bearing assembly of the embodiment. In the drawing, a disk-shaped thrust plate 43 is arranged on a portion of a shaft 41, extending in a plane perpendicular to the bearing axis. The shaft 41 and the thrust plate 43 are received within a sleeve 42, with a predetermined gap therebetween. A plurality of grooves for generating the dynamic pressure are formed either on opposing surfaces of the shaft 43 and the sleeve 42. In other words, the hydrodynamic bearing assembly has the thrust bearing between a pair of the radial bearings. A rotor 44 secured on the shaft 41 has a skirt with the inner surface provided with a rotor magnet 45. The rotor magnet 45 opposes to a stator 46 secured on the sleeve 42.

In the operation of the spindle motor so constructed, the electric current provided with the stator 46 generates the attraction and/or the repulsion forces between the stator 46 and the rotor magnet 45 to generate the rotational driving force of the rotor 44 having the rotor magnet 45, thereby to rotate the rotor 44 together with the shaft 41. This rotation defines the hydrodynamic bearings, in which the shaft 41 and the thrust plate 43 rotate relative to the sleeve with the predetermined gap therebetween.

According to the embodiment, a thrust tilt angle is defined as an angle when the opposing surfaces of the thrust plate 43 and the sleeve 42 are in contact with each other, also a radial tilt angle is defined as an angle when the outer surface of the shaft 41 and the inner surface of the sleeve 42 are in contact with each other. The hydrodynamic bearing assembly according to the embodiment has the thrust tilt angle greater than the radial tilt angle to prevent the thrust plate 43 from contacting with the sleeve 42.

Figure 18:
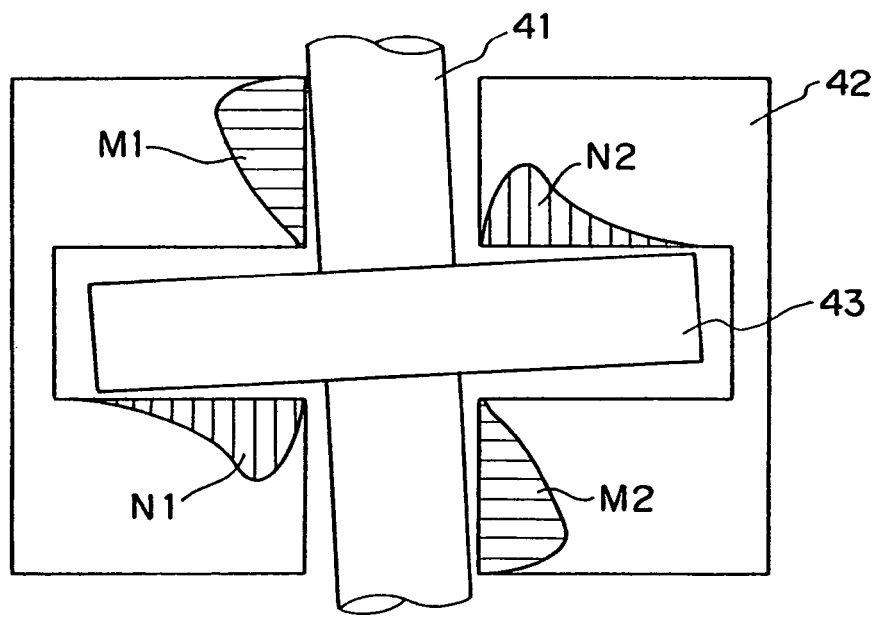
FIG. 18 is a cross sectional view of the hydrodynamic bearing assembly in FIG. 17, illustrating the dynamic pressures in the bearings.

FIG. 18 is an enlarged view of the bearing. Similar components are denoted by similar reference numerals. The inclined shaft 41 generates the dynamic pressure distributions in the radial and thrust bearings as schematically illustrated by the parallel lines M1, M2 and N1 N2, respectively, in the drawing.

When the shaft 41 is inclined relative to the sleeve 42, the narrower gap between the shaft 41 and the sleeve 43 generates the higher dynamic pressure adjacent the portions denoted by M1 and M2 in the radial bearing. The higher dynamic pressure bears the shaft 41 against further tilt to keep it away from the sleeve 42 (non-contact). Meanwhile, since the hydrodynamic bearing assembly is one of the pump-in type and the fluid is conducted from the circumference of the trust plate 43, the dynamic pressure distribution cannot have a peak, rather a relative low dynamic pressure at the circumference. Thus, when the thrust plate 43 is inclined and the opposing surfaces of the sleeve 42 is close the thrust plate 43, the moment generated is unlikely enough to bear against the external motion.

Referring back to FIG. 17, several dimensions in the drawing will be defined hereinafter. The radial bearing has the length of L. The shaft 41 has the right-side gap f1 and left-side gap f2 relative to the sleeve 42 as well as the total gap F (F=f1+f2). The trust bearing has the outer diameter G. The thrust plate 43 has the upper gap d1 and the lower gap d2 relative to the opposing surface of the sleeve 42 as well as the total gap D (D=d1+d2). When the external motion is applied so that the shaft is inclined relative to the sleeve, the radial bearing has the dynamic pressure sufficient to bear the shaft against the further tilt prior to the contact between the thrust plate 43 and the opposing surface of the sleeve 42 for keeping them away from each other.

Should there be no thrust plate 43, then the shaft 41 could be inclined relative to the sleeve 42 at the greatest angle of F/L. On the other hand, should there be no shaft 41, then the thrust plate 42 could be inclined relative to the sleeve 42 at the greatest angle of D/G. As mentioned above, in order for the radial bearing to have the dynamic pressure great enough to prevent the contact between the thrust plate 42 and the opposing surface of the sleeve 42, the greatest angle F/L in the radial bearing is to be less than the greatest angle D/G in the thrust bearing. Thus, the contact in the thrust bearing is avoided, when the following condition is satisfied.

$$(F/L) < (D/G)$$

In case where the shaft 41 and sleeve 42 may be processed to have some circularity deviation and cylindricality, the dimensions F and D are regarded as the average length and the diameter, respectively.

In the embodiment, the tilt of the shaft 41 (and/or the thrust plate 43) relative to the shaft 42 has been discussed. The dynamic pressure is unlikely generated in the thrust bearing for bearing against the external motion to return to the normal position when the thrust plate 43 is inclined to the opposing surface of the sleeve 42. However, when the axis of the shaft 41 is maintained parallel to the bearing axis, the thrust plate 43, as a whole, generates a force enough for supporting the shaft 41. To this end, the gap in the radial bearing is much narrower than the gap in the thrust bearing so that the thrust plate 43 vertically shifts in parallel with the opposing surface of the sleeve 42 to prevent the thrust plate 43 from contacting with the sleeve 42.

According to the prior arts, while the radial gap along the diameter is 6 to 10 microns (the on-side radial gap along the radius is 3 to 5 microns), the thrust gap is along the bearing axis is 4 to 6 microns, thus, the ratio thereof is about 1. However, as the details will be described later, the experiments that the present inventors have conducted revealed that those radial and thrust gaps are insufficient, they are required to satisfy at least the following condition;

$$2F < D$$

Preferably, $$4F < D$$

Therefore, in general, the radial gap F and the thrust gap D are required to have following relation to avoid the contact in the thrust bearing in the embodiment;

$$kF < D \text{ (k is constant in the range of 2 to 10)}$$

Figure 19:
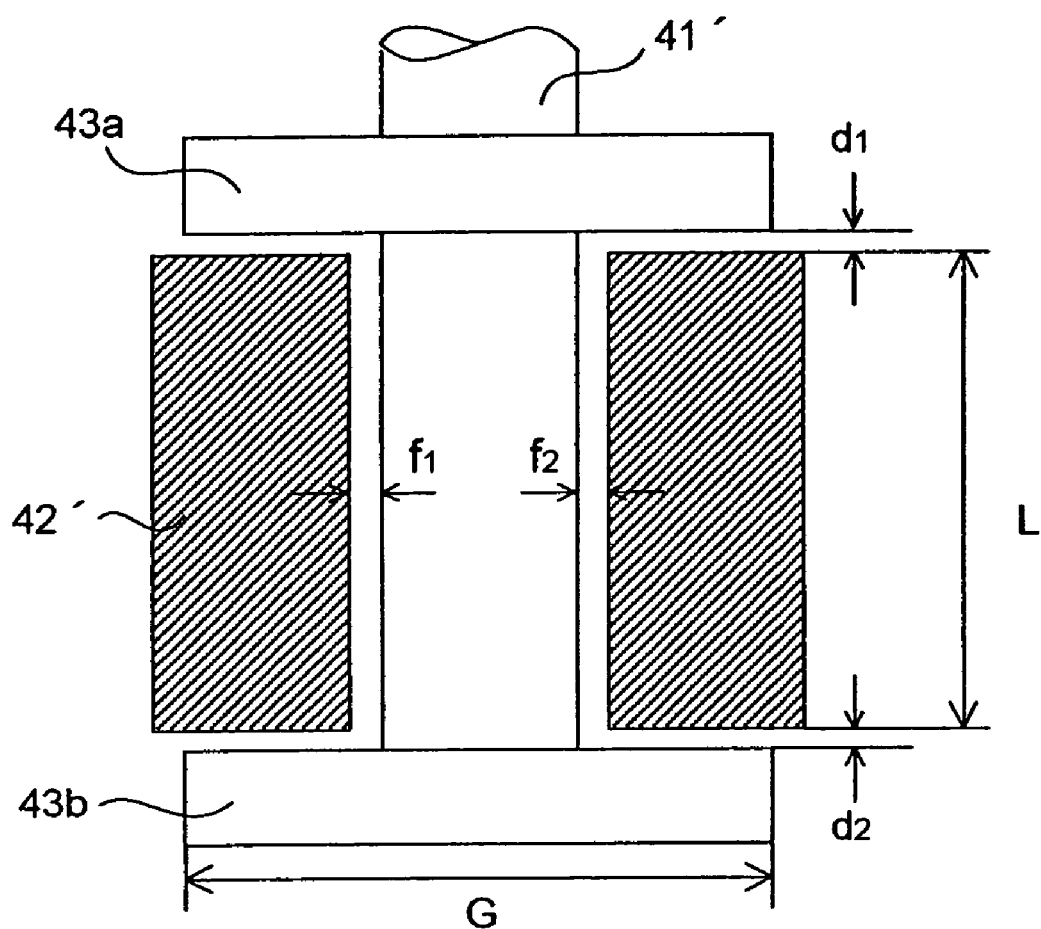
FIG. 19 is a cross sectional view of the alternative hydrodynamic bearing assembly in FIG. 17.

Although discussions have been made above for the hydrodynamic bearing assembly illustrated in FIG. 17, in which the thrust bearing is arranged between the pair of radial bearings, the present invention can also be applied to the hydrodynamic bearing assembly illustrated in FIG. 19, in which a pair of the thrust bearing 43a and 43b sandwich the sleeve 42'. In FIG. 19, the pair of the thrust bearings 43a and 43b is secured to the shaft 41', the sleeve 42' is arranged between the thrust bearings to define a pair of the thrust bearings adjacent to the upper and lower ends of the sleeve 42'. The thrust bearings have the upper gap d1 and the lower gap d2 relative to the opposing surfaces of the sleeve 42 as well as the total gap D (D=d1+d2). Also, the radial bearing has the right-side gap f1 and the left-side gap f2 as well as the total gap F (F=f1+f2). Then, the contact in the thrust bearing is avoided, if the thrust tilt (gradient) of D/G is less than the radial thrust tilt (gradient) of F/L, i.e. the following condition is met;

$$(F/L)<(D/G)$$

Further, preferably, the following condition is met;

$$kF<D \text{ (k is constant in the range of 2 to 10)}$$

In general, a hydrodynamic bearing assembly, in which a radial bearing is arranged between a pair of the thrust bearings, or a thrust bearing is arranged between a pair of the radial bearings, have the thrust gap satisfying the above-mentioned conditions to prevent the contact in the thrust bearing.

Alternatively, although the aforementioned disclosure is made for the relation between the radial gap and the thrust gap, the extremely narrow radial gap causes the thrust plate 43 without meeting the above conditions to be kept away substantially in parallel with the opposing surface of the sleeve. For example, the total radial gap F in the diameter direction not greater than about 6 to 10 microns (about 3 to 5 microns on each side) alone prevents the contact in the thrust bearing due to the tilt of the shaft, and provides the supporting force for bearing the vertical motion. Therefore, the alternative approach to improve the bearing rigidity is to set the total radial gap F of about 3 microns or less, and preferably about 2 microns or less. Theoretically, although the total radial gap F might be designed to be zero, the sleeve could not be rotated relative to, or even be arranged around the shaft when the processing accuracy of the outer surface of the shaft 41 and the inner surface of the sleeve 42 are not well controlled. Therefore, in practical, the total radial gap F is designed to be 1 micron or more for achieve the improvement of the bearing rigidity. In addition, reduction of the radial gap F can also eliminate the half-whirl phenomenon as described in the first embodiment.

The present inventors have conducted an evaluation test for the spindle motor of FIG. 17 incorporating the hydrodynamic bearing assembly according to the embodiment. The rotational member including the rotor have the mass of 0.1 kilograms, the rotation rate of 12,000 rpm. The radial bearing has the diameter of 10 millimeters and the length of 20 millimeters, and the thrust bearing has the diameter of 20 millimeters. The radial gap and the thrust gap are designed to be 5 microns and 1 micron, respectively. When the external motion by twisting with hand was applied to the bearing axis of the spindle motor around the axis perpendicular to the bearing axis, no sound showing the contact in the bearing assembly was observed. Contrary, when the similar external oscillation by twisting with hand was applied to the bearing axis of the spindle motor having the thrust gap of 5 microns and the radial gap of 3 microns, the sound showing the contact in the bearing assembly was in fact heard.

The third aspect according to the present invention mainly addresses improving the bearing rigidity, and in particular, relates to the pump-out type hydrodynamic bearing assembly. As discussed above, according to the pump-out type hydrodynamic bearing assembly, since the thrust dynamic pressure distribution can be generated to have the dynamic pressure peak adjacent the thrust plate, the tilt rigidity against the external oscillation force is advantageously improved. However, according to the conventional bearing assembly, there is a disadvantage that the fluid is insufficiently provided to the pump-out thrust bearing. The pump-out type hydrodynamic bearing assembly according to the embodiments of the present invention overcomes the disadvantage.

Eighth Embodiment

Figure 20:
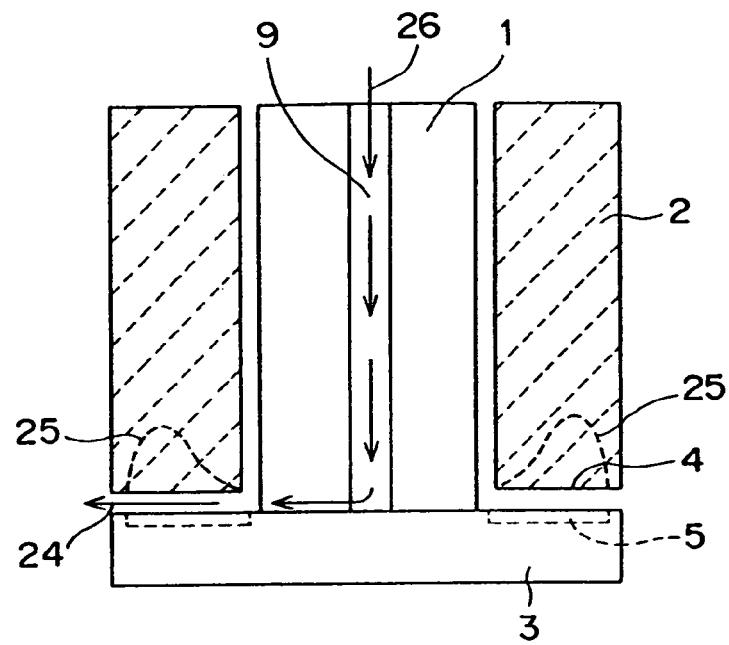
FIG. 20 is a cross sectional view of another embodiment of the hydrodynamic bearing assembly according to the present invention.

The eighth embodiment of the hydrodynamic bearing assembly according to the present invention will be described hereinafter, with reference to drawings. FIG. 20 shows the hydrodynamic bearing assembly of the embodiment. The hydrodynamic bearing assembly comprises a shaft 1, a sleeve 2 rotatably arranged around the shaft 1, and a disk-shaped thrust plate 3 perpendicularly secured onto the shaft 1. One end surface of the sleeve 2 (referred to as a thrust opposing surface 4) opposes to the thrust plate 3. A thrust bearing is defined between the thrust plate 3 and the thrust opposing surface 4. A plurality of spiral grooves 5 is formed on the thrust plate 3 for generating the pump-out type dynamic pressure. Also, a radial bearing is defined between the outer surface of the shaft 1 and the inner surface of the sleeve 2. Although FIG. 20 illustrates the shaft 1 having one longitudinal groove 9 formed on the outer surface thereof, preferably it includes a plurality of longitudinal grooves. In this drawing, the stationary member include the shaft 1 and the thrust plate 3, and the rotational member include the sleeves and other components (not shown).

In the thrust bearing, since the thrust plate 3 includes the pomp-out type spiral grooves 5, the fluid is conducted from the portions adjacent to the bearing axis to the circumference of the thrust plate 3 as indicated by arrow 24, due to the relative rotation of the thrust bearing. Because the conducted flow of the fluid generates high dynamic pressure adjacent the circumference of the thrust plate 3, the dynamic pressure distribution in the thrust bearing is obtained as indicated by the dashed line 25. The dynamic pressure with its peak adjacent to the circumference causes the thrust bearing to be improved in the rigidity against the external oscillating moment.

Because of the radial dynamic pressure, the sleeve 2 rotates relative to the shaft 1 without contact in the radial bearing. The fluid is sequentially supplied via the longitudinal groove 9 formed on the shaft 1 to the direction indicated by the arrow 26 so that the thrust bearing receives the fluid enough to generate the good thrust dynamic pressures. In addition, the longitudinal grooves 9 contributes in preventing the above-mentioned half-whirl. When the depth of the longitudinal groove 9 is so deep, the dynamic pressures in the radial bearing and the thrust bearing are close to the atmosphere to lose the radial rigidity and to reduce the thrust dynamic pressure. The present inventors have found that the depth ratio (which is referred to as a ratio of the depth of the longitudinal groove 9 relative to the effective diameter of the shaft 1) is advantageously set to 0.005 or less, and even more preferably set to 0.001 or less. However, when the depth of the longitudinal groove 9 is too shallow, the flow of the fluid can be insufficiently provided. Thus, the aforementioned depth ratio is preferably 0.0001 or more.

The disadvantage caused by the longitudinal groove 9 indicated in FIG. 20, in general, results the dynamic pressure to be reduced locally adjacent to the longitudinal groove 9, and hence the translation rigidity to be reduced in the direction of the longitudinal groove 9. One approach to avoid the disadvantage is to provide the longitudinal grooves 9 on the inner surface of the sleeve 2 instead of the outer surface of the shaft 1. Since the rotational member generally rotate at the rotation rate of 10,000 rpm or higher, the dependency upon the direction of the grooves can be disregarded.

Figure 21:
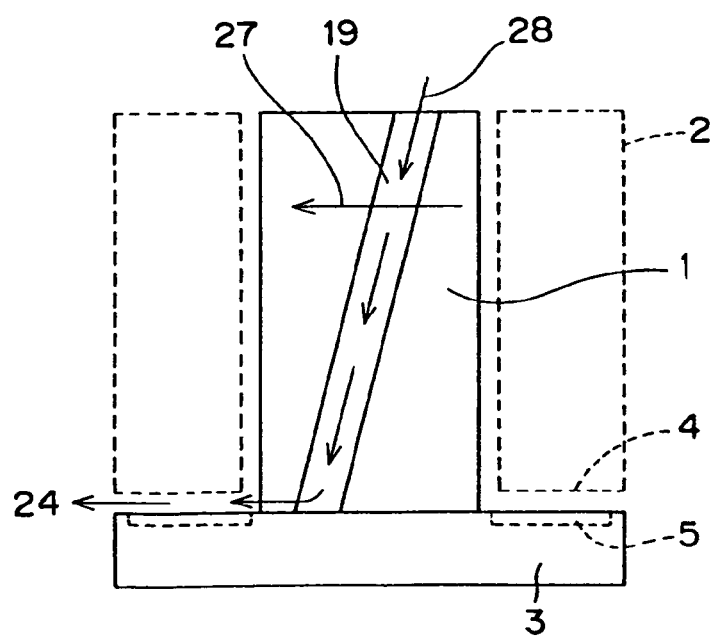
FIG. 21 is a side view of the alternative hydrodynamic bearing assembly in FIG. 20.

Another approach to avoid the disadvantage is to make the longitudinal grooves 19 inclined relative to the bearing axis as shown in FIG. 21. The inclined grooves 19 cause the portions (portions adjacent to the groove 19) having the low dynamic pressure to be helical surrounding on the outer surface. This generates the dynamic pressure that bears against the external force in any directions, thereby to reduce the possibility of the contact. The inclined grooves 19 provide another advantage that the rotation of the sleeve 2 in the direction as indicated by the arrow 28 propels the fluid due to its viscosity along the direction indicated by the arrow 28. This allows the fluid sufficiently provided into the thrust bearing for increasing the dynamic pressure therein. The bearing assembly with the inclined grooves 19 can be designed by selecting the numbers of grooves and the varying the inclined angle relative to the bearing axis so that the fluid can be provided into the thrust bearing as desired.

Figure 22:
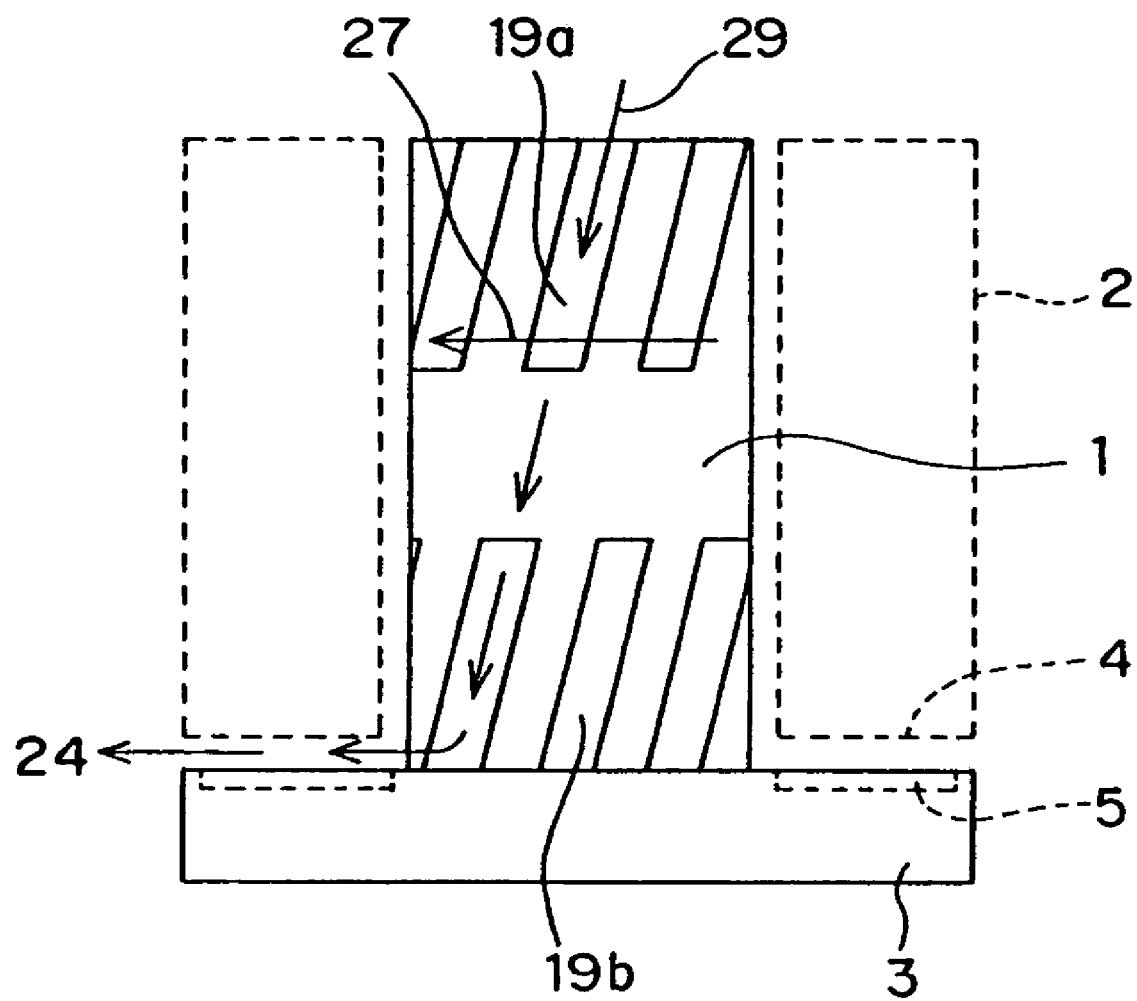
FIG. 22 is side view of the further alternative hydrodynamic bearing assembly in FIG. 20.

Even another approach for propelling the fluid into the thrust bearing and for minimizing the reduction of the translation rigidity is to form a plurality of intermittent inclined grooves 19a and 19b as indicated in FIG. 22. As illustrated in the drawing, a plurality of grooves inclined relative to the bearing axis are formed on the outer surface, which are intermittent adjacent the middle portion of the shaft 1 to form the upper groove 19a and the lower groove 19b. When the outer surface of the shaft 1 and the inner surface of the sleeve 2 have no circularity deviation, the flow of the fluid is inadequately developed. However, if the grooves provided for propelling or for drawing the fluid in cooperation with a portion with no circularity deviation is located in the mid portion or end of the shaft 1, a predetermined amount of the fluid in the direction of the bearing axis can be assured to provide with the grooves. In the drawing, the upper inclined groove 19a propels the fluid down indicated by the arrow 29 due to the rotation of the sleeve, and the lower inclined groove 19b similarly draws the fluid down. This allows the flow of the fluid to be promoted down towards the bearing axis in comparison with the bearing assembly with no circularity deviation. The flow of the fluid so provided can be effectively used in the pump-out thrust bearing to generate much dynamic pressure therein. Since the fluid flown through the radial gap between the shaft 1 and the sleeve 2 is squeezed in the mid portion of the bearing assembly, the restriction conditions are determined based upon the squeezed portion. This allows the various dimensional requirements in accuracy to be less precisely so that the various dimensions are selected relatively in a flexible manner. This is another advantage due to the intermittent grooves 19a and 19b. The dependency of the direction of the external motion relative to the shaft due to the grooves is eliminated by the portion without circularity deviation, which is an another advantage.

The embodiment has been described that the hydrodynamic bearing assembly has the grooves formed on the outer surface of the shaft for conducting the fluid, such grooves are formed on the inner surface. Also, in case where the grooves are inclined to the bearing axis, preferably, the inclined grooves are such that the fluid is propelled down to increase the dynamic pressure in the thrust bearing. The shaft 21 may be either rotational member and the stationary member. Alternatively, the spiral grooves 5 for generating the thrust dynamic pressure may be formed on the thrust opposing surface of the sleeve 2. Although the FIG. 22 illustrates three inclined grooves divided into upper and lower grooves 19a and 19b, they may be divided into three or more parts by the two or more intermittent portions.

Ninth Embodiment

Figure 23:
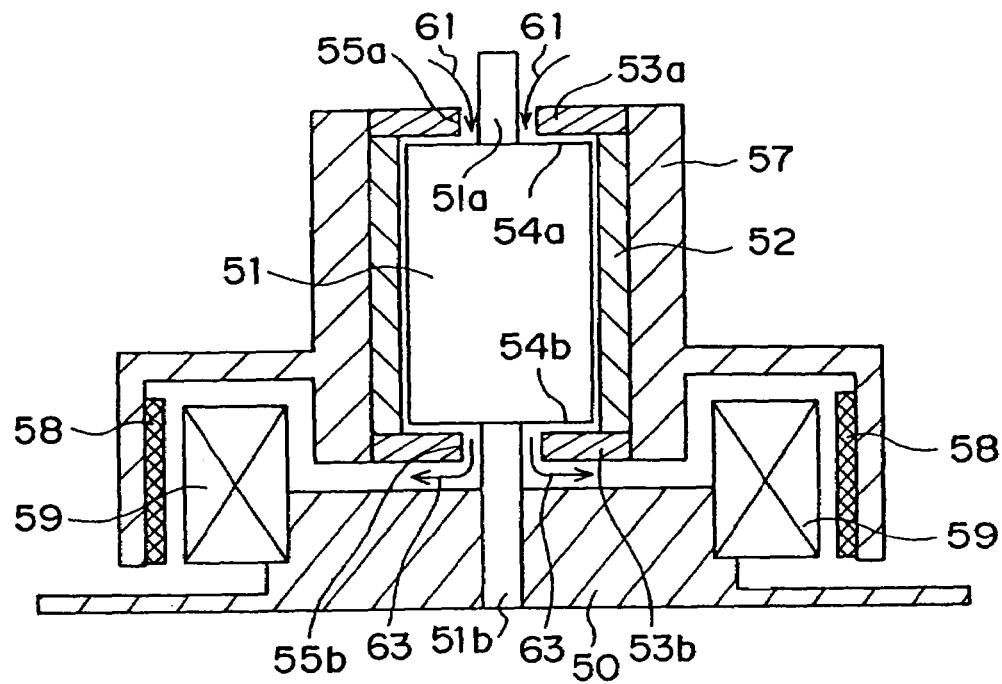
FIG. 23 is a cross sectional view of the spindle motor incorporating the hydrodynamic bearing assembly according to further another embodiment of the present invention.

The ninth embodiment of the hydrodynamic bearing assembly according to the present invention, which mainly addresses improving the bearing rigidity by incorporating the pump-out type hydrodynamic bearing assembly, will be described hereinafter, with reference to drawings. FIG. 23 illustrates one example of the spindle motor incorporating the hydrodynamic bearing assembly of the embodiment. In the drawing, a shaft 51 is secured onto a base plate 50 having the column members 51a and 51b with relatively small diameter. A sleeve 52 having hollow cylindrical inner surface parallel to the outer surface of the shaft 51 is rotatably arranged around the shaft 51. The sleeve 52 includes a first and second doughnut thrust plates 55a and 55b both sandwiching the sleeve 52. The doughnut thrust plates 55a and 55b have the upper and lower through-holes in the mid portion thereof through which the column members 51a and 51b are extending. The end surface of the sleeve 52 opposing to the first thrust plate 55a is referred to as a first opposite surface 54a, and the another end surface of the sleeve 52 opposing to the second thrust plate 55b is referred to as a second opposite surface 54b. Either one of the first and second opposite surfaces may be integrally formed with sleeve 52.

The thrust bearings are defined between the first thrust plate 53a and the first thrust opposing surface 54a, also between the second thrust plate 53b and the second thrust opposing surface 54b. Also, the radial bearing is defined between the outer surface of the shaft 51 and the inner surface of the sleeve 52. The rotor 57 is secured onto the outer surface of the sleeve 52 and have a skirt provided with a rotor magnet 58 opposing to the electromagnet 59 secured on the rotor 57. The electromagnet 59 energized by the electric flow generates the attraction force (or the repulsion force), the sleeve 52, the rotor 57 and other rotational member rotate relative to the shaft 51 in a similar manner as the other hydrodynamic bearing assemblies.

Figure 24:
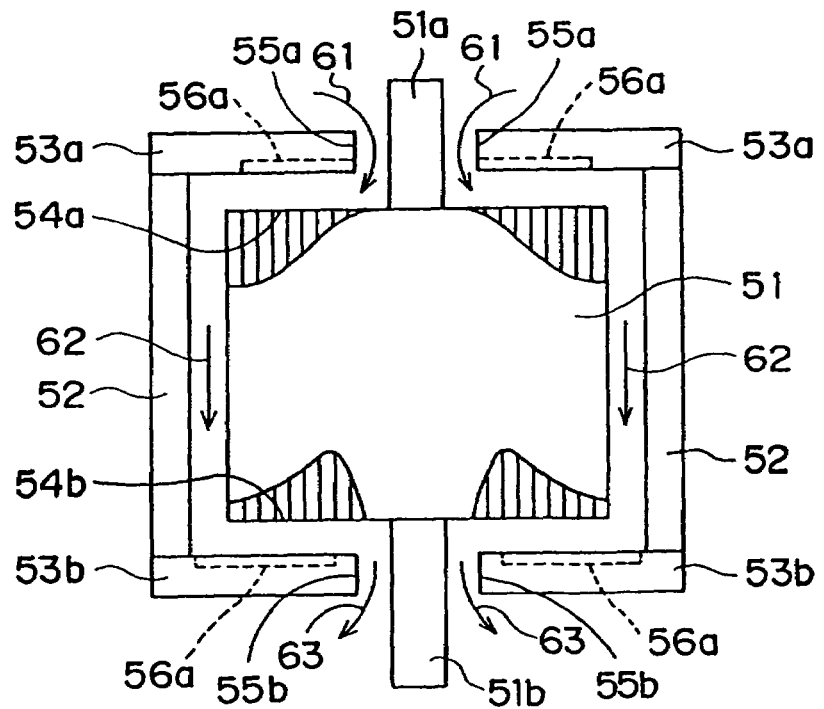
FIG. 24 is a cross sectional view of the hydrodynamic bearing assembly in FIG. 23 during the rotation thereof.

In operation of the spindle motor as described above, the flow of the fluid and the dynamic pressure distributions in the radial and thrust bearings will be described hereinafter, with reference to FIG. 24. FIG. 24 is an enlarged view of the hydrodynamic bearing assembly of FIG. 23, and similar parts are denoted by the similar reference numerals. In the drawing, a plurality of the pump-out type spiral grooves 56a are formed on the first thrust plate 53a, and a plurality of the pump-in type spiral grooves 56b are formed on the second thrust plate 53b. Those spiral grooves 56a and 56b may be formed on the thrust opposing surfaces 54a and 54b, instead of on the first and second thrust plates 53a and 53b.

The rotation of the sleeve 52 around the shaft 51 causes the relative rotation between the first thrust plate 53a and the first opposite surface 54a. The groove 56a in cooperation with the relative rotation conducts the fluid in a direction indicated by the arrow 61 through the gap between the small column 51a and the first thrust plate 53a into the thrust bearing assembly. The pump-out type spiral grooves 56a continuously propels the fluid to the circumference of the first thrust plate 53a to increase the dynamic pressure towards the circumference away from the bearing axis, thereby to generate the thrust dynamic pressure for bearing the first thrust plate upwardly. Then, the fluid is guided in the direction indicated by the arrow 62 to the radial bearing connecting with the thrust bearing, and generates the radial dynamic pressure between the outer surface of the shaft and the inner surface of the sleeve 52. The fluid carried to the bottom surface of the shaft 51 is conducted again into the other thrust bearing. The pump-in type spiral grooves 56b in cooperation with the relative rotation between the second thrust plate 53b and the second opposite surface 54b draws the fluid from the circumference of the second thrust plate 53b towards the bearing axis. The fluid is compressed by the grooves 56b adjacent to the axis, thereby to generate the thrust dynamic pressure bearing the second thrust plate downwardly. Then, the fluid is expelled outwardly via the gap between the second thrust plate 53b and the through-hole 55b as indicated by the arrow 63.

Figure 55:
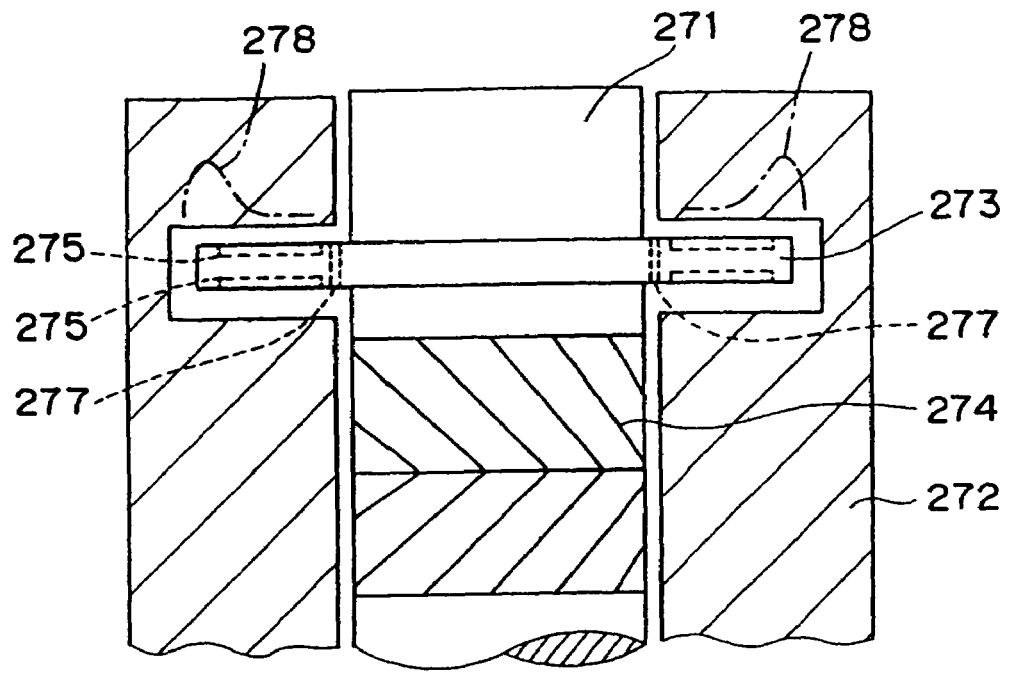
FIG. 55 is a side cross sectional view of another embodiment of the conventional hydrodynamic bearing assembly.
Figure 56:
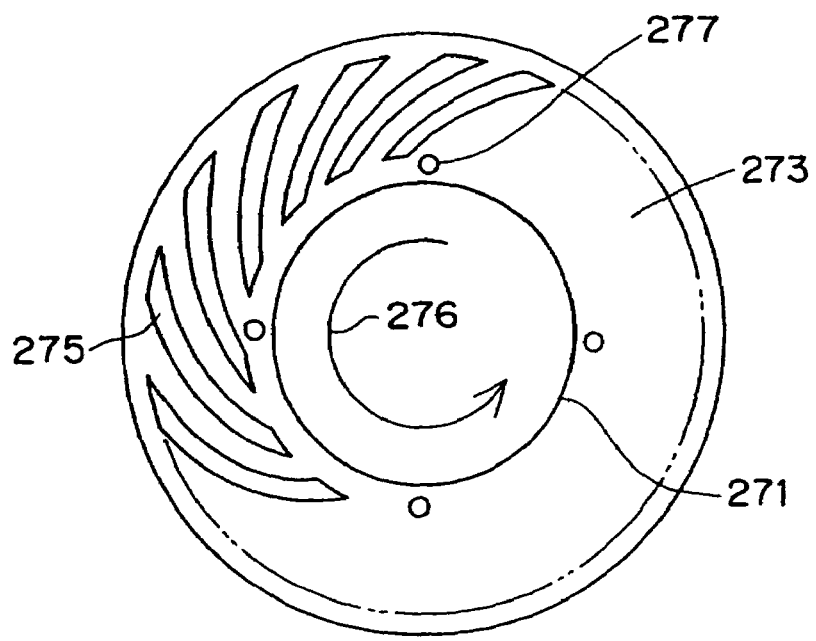
FIG. 56 is a partial top view of the hydrodynamic bearing assembly in FIG. 55.
Figure 57:
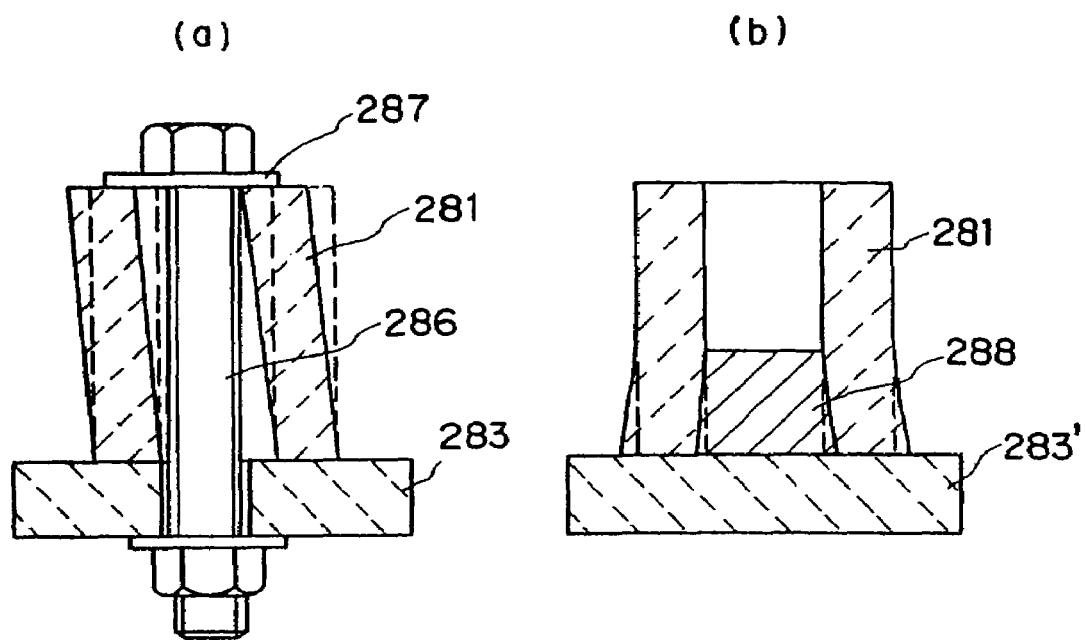
FIGS. 57(a) and 57(b) are side cross sectional views of further another embodiment of the conventional hydrodynamic bearing.

FIG. 24 also indicates the parallel lines schematically representating the dynamic pressure distributions in the first and second thrust bearings adjacent to the portions indicated by the parallel lines. As can be seen in the dynamic pressure distributions, the pump-out type spiral grooves 56a generates the peak of the dynamic pressure adjacent to the circumference away from the bearing axis for bearing the shaft 51 against the external oscillation to prevent the shaft to tilt. On the other hand, the pump-in type spiral grooves 56b generates the peak of the dynamic pressure adjacent to the bearing axis for bearing the second thrust plate 53b and the sleeve 52 downwardly as described above. In other words, the dynamic pressure in the second thrust bearing causes a depressing force to the sleeve 52. The dynamic pressure is, in general, increased as the members rotating relative to each other have a closer gap therebetween. The depressing force to the sleeve 52 also depresses the opposite first thrust plate 53a downwardly to cause the thrust dynamic pressure generated by the pump-out type spiral grooves 56a to be increased. As described above, according to the hydrodynamic bearing assembly of the embodiment, a pair of thrust bearings provided on the upper and lower end portions of the sleeve 51 together cooperate to avoid the tilt against the external motions, thereby to achieve the anti-tilt hydrodynamic bearing assembly. Unlike the conventional pump-out type hydrodynamic bearing assembly indicated in FIGS. 55 and 56, since the thrust bearings according to the embodiments are open to the atmosphere adjacent to the bearing axes, a sufficient amount of the fluid can be supplied into the thrust bearings, thereby to effectively generate dynamic pressure enough to prevent the tilt.

It should be noted that the similar advantage is enjoyed by conducting the fluid flow in the reverse direction to one indicated in FIG. 24. The first and second thrust bearings are designed as the pump-in and pump-out type ones, respectively, so that the fluid is conducted from the bottom and expelled towards the top. This achieves the hydrodynamic bearing assembly with the robust rigidity similar to the above-mentioned.

Figure 25:
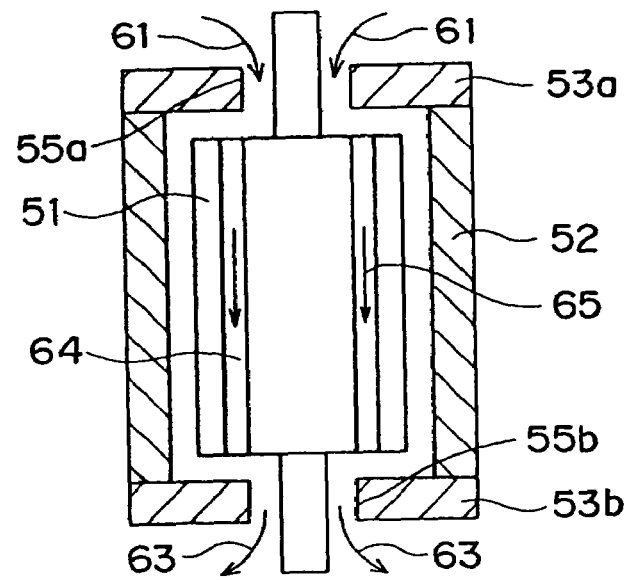
FIGS. 25(a) and 25(b) are cross sectional views of the alternative hydrodynamic bearing assembly in FIG. 23 during the rotation thereof.
Figure 25:
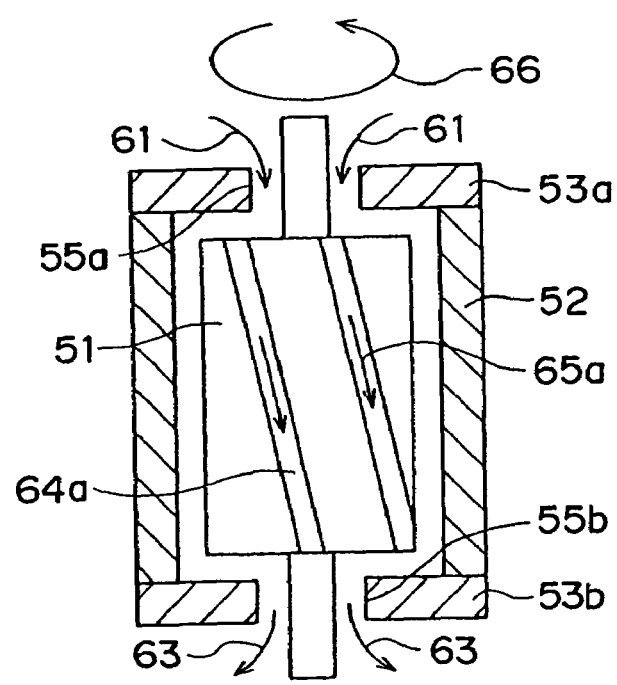

FIGS. 25(a) and 25(b) illustrate the hydrodynamic bearing assemblies of the embodiment, further including longitudinal grooves 64, 64a formed on the outer surface of the shaft 51, which are parallel and inclined, respectively, to the bearing axis. Those longitudinal grooves 64, 64a promote the sequential fluid flow from the pump-out inlet thrust bearing to the pump-in outlet thrust bearing. To this end, the sufficient amount of the fluid is smoothly supplied to increase the dynamic pressure. In particular, the inclined longitudinal grooves 64a of FIG. 25(b) in cooperation with the counterclockwise rotation (as seen from the top) causes the fluid to smoothly flow and increases the dynamic pressure more effectively.

The advantages and disadvantages are as discussed above for the eighth embodiment. The longitudinal grooves are preferably inclined to the axis especially for minimizing the reduced translation rigidity due to the grooves. Also, the total number of the grooves formed on the shaft 51 is preferably in the range within about three to six. The gradient of the groove may be expressed by a central angle defined the line from the center of the axis to start point of the groove and the line from the center of the axis to end point of the groove. Even if the central angle is only about 10 degrees, the advantage of the promotion of the fluid supply can be obtained to some extent. However, the central angle is preferably 30 degrees or more to avoid the reduced translation rigidity. When the shaft 22a has three grooves 64a formed thereon, each central angle of the grooves preferably is 120 degrees so that the whole circumference of the shaft 22a has the grooves 64a. However, the grooves 64a are not necessarily formed on the whole circumference, more preferably, the central angle of the grooves falls within the range of 30 to 60 degrees.

Although the grooves 64 and 64a are formed on the outer surface of the shaft 51 according to the embodiment, they may be formed on the inner surfaces of the sleeve 52 to achieve the similar advantages. Also, the shaft may be designed as the rotational member instead of the stationary member similar to the other embodiments as discussed above.

Figure 26:
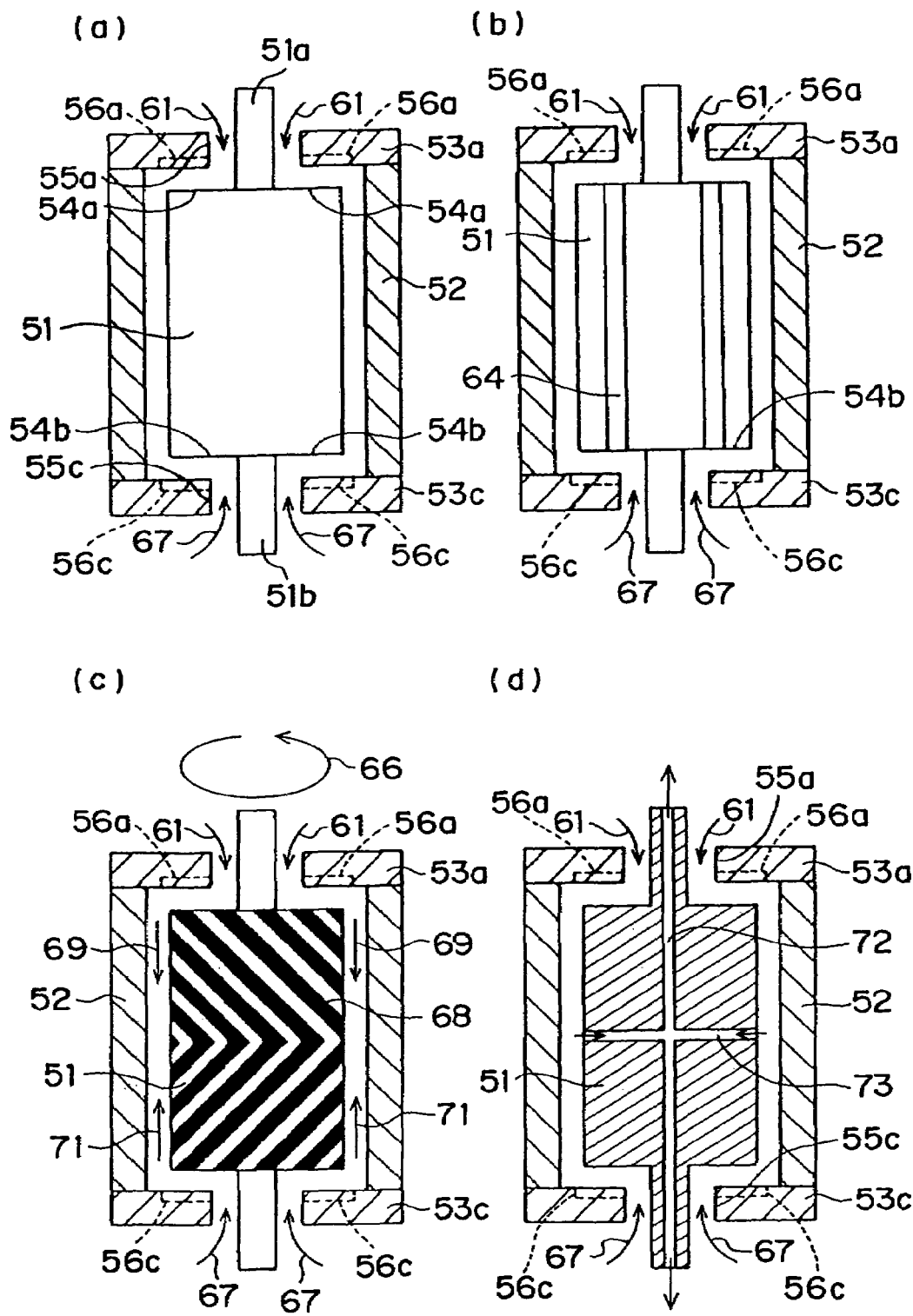
FIGS. 26(a) to 26(d) are cross sectional views of the further alternative hydrodynamic embodiment of the bearing assembly of FIG. 23 during the rotation thereof.

FIG. 26 illustrates another example of the hydrodynamic bearing assembly including the upper (first) and lower (second) thrust bearings, which are both pump-out type ones. In FIGS. 26(a) to 26(d), the pump-out type spiral grooves 56c for generating the dynamic pressure are formed on the second thrust plate 53c as the first thrust plate 53a, which opposes to the second thrust opposing surface 54b of the shaft 51. The other structure of the bearing assembly is similar to those in FIG. 23.

According to the hydrodynamic bearing assembly of FIG. 26(a), upon the rotation of the sleeve 52 relative to and around the shaft 51, the pump-out type first thrust bearing between the first thrust plate 53a and the first thrust opposing surface 54a conducts the fluid into the bearing assembly as indicated by the arrow 61. Also, the pump-out type second thrust bearing between the second thrust plate 63a and the second thrust opposing surface 54b conducts the fluid into the bearing assembly as indicated by the arrow 67.

The fluid conducted by both thrust bearing assemblies are propelled from the central portions to the radially outer portions by the pump-out type spiral grooves 56a and 56c, so as to generate the thrust dynamic pressures with peaks on the circumferences, as indicated by the parallel lines on the first thrust plate 54a of FIG. 24. In the hydrodynamic bearing assembly of FIG. 26, since both thrust bearings are the pump-out type ones, the thrust dynamic pressures with peaks on the circumferences are generated, thus, to achieve the hydrodynamic bearing assembly with the robust rigidity against the tilt-motion. In addition, since the fluid are conducted through both ends to increase the dynamic pressure in the radial bearing, thereby increasing the bearing force in the radial bearing.

The fluid conducted into the hydrodynamic bearing assembly is expelled by the dynamic pressure continuously supplied in the bearing assembly, through the through-holes 55a and 55c between the small columns 51a and 51b of the shaft 51 and the thrust bearing plate 53a and 53c to the atmosphere. The spiral grooves 56a and 56c for generating the thrust dynamic pressure may be formed on the thrust opposing surfaces 54a and 54b instead of on the thrust plate 53a and 53c.

According to the hydrodynamic bearing assembly of FIG. 26(b), the longitudinal grooves 64 are formed on the outer surface of the shaft 51 extending parallel to the bearing axis between the first and second thrust bearings. The longitudinal grooves effectively communicate in fluid between the first and second thrust bearings so that both thrust bearings have the even dynamic pressure. The even dynamic pressure causes the rotational member such as the sleeve 52 to be kept in a stable axial position, and prevents the half-whirl phenomenon. Also the longitudinal grooves may be extended from the both ends but interrupted in the mid portion of the radial bearing to form upper and lower grooves not communicating each other. This structure can further increases the dynamic pressure adjacent the middle portion of the radial bearing to improve the bearing rigidity in the radial bearing.

According to the hydrodynamic bearing assembly of FIG. 26(c), a plurality of herringbone grooves 68 is formed on the outer surface of the shaft 51. The herringbone grooves 68 have gradients such that the fluid is guided towards the middle portion of the radial bearing upon the relative rotation of the shaft 51 and the sleeve 52. In FIG. 26(c), for example, the fluid is guided towards the mid portion of the sleeve 52 as indicated by the arrows 69 and 71 when the sleeve 52 rotates counterclockwise (as seen from the top) as indicated by the arrow 66. Therefore, the herringbone grooves 68 increases the dynamic pressure adjacent the middle portion of the radial bearing, thereby to improve the bearing rigidity in the radial bearing. Thus, the herringbone grooves 68 can compensate the shorter radial bearing along the axis, for generating the sufficient radial dynamic pressure. Also the herringbone grooves 68 uniformalizes the dynamic pressures in both thrust bearings or eliminates the half-whirl. Various configurations of the herringbone grooves 68 can be conceived rather than the V-shaped one, including the V-shaped grooves interrupted in the mid portion of the radial bearing, the V-shaped grooves emerged into an annular groove in the mid portion of the radial bearing, and the V-shaped grooves but asymmetrically formed. The herringbone grooves 68 may have any configuration as long as they can conduct the fluid from both thrust bearings towards the middle portion of the radial bearing.

According to the hydrodynamic bearing assembly of FIG. 26(d), through-holes are provided inside the shaft 51 for expelling the fluid conducted from both of the pump-out type thrust bearings. In the hydrodynamic bearing assembly of FIG. 26(a), the fluid is introduced and expelled through the same gaps defined between the small columns 51a, 51b and the through-holes 55a, 55b of the first and second thrust plates 53a, 53b. In some cases where the viscosity of the fluid is high, the conflict between the introduced fluid and the expelled fluid prevents the fluid from effectively introducing into the bearing assembly by means of the pump-out type spiral grooves. To address the disadvantage, the bearing assembly of FIG. 26(d) has another passage for expelling the fluid, as well as the gap defined between the shaft 51 and the through-holes 55a, 55b of the thrust plates 53a, 53b for introducing the fluid into the bearing assembly.

As illustrated in FIG. 26(d), a longitudinal hole is provided within the shaft 51, extending through or adjacent to the bearing axis. Also, preferably, a plurality of transverse holes 73 are provided within the shaft 51, extending perpendicularly from the outer surface of the shaft 51 adjacent the middle portion of the radial bearing to the longitudinal hole for fluid communication between the longitudinal hole 72 and the transverse holes 73. The bearing assembly of FIG. 26(d) has the longitudinal hole 72 extending through the first and second end surfaces, however, the longitudinal hole 72 may extend through either one of upper and lower surfaces if it is connected with the transverse holes 73. This structure allows the fluid introduced by the pomp-out type spiral grooves 56a and 56c of the thrust bearings to generate the thrust and radial dynamic pressures in the thrust and radial bearings, respectively, and then to be guided into the transverse holes 73 to be expelled via the longitudinal hole 72 to the atmosphere. The longitudinal hole 72 and transverse holes 73 may be provided within the shaft in cooperation with the grooves of FIGS. 26(b) and 26(c). Although the holes for expelling the fluid reduce the dynamic pressure locally in the radial bearing, if the radial dynamic pressure can be assured, for example, by having the sufficient long radial bearing, the fluid flow can be promoted to increase the dynamic pressure especially in the thrust bearings. If feasible for use, the holes for expelling the fluid may be provided adjacent the middle portion of the sleeve 52, instead of the shaft 51, outwardly extending to the atmosphere.

Figure 27:
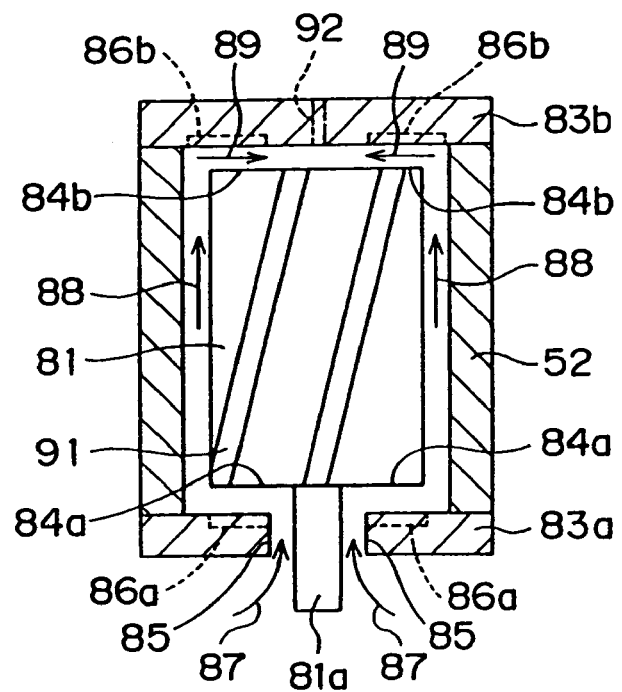
FIG. 27 is a cross sectional view of even further alternative embodiment of the hydrodynamic bearing assembly in FIG. 23 during the rotation thereof.

FIG. 27 illustrates the hydrodynamic bearing assembly similar to one of FIG. 23 except that one of the thrust bearing has a closed end covered by the thrust plate of the sleeve 52. A column-shaped shaft 81 has a small column formed concentrically with the shaft 81, also has an outer surface parallel to the axis of the shaft 81. A cylindrical hollow sleeve 52 is rotatably arranged around the shaft 81. At one end, the sleeve 52 is secured to a first thrust plate 83a having a through-hole 85, through which the small column 81a of he shaft 81 is extending. The first thrust plate 83a opposes to the bottom surface of the shaft 81, referred to as the first opposite surface. At the other end, the sleeve 52 is secured to a disk-shaped second thrust plate 83b covering the hollow portion of the sleeve 52. The second thrust plate 83b opposes to the upper surface of the shaft 81, referred to as the second opposite surface. The second thrust plate 83b has no through hole for the small column. Also, the first and second thrust plate 83a and 83b have the pump-out type and pump-in type spiral grooves 86a and 86b, and oppose the thrust opposite plates 84a and 84b, respectively. Further, either one of the first and second thrust plates 83a and 83b may be integrally formed with the sleeve 52. The spiral grooves 86a and 86b may be formed on the thrust opposing surfaces 84a and 84b.

Upon the relative rotation between the shaft 81 and the sleeve 52, the fluid introduced by the pump-out type spiral grooves 86a as indicated by the arrow 87 generates the thrust dynamic pressure between the first thrust plate 83a and the first opposite surface 84a. Then, the fluid is conducted into the radial bearing to generate the radial bearing. The fluid is guided as indicated by the arrow 88 and compressed as indicated by the arrow 89 into a second thrust bearing between the second thrust plate 83b and the second opposite surface 84b, thereby to generate thrust dynamic pressure in the second thrust bearing by means of the spiral grooves 86. Then, the dynamic pressure generated by the continuous fluid flow expels the fluid out to the atmosphere by through the gap between the small column 81a of the shaft 81 and the through-hole 85 of the first thrust plate 83a, accordingly.

The hydrodynamic bearing assembly of FIG. 27 also generates the peak of the dynamic pressure on the circumference away from the bearing axis in the thrust bearing, thereby to bear against the tilt moment. Thus, the bearing assembly has the improved robust rigidity. The bearing assembly of FIG. 27 also has the inclined grooves 91 formed on the outer surface of the shaft 81 for guiding the fluid from the pump-out type thrust bearing to the pump-in type thrust bearing. The grooves may be straight to the bearing axis or the herringbone grooves. Alternatively, no groove may be formed on the shaft 81. In the hydrodynamic bearing assembly according to the embodiment, the gap between the small column 81a of the shaft 81 and the through-hole 85 of the first thrust plate 83a is used both for introducing and expelling the fluid, this might cause the adverse effect to the fluid flow. In order to avoid such adverse effect, the hydrodynamic bearing assembly may have another hole indicated by the dashed line 92 in the second thrust plate 83a, or a through-hole extending through the axis of the shaft 81 similar to one illustrated in FIG. 26(d)

Figure 28:
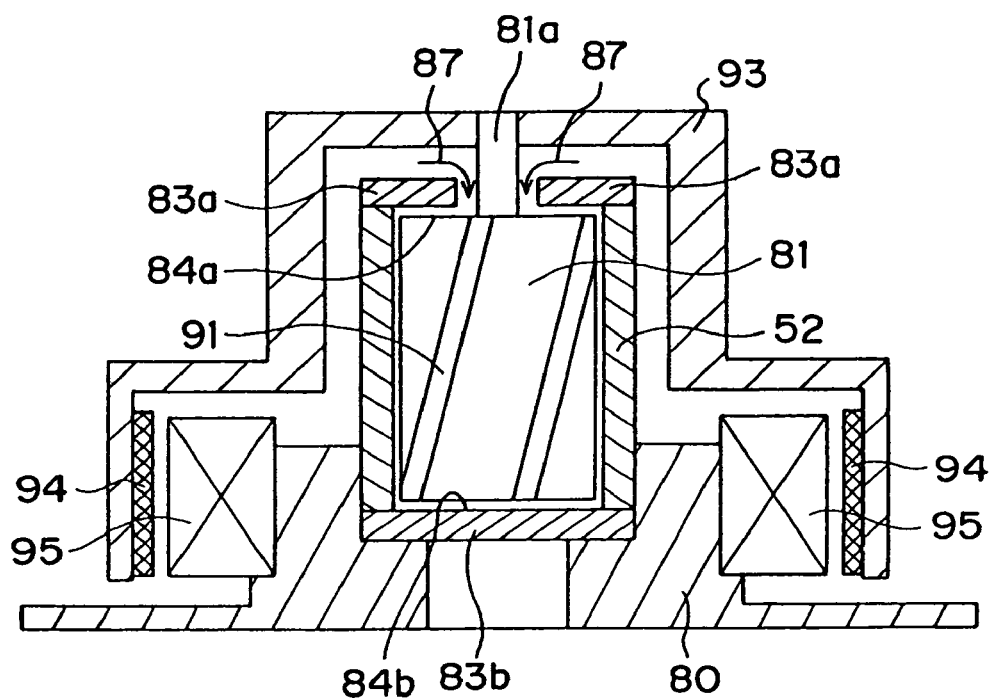
FIG. 28 is a cross sectional view of the spindle motor incorporating the hydrodynamic bearing assembly in FIG. 27.

FIG. 28 illustrates one example of a shaft-rotating spindle motor incorporating the hydrodynamic-bearing assembly of FIG. 27. In the drawing, the sleeve 52 including the first and second thrust bearings 83a and 83b is supported on the base plate 80, and the shaft 81 having the small column 81a formed concentrically with the shaft 81 is rotatably arranged within the inner surface of the sleeve 52. This structure defines the radial bearing and a pair of the thrust bearings communicating with the radial bearing at the both ends of the shaft 81. The rotor 93 is secured onto the column 81a of the shaft 81, and has the rotor magnet 94 in the inner surface thereof. The rotor magnet 94 opposes to the electromagnet 95 secured on the base plate 80. The electromagnet 95 energized by the electric current generates the attraction force or the repulsion force between the electromagnet 74 and the rotor magnet 73, thereby to rotate rotational member such as the shaft 81 and rotor 93 around the sleeve 52. The rotation of the spindle motor is the same as the others as described above.

Since the peak of the dynamic pressure can be generated at the circumference away from the bearing axis, the spindle motor as described above has the improved robust rigidity.

The fourth aspect according to the present invention relates to the hydrodynamic bearing assembly in which the shaft is secured perpendicularly onto the thrust plate with the high accuracy in a simple manner in order to improve the bearing rigidity. As discussed above, it is critical to keep the perpendicularity between the shaft of the radial bearing and the thrust plate of the thrust bearing with a high accuracy, so as to avoid the contact of the thrust bearing especially during the rotation.

Tenth Embodiment

Figure 29:
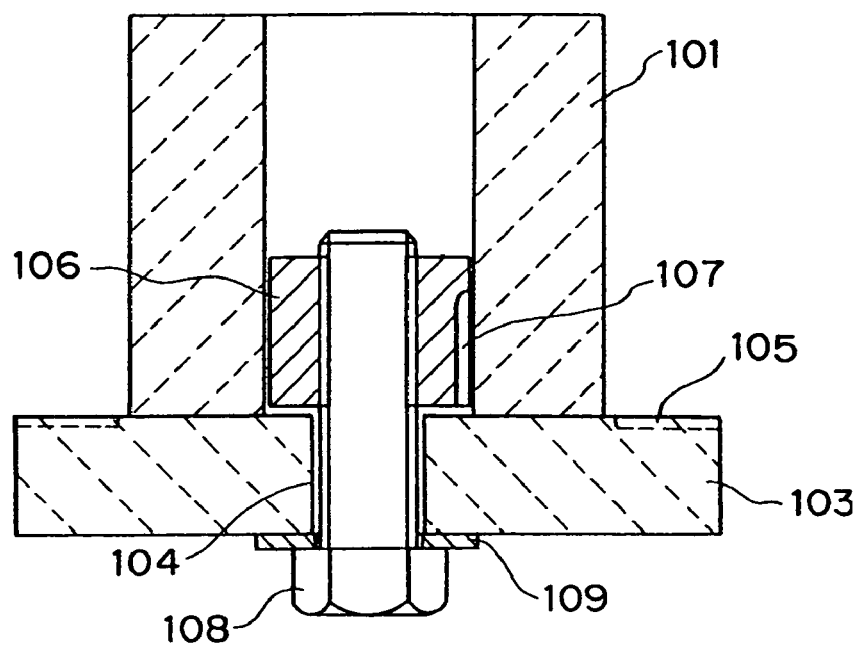
FIG. 29 is a cross sectional view of even further alternative embodiment of the hydrodynamic bearing assembly according to the present invention.
Figure 30:
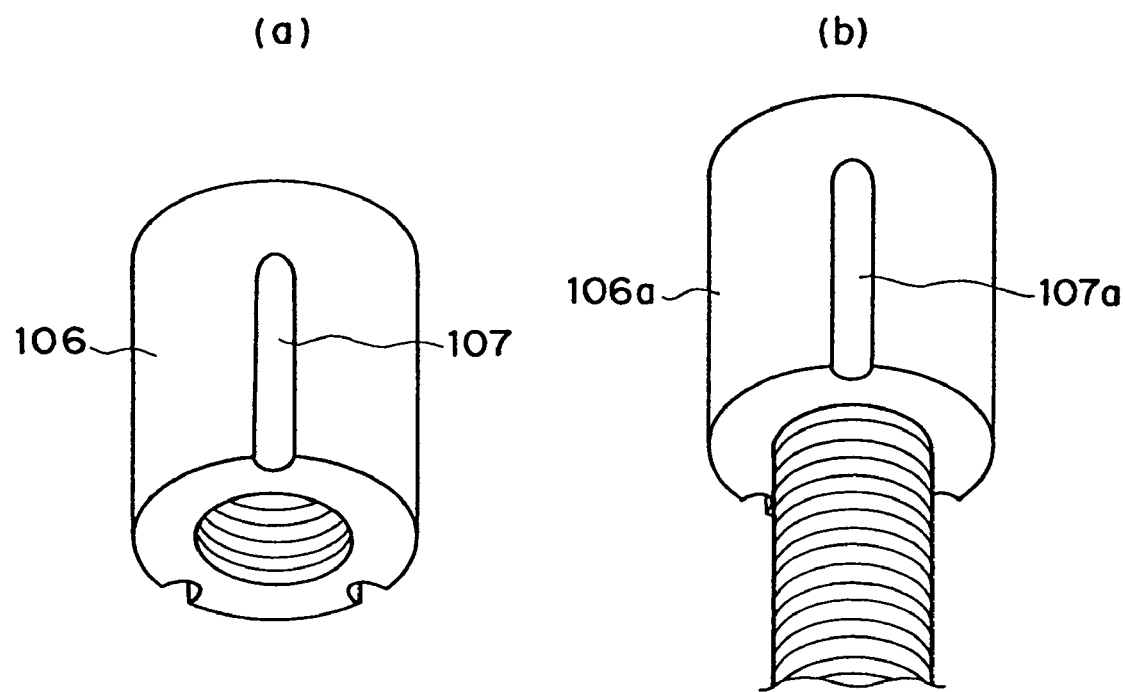
FIGS. 30(a) and 30(b) are perspective views of the constraint member constituting the hydrodynamic bearing assembly in FIG. 29.

The tenth embodiment of the hydrodynamic bearing assembly according to the present invention, which addresses improving the bearing rigidity by assuring the accuracy of the perpendicularity between the shaft and the thrust plate, will be described hereinafter, with reference to drawings. FIG. 29 is a cross section of the hydrodynamic bearing assembly of the embodiment. In the drawing, a hollow cylindrical shaft 101 is perpendicularly positioned on a disk-shaped thrust plate 103 with a through-hole 104. As described above, if the perpendicularity between the members 101 and 103 has insufficient accuracy, then it is likely to cause the contact in the thrust bearings, and eventually, the malfunction of the hydrodynamic bearing assembly. The thrust plate 103 has a plurality of grooves 105 for generating the dynamic pressure formed thereon. The sleeve (not shown in the drawing) is arranged around the shaft 101 covering the outer surface thereof. The sleeve rotates relative to and around the shaft 101 with predetermined gap therebetween, thereby to generate the radial dynamic pressure. The relative rotation in cooperation with the grooves 105 also generates the thrust dynamic pressure between the end surface and the thrust plate 103. A hollow cylindrical constraint member 106 is fit into the hollow space of the shaft 101 so that the outer surface of the constraint member 106 contacts with the inner surface of the shaft 101. Also, the constraint member 106 has a female screw formed on an inner surface. The female screw receives a bolt 108 as the fastening means inserted via the through-hole 104 of the thrust plate 103. A washer 109 is engaged on the bolt 108. The constraint member 106 has parallel grooves 107 relative to the axis formed on the outer surface thereof for directing the adhesive, of which details are illustrated in FIG. 30(a). As can be seen, the groove 106 has an open end and a closed end terminating in the mid portion. Although the constraint member 106 according to the embodiment has three grooves 107, any number of grooves may be formed on the constraint member 106.

Referring back to FIG. 29, in order to fasten the constraint member 106 within the hollow space of the shaft 101, the constraint member 106 is firstly inserted within the hollow space of the shaft 101 by means of a jig, and aligned in a predetermined position, then, the adhesive is directed through the open end into the grooves 107.

Next, the bearing assembly so constructed of the shaft 101 and the constraint member 106 is fastened with the thrust plate 103 by positioning the thrust plate 103 on the shaft 101 so that the female screw of the thrust plate 103 and the bolt 108 are concentrically aligned, by inserting the bolt with a washer 109 via the through-hole 104 and the female screw, and by fastening the bolt with the female screw of the constraint member 106. This ensures both of the smoothened surfaces of the shaft 101 and the thrust plate 103 to closely contact with each other, thereby for securing thereof with the high accuracy. What is fastened by the bolt 108 is the constraint member 106, which is bonded to the hollow inner surface of the shaft 101. Thus, fastening the bolt 108 causes the shearing force along the axis but no undesired force in the radial direction. Therefore, this fastening mechanism receives no deformation causing the bearing assembly to the malfunction.

It should be noted that while the adhesive is directed into the groove 107 formed on the outer surface of the constraint member 106, the groove 107 is not extending to and from both ends of the constraint member 106. In case where the groove 107 is extending to and from both ends of the constraint member 106, there are a couple portions in which the adhesive may unstick due to the external force such as the over-fastening of the bolt 108 or unexpected force to the shaft 101. The portions in which the adhesive may unstick include a portion between the adhesive and the groove 107, a portion within the adhesive, and the portion between the adhesive and the shaft 101. However, the groove 107 having an open end and a closed end terminating in the mid portion as illustrated in the drawing limits the portions in which the adhesive may unstick only to the portion between the adhesive and the shaft 101. Thus, this fastening mechanism reduces the risk of the adhesive to unstick. Alternately, the grooves may be formed to have a spiral configuration, even though such spiral configuration requires more tasks to achieve.

The experiments that the present inventors has conducted revealed that after assembling the fastening mechanism shown in FIG. 29, and fastening the bolt 108 with a torque of 100 kilograms centimeters has shifted the perpendicularity between the shaft 101 and the thrust plate 103 by 0.02 microns, which falls within the tolerance limits thereof. Fastening the bolt 108 with a torque of 200 kilograms centimeters has caused the adhesive to unstick.

According to the embodiment, the constraint member 106 has the hollow space for receiving the bolt 108 as the fastening member, however, the roles can be replaced to each other. FIG. 30(b) shows another constraint member 106a, which has a bolt-like configuration and a column-like head portion, on which one or more grooves 107a are formed with the open end and the closed end terminating in the mid portion. In this instance, the fastening member is a nut (not shown) instead of the bolt. The nut and the washer 109 engage on an outer screw of the constraint member 106a for fastening each other.

Figure 31:
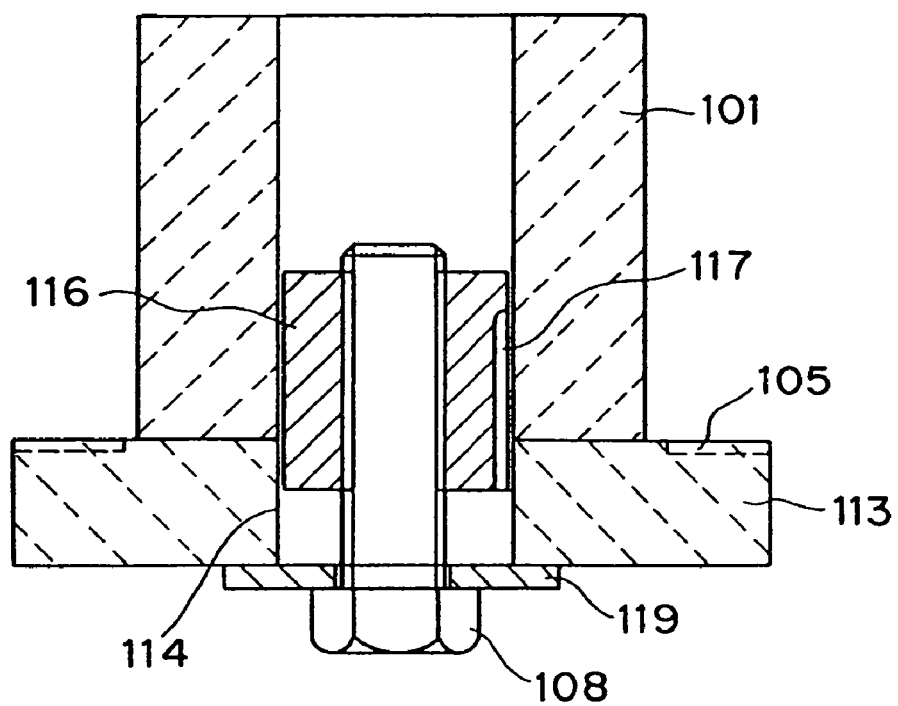
FIG. 31 is a cross sectional view of the alternative embodiment of the hydrodynamic bearing assembly in FIG. 29.

FIG. 31 illustrates an alternative fastening mechanism using another constraint member 116 extending along the axis. In the drawing, the thrust plate 113 has a relatively large through-hole 114 having a diameter same as the hollow space of the shaft 101. The constraint member 116 extending along the axis to the shaft 101 is fit within the through-hole 114. The bolt in cooperation with a large washer 119 is fastened on the constraint member 116. The other mechanism and the way to assemble are similar to those to the example shown in FIG. 29.

The advantage of the bearing assembly according to the embodiment is that the shaft 101 and the thrust plate 103 can concentrically be arranged in an accurate manner because the constraint member 116 extends to align itself with the thrust plate 103. The experiment that the present inventors have conducted revealed that the shaft 101 and the thrust plate 103 can concentrically be arranged with the accuracy of 10 microns when the constraint member 116 has the extended portion with a length of 1 millimeter. Also, it should be noted that the constraint member 116 may have the bolt-like configuration and the fastening member may have the nut-like configuration to replace the roles of the constraint member and the fastening member with each other.

Eleventh Embodiment

Figure 32:
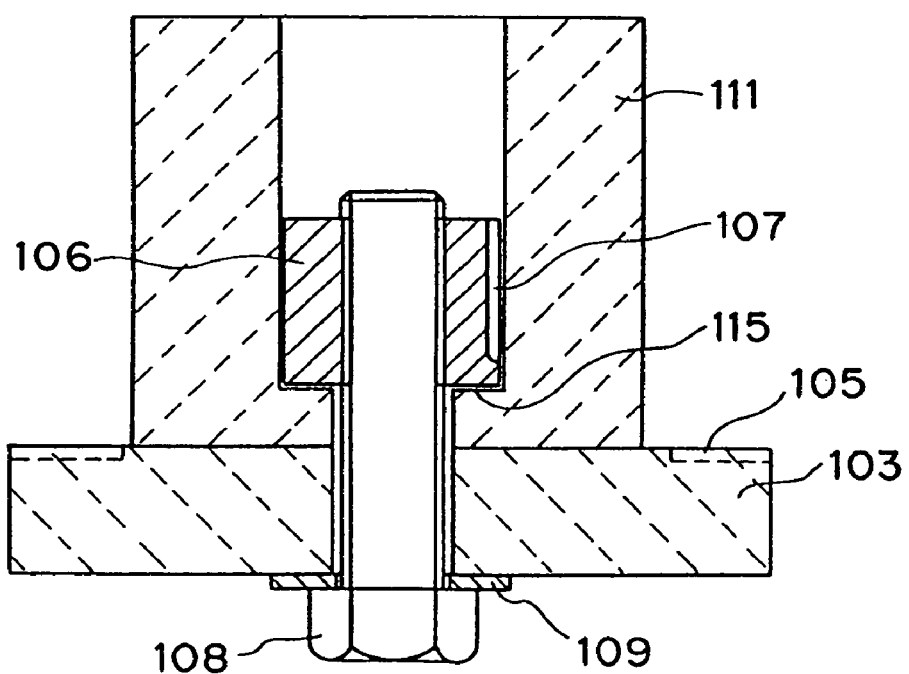
FIG. 32 is a cross sectional view of the further alternative embodiment of the hydrodynamic bearing assembly according to the present invention.

The eleventh embodiment of the hydrodynamic bearing assembly according to the present invention, which addresses improving the bearing rigidity by assuring the accuracy of the perpendicularity between the shaft and the thrust plate, will be described hereinafter, with reference to drawings. FIG. 32 illustrates the hydrodynamic bearing assembly of the embodiment. In the drawing, a shoulder portion 115 extending towards the bearing axis is formed on the inner surface of the hollow shaft 111. The other components are similar to those used for the bearing assembly of the previous tenth embodiment, and also, similar components are denoted as similar reference numerals.

The way to assemble the hydrodynamic bearing assembly of the embodiment will be described herein. The constraint member 106 is inserted from the top (the opposite end to the shoulder portion 115) into the shaft 111 until it engages with the shoulder portion 115. According to the embodiment, the groove 107 formed on the outer surface of the constraint member 106 also has the open end and the closed end, but opening upwardly rather than downwardly as the groove of the tenth embodiment. In other words, the open end extends in the opposite direction to the inserting direction. After the constraint member 106 is inserted to engage with the shoulder portion 115, the adhesive is directed from the upper end in the drawing, so that the constraint member 106 is bonded within the hollow space of the shaft 111. Then, the bolt 108 of the fastening member is put into the female screw of the constraint member 106 and fastened with thrust plate 103 intervened between the washer 109 and the shaft 111. The adhesive provided in the grooves operates as stops preventing the constraint member 106 when fastening the bolt 108.

The fastening force is applied to the shaft 111 via the shoulder portion 115 rather than via the adhesive. Thus, the groove 107 may extends through the constraint member 106 from the top to the bottom thereof to have both ends open, rather than one closed end terminating in the mid portion.

Advantageously, the hydrodynamic bearing assembly of the embodiment has a fastening strength between the shaft 111 and thrust plate 103, greater than that of the tenth embodiment because of the shoulder portion 115 intervened therebetween. Since the shoulder portion 115 is locally provided adjacent the fastening portion, fastening the bolt 108 causes no elastic deformation of the shaft 111 along the axis. Also, fastening the bolt 108 causes a negligible extent of the radial expansion of the shaft 111. Thus, the bearing assembly has no adverse impact. To this end, the hydrodynamic bearing assembly of the embodiment achieves the excellent fastening strength.

The present inventors have conducted an experiment as follows. The hydrodynamic bearing assembly was assembled as shown in FIG. 32, in which the constraint member 106 and the bolt 108 are fastened through the shoulder 115 in the hollow space by the torque of 100 kilograms centimeters. Then, the perpendicularity was shifted by 0.02 microns, which falls within the acceptable range. No radial expansion of the outer surface of the shaft 111 was observed. Also, it should be noted that the constraint member 116 may have the bolt-like configuration and the fastening member may have the nut-like configuration to replace the roles of the constraint member and the fastening member with each other.

Figure 33:
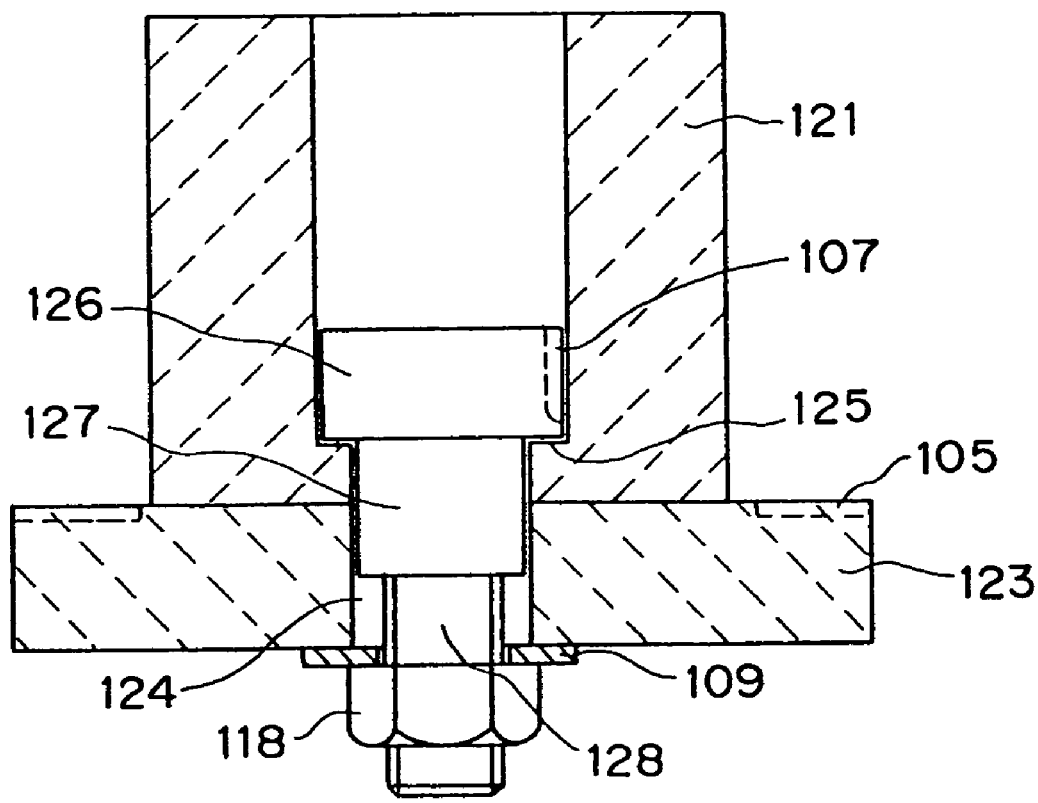
FIG. 33 is a cross sectional view of the hydrodynamic bearing assembly in FIG. 32.

FIG. 33 shows an alternative example of the hydrodynamic bearing assembly of the embodiment. In the drawing, the shaft 121 has the shoulder portion 125 on the inner surface thereof. The constraint member 116 is provided with an extension portion 127 extending through the shoulder portion 125 along the axis. The extension portion 127 protrudes beyond the bottom surface of the shaft 121 for close fitting within the through-hole 124 of the thrust plate 123. In this embodiment, the constraint member 126 and the fastening member are designed to have the bolt-like and nut-like configurations, respectively. Also, the male screw 128 extrudes from the extension portion 127 of the constraint member 126 via the through-hole 124 of the thrust plate 123, and engages with the nut 118. However, as discussed above, the constraint member 126 and the fastening member may be designed to have the nut-like and bolt-like configurations, respectively, so that roles of the constraint member and the fastening member can be replaced with each other. Similar components are denoted by similar reference numerals.

The way to assemble the hydrodynamic bearing assembly of the embodiment will be described herein. The constraint member 126 is inserted from the top (the opposite end to the shoulder portion 125) into the shaft 121 until it engages with the shoulder portion 125. The groove 107 formed on the outer surface of the constraint member 126 also has the upward open end. After the constraint member 126 is inserted to engage with the shoulder portion 125, the adhesive is directed from the upper end in the drawing, so that the constraint member 126 is bonded within the hollow space of the shaft 121. The extension portion 127 of the constraint member 126 protrudes beyond the bottom surface of the shaft 121. The outer surface of the extension portion 127 is processed with the smoothness enough for close fitting within the through-hole 124 of the thrust plate 123, so that the extension portion 127 is closely fit within the through-hole 124 of the thrust plate 123. Also, the male screw 128 extrudes from the extension portion 127 of the constraint member 126 via the through-hole 124 of the thrust plate 123, and engages with the nut of the fastening member 118 via the washer 109 for fastening the thrust plate 123 intervened therebetween.

Advantageously, the hydrodynamic bearing assembly of the embodiment has the greater fastening strength between the shaft 121 and thrust plate 123, because of the shoulder portion 125 intervened therebetween. Also, advantageously, the hydrodynamic bearing assembly assures the accuracy of the perpendicularity between the shaft 121 and the thrust plate 123. This structure provides no adverse impact on the operation of the bearing assembly as the other aforementioned embodiments do.

Twelfth Embodiment

Figure 34:
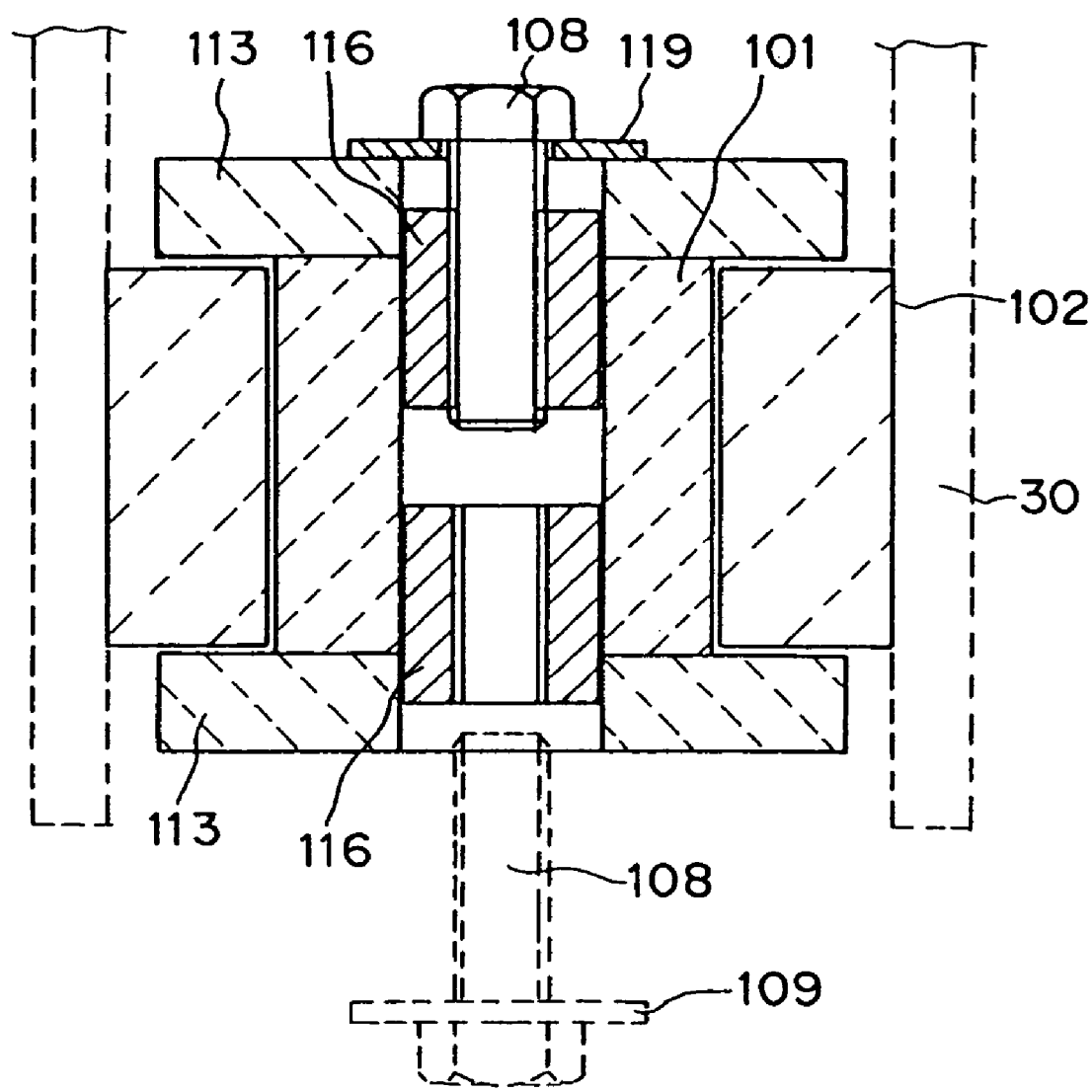
FIG. 34 is a cross sectional view of the further alternative embodiment of the hydrodynamic bearing assembly according to the present invention.

The twelfth embodiment of the hydrodynamic bearing assembly according to the present invention, which addresses improving the bearing rigidity by assuring the accuracy of the perpendicularity between the shaft and the thrust plate, will be described hereinafter, with reference to drawings. FIG. 34 illustrates the hydrodynamic bearing assembly of the embodiment. In the drawing, a pair of fastening mechanisms is provided on the top and bottom ends of the shaft.

The hydrodynamic bearing assembly of FIG. 34 is constructed by a pair of the fastening mechanism described with reference of FIG. 31, using two sets of the thrust plates 113, the constraint members 116, the bolts 108, and the washers 109. However, the present invention is not limited to the combination of the fastening mechanisms. Thus, any combinations of the fastening mechanisms, including ones according to the tenth and/or eleventh embodiments. However, if one of the fastening mechanisms has the shoulder portion 115 or 125, then the other one of the fastening mechanisms cannot structurally have the shoulder portion 115 or 125.

A sleeve 102 is rotatably arranged around the outer surface of the shaft 101. The shaft 101 is provided with a pair of thrust plates 113 on the top and bottom surfaces thereof. There are predetermined gaps between the shaft 101 and the sleeve 102 and between the thrust plates 113 and the sleeve 102. After one of the thrust plates 113 is fastened onto the shaft 101, the sleeve 102 is arranged around the shaft 101, then the another one of the thrust plate 113 is fastened onto the shaft 101. At this stage, the shaft 101 can be secured on a base as the stationary member, and the sleeve 102 can be secured with the rotor 130 indicated by the dashed lines as the rotational member. Alternatively, the shaft 101 and the sleeve may be constructed as the rotational member and the stationary member, respectively. The hydrodynamic bearing assembly constructed with use of the fastening mechanisms as described above improves the thrust rigidity. Further, the tilt rigidity can also be improved by incorporating the pump-out type thrust bearing for one of the pair of thrust bearings.

According to each embodiment described above, the shaft is secured directly on the thrust plate. However, the shaft or the sleeve may be attached to an intervening member that is secured with the thrust plate. This invention can equally be applied to any type of the attachment between the sleeve and the intervening member.

The fifth aspect according to the present invention is to improve the activation feature of the hydrodynamic bearing assembly. As described above, the relative rotation with contact at the start of rotation causes friction, heat, and energy consumption due to the increased activating torque.

Thirteenth Embodiment

Figure 35:
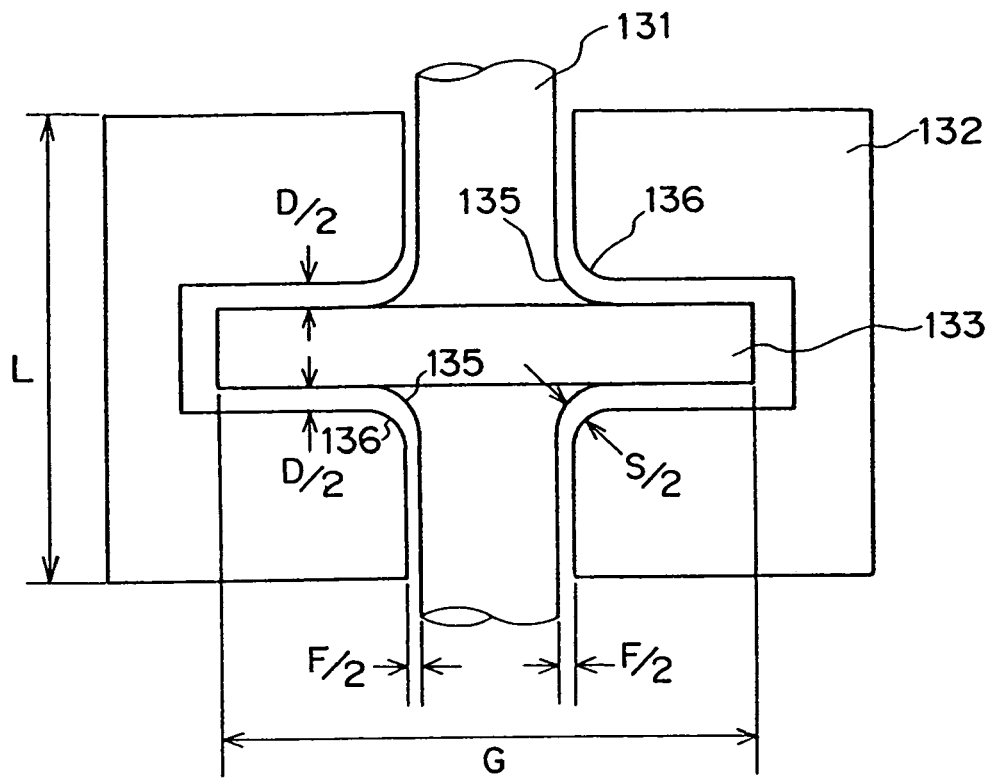
FIG. 35 is a cross sectional view of the further alternative embodiment of the hydrodynamic bearing assembly according to the present invention.

The thirteenth embodiment of the hydrodynamic bearing assembly according to the present invention, which mainly addresses improving the activation feature, will be described hereinafter, with reference to drawings. FIG. 35 is an enlarged view of the hydrodynamic bearing assembly incorporated with the spindle motor of FIG. 17. In FIG. 35, the shaft 131 is provided with the disk-shaped thrust plate 133 extending perpendicularly to the axis of the shaft 131. The sleeve 132 is arranged so as to surround the outer surface of the shaft 131 and the thrust plate 133 with predetermined gaps. A plurality of grooves for generating the dynamic pressure is formed either on the thrust plate 133 and the opposite surface of the sleeve 132 opposing to the thrust plate 133. In other words, a thrust bearing is formed between a pair of the radial bearings, in which both bearings are communicated in fluid with each other.

According to the embodiment, fillets 135 are provided adjacent to the connecting portion between the shaft 131 and the thrust plate 133. Meanwhile, the sleeve 132 is provided with curved portions 136 corresponding to the fillets 135. The fillets and the curved portions may be formed with arc configurations in the drawing, however, the present invention cannot be limited to the configuration. However, preferably, when the configuration is not arc, preferably the curve is continuous without bending points such that it causes no barrier of the fluid flow generating the dynamic pressure, and prevents the dust from covering thereon.

The drawing illustrates the shaft 131 and the sleeve 132 so that the radial gap between the shaft 131 and the sleeve 132 in both sides is the same as each other. Similarly, the drawing illustrates the sleeve 132 and the thrust plate 133 such that the thrust gap between the sleeve 132 and the thrust plate 133 in both ends is the same as each other. Thus, each of the radial gap and the thrust gap is F/2 and D/2 when the total radial gap and the total thrust gap are F and D, respectively. Also, the minimum distance from the fillet 135 to the curved portion 136 is defined as S/2 in the drawing. According to the embodiment, the minimum distance S/2, which is referred to as a fillet gap, satisfies the following conditions;

$(F/2) < (S/2) < (D/2)$, thus, $F < S < D$

Figure 36:
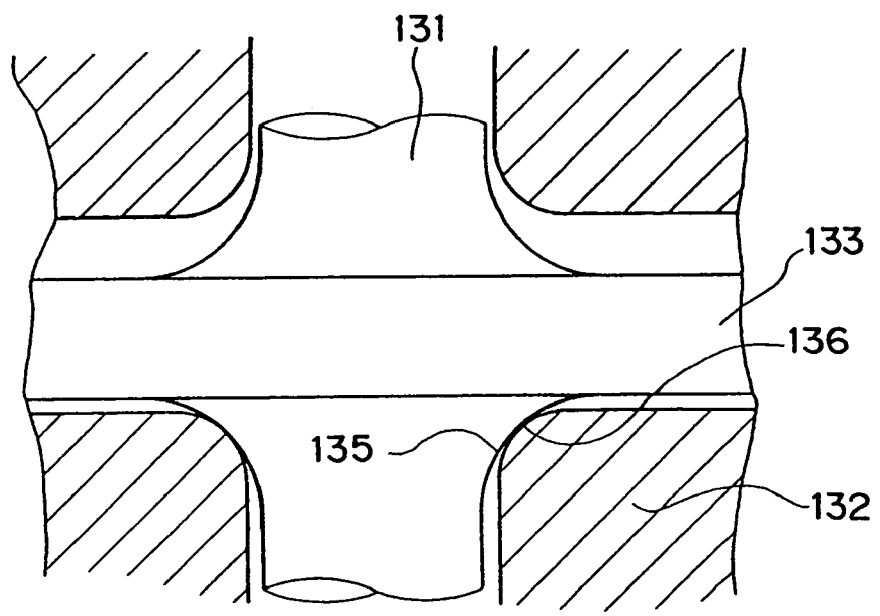
FIG. 36 is an enlarged view of the hydrodynamic bearing assembly in FIG. 35 when halted.

When starting to rotate the hydrodynamic bearing assembly, disadvantageously, the friction between the rotational member and the stationary member causes an electric power consumption and wears the thrust bearings. Preferably, the rotational member floats from the stationary member at lowest rotation rate. According to the conventional bearing assemblies, in general, the thrust plate and thrust opposing surface are in full contact with each other when halted, thus the friction force is high. However, according to the embodiment, a part of the fillet 135 contacts with a part of the curved portion 136 as illustrated in FIG. 36 when halted if the following conditions are met;

$F < S < D$

Thus, the full contact between the thrust plate and thrust opposing surface can be avoided. Since the contact point between the fillet 135 and the curved portion 136 is relatively close to the bearing axis, the arm length of the rotation moment is relatively short. Therefore, the activating rotation force can be reduced in comparison with that of the conventional bearing assemblies having the full contact between the thrust plate 133 and thrust opposite 132 surface, and the rotational member can float at the earlier stage. In other words, the less activating rotation force causes the hydrodynamic bearing assembly to be more compact and reduces the less power consumption. Further, the thrust bearing can wear less, and the disorder of the bearing assembly due to the abrasion coom can be reduced. Even further, since the fillet portion moves on the curved portion, which is smooth and continuous, the hydrodynamic bearing assembly of the embodiment cannot accumulate the dust as the conventional bearing assembly does on the edged corner.

If the fillet 135 and the curved portion 136 are too large, then the sufficient dynamic pressure cannot be obtained, thus they cannot be larger than a predetermined sizes in nature. The experiment that the present inventors has conducted revealed that, in the cross section including the bearing axis, the total curving length defined by the fillet 135 and the curved portion 136 is preferably two-third (⅔) or less of the total bearing length subtracting the total curved length, where the total bearing length is defined by the opposing surfaces between the shaft 131 and the sleeve 132 and between the sleeve 132 and the thrust plate 133 in the radial and thrust bearings, respectively.

Figure 37:
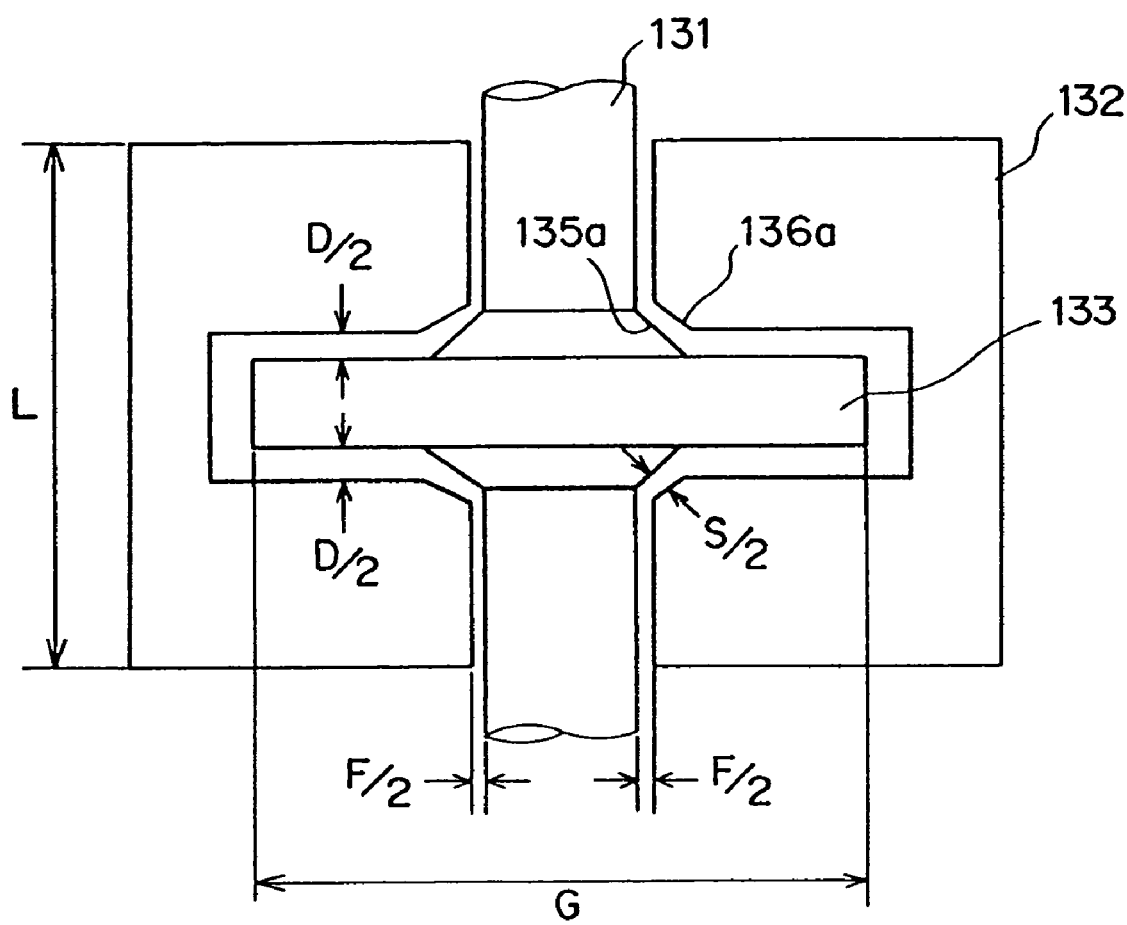
FIG. 37 is a cross sectional view of the alternative embodiment of the hydrodynamic bearing assembly in FIG. 35.

The fillet 135 and the curved portion 136 of FIG. 35 continuously connecting between the radial and thrust bearings may be in forms of corn portions 135*a* and 136*a* as illustrated in FIG. 37. In FIG. 37, the shaft 131 and the sleeve 132 are positioned so that the radial gaps between the shaft 131 and the sleeve 132 in both sides are the same as each other, and the sleeve 132 and the thrust plate 133 are positioned so that the thrust gaps between the sleeve 132 and the thrust plate 133 in both ends are the same as each other. Thus, the radial gap and the thrust gap are F/2 and D/2. Also, the minimum distance between both frustum portions is defined as S/2. According to the embodiment, the minimum distance S/2, which is referred to as a corn gap, satisfies at any points the following conditions;

(F/2)<(S/2)<(D/2), thus,

F<S<D

When the above conditions are met, both of the corn portions partially contact with each other, and since the contact point therebetween is relatively close to the bearing axis, the activating rotation force can be reduced and the rotational member can float at the earlier stage.

In FIG. 37, while the intersection of the shaft 131 and the corn portion 135*a* and the intersection of the thrust plate 135 and the corn portion 135*a* are illustrated as being edge-shaped, those intersections preferably have minor round portions to promote the fluid flow and to avoid accumulation of the dust at the intersections. Also, similar to the case of the curved portion, the total frustum length defined by the frustum portions 136*a* is preferably two-third (⅔) or less of the total bearing length subtracting the total corn length.

Figure 38:
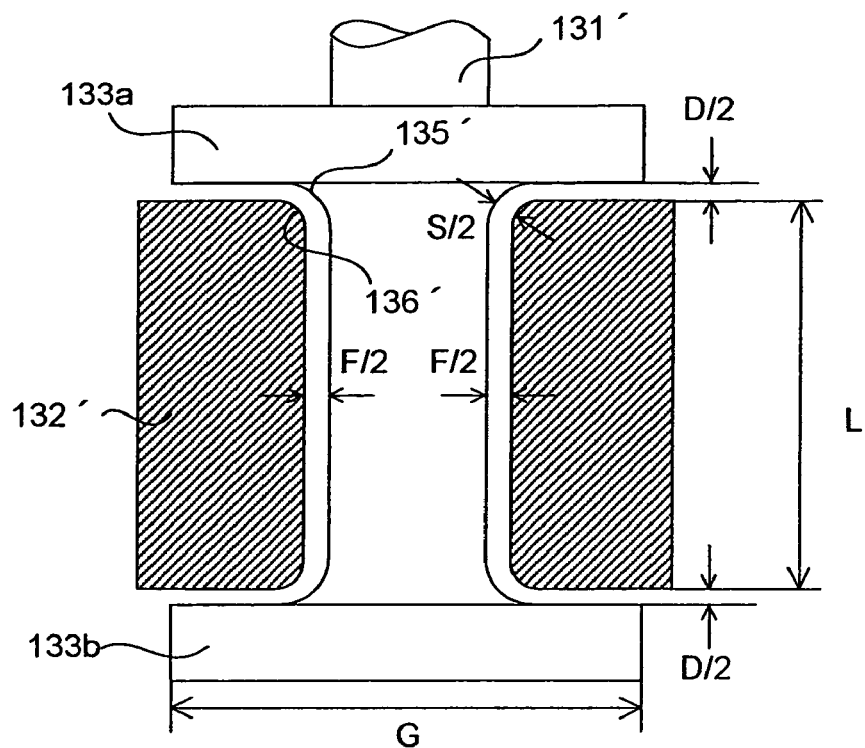
FIG. 38 is a cross sectional view of the alternative embodiment of the hydrodynamic bearing assembly in FIG. 35.

The above-mentioned features are applied to the hydrodynamic bearing assembly of FIG. 38, which comprises a pair of the thrust bearings and the radial bearing intervened therebetween. The hydrodynamic bearing assembly shown in FIG. 38 is constructed similarly to one shown in FIG. 19 except that the continuous and smooth curved portions 135' and 136' are formed at the connections of the radial bearing and the thrust bearing. Dimensions and reference numerals of the radial and thrust bearings of FIG. 38 are similar to those of FIG. 37. The gaps at the connections, each of which defines a conduit of the fluid flow, have the minimum distance between the both sides (S/2). The activation feature can be improved if the following conditions for (S/2) at any points are met;

(F/2)<(S/2)<(D/2), thus,

F<S<D

As described above, the curved portions may be in form of the corn portions.

Figure 39:
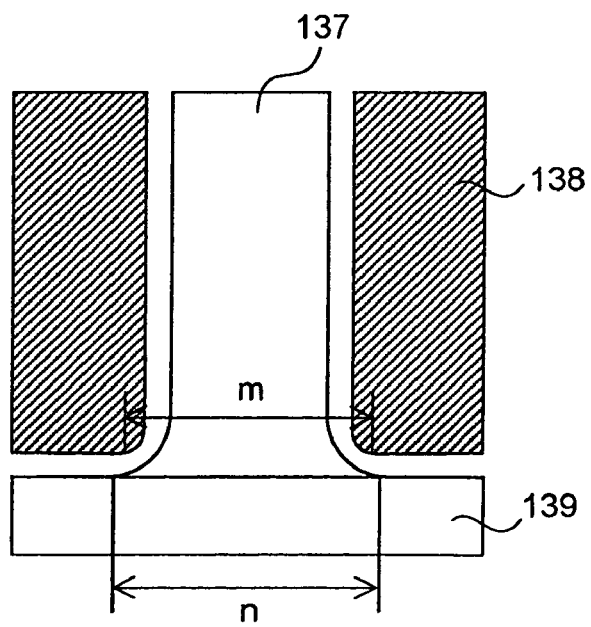
FIG. 39 is a cross sectional view of the alternative embodiment of the hydrodynamic bearing assembly in FIG. 35.

FIG. 39 illustrates the hydrodynamic bearing assembly with a general structure, which includes the radial bearing and only one thrust bearing formed at one end along the axis. The hydrodynamic bearing assembly comprises a column shaft 137 having the outer surface parallel to the axis, a hollow cylindrical sleeve 138 arranged around the outer surface of the shaft 137, a disk-shaped thrust plate 139 perpendicularly secured onto the shaft 137. In the general hydrodynamic bearing assemblies including such complex hydrodynamic bearing assembly, when the rotation is halted, preferably, the full contact between the thrust plate 139 and thrust opposing surface of the sleeve 138 is preferably avoided and they contact at only at limited portion adjacent to the axis, so that the activation feature is improved. In order to realize this, the corner portion of the sleeve 138 and the root portion connecting the shaft 137 and the thrust plate 139 at the intersections of the thrust bearing and the radial bearing in FIG. 39, have the continuous and smooth curved portions. When the rotation is halted, both of the curved portions contact with each other. A first and second distances m and n can be defined between two ascending positions of the curve portion of the sleeve 138 and the thrust plate 139, respectively. As describes above, the activation feature is improved, if the following condition is met;

m<n

If the other type of the hydrodynamic bearing assemblies such as ones illustrated in FIGS. 35, 37, and 38 satisfy the above condition, then they also improve their activation features.

Although the configuration of each curved portion is not necessarily in a form of the arc, preferably, it has no bending point at least, and it has a continuous curve or frustum portion for smoothly connecting the straight shaft and the thrust plate. The curve or frustum portion advantageously is likely to prevent accumulation of the dust at the intersection of thrust and radial bearings. Similar to the embodiments described above, the total curve or frustum length defined by the curve or frustum portions is preferably two-third (⅔) or less of the total bearing length subtracting the total corn or frustum length.

The present inventors have conducted an experiment as follows. The hydrodynamic bearing assembly shown in FIG. 35 was prepared including the thrust gap of 5 microns and the radial gap of 1 micron, also including the corner portion only of the sleeve 132 chamfered with the radius of 1 millimeter. Although no contacting noise of the bearing assembly was observed when the oscillation force by hand was applied to the shaft, the dust was accumulated at the root portion defined between the shaft 131 and the thrust plate 133. This revealed that the condition of S>D, wherein S and D are illustrated in FIGS. 35 and 37, disadvantageously causes the dust accumulation.

Meanwhile, another hydrodynamic bearing assembly was prepared similarly to the above except that it includes the root portion chamfered with the radius of 1 millimeter and the corner portion of the sleeve 132 with the perpendicular edge. Then, the oscillation force by hand was applied to the shaft, the contacting noise of the bearing assembly was heard. This revealed that the condition of F>S, wherein F and S are illustrated in FIGS. 35 and 37, disadvantageously causes the contact of the thrust bearing. In the embodiment, the shaft is described as the rotational member, the present invention can be applied to the bearing assembly with the stationary shaft.

Fourteenth Embodiment

Figure 42:
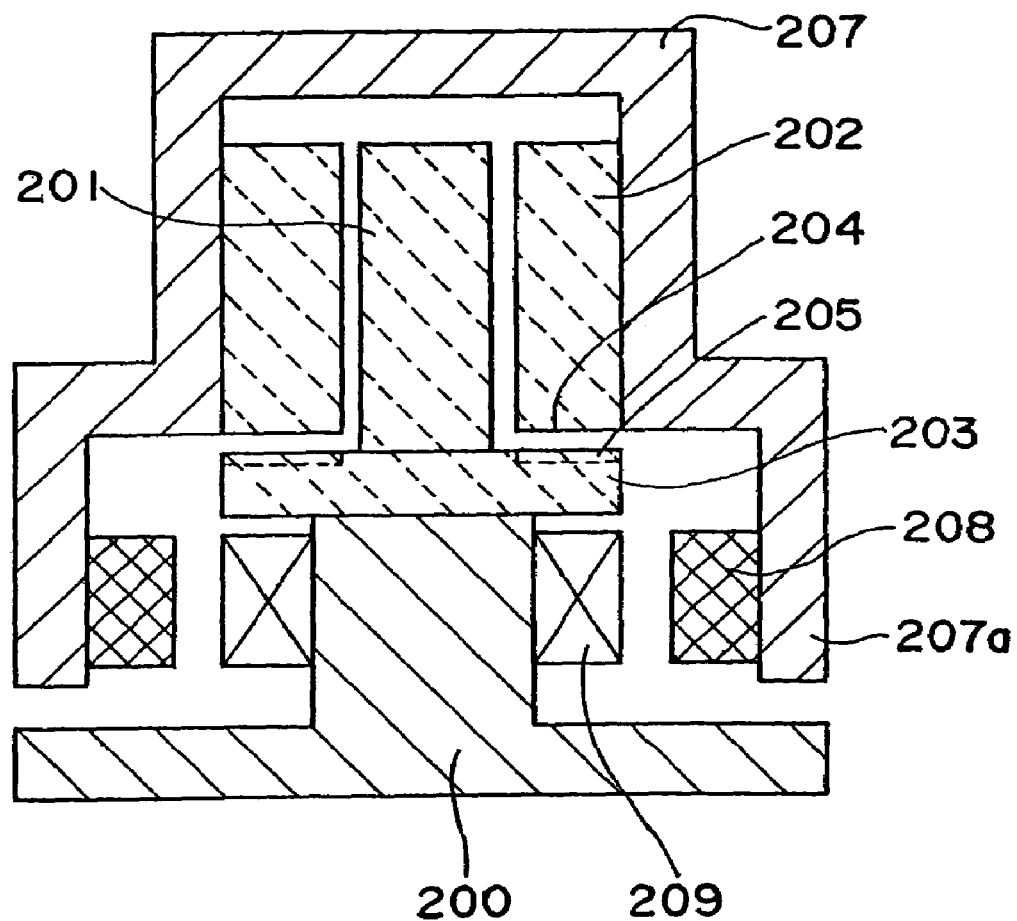
FIG. 42 is a cross sectional view of the conventional spindle motor.
Figure 43:
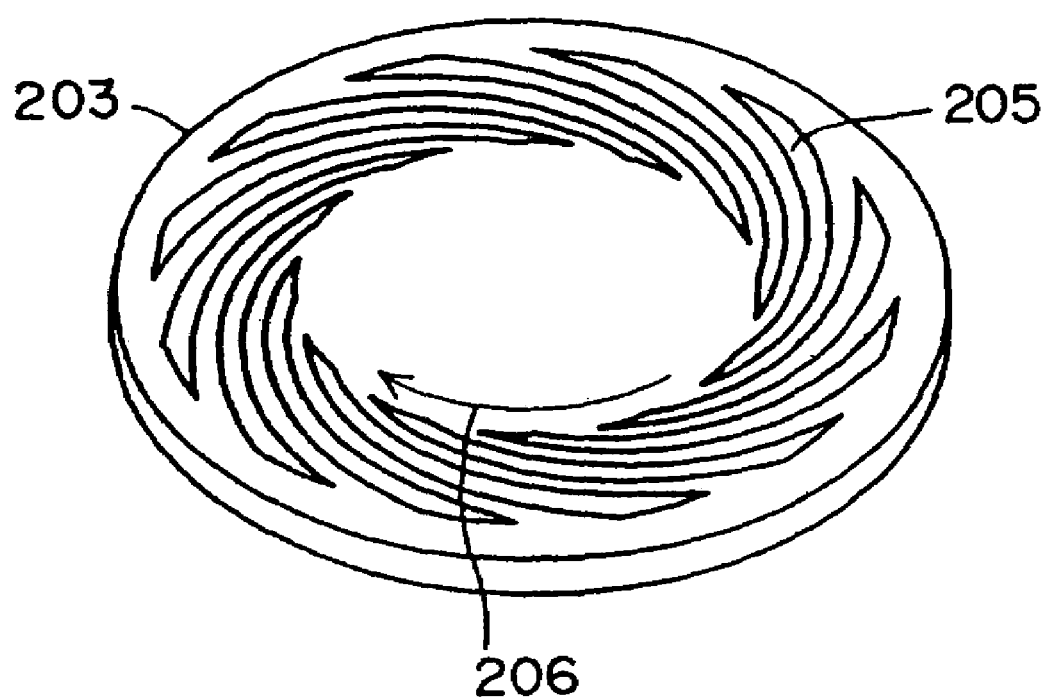
FIG. 43 is a perspective view of the thrust plate used for the hydrodynamic bearing assembly in FIG. 42.

The fourteenth embodiment of the hydrodynamic bearing assembly according to the present invention, which addresses improving the activation feature, will be described hereinafter, with reference to drawings. As can be seen from the drawing of the conventional hydrodynamic bearing assembly such as FIG. 42, the spindle motor has no stop preventing the rotational member from pulling off upwardly or stationary member from coming out downwardly. Therefore, in case where no means for preventing the pull-off is provided, the rotational member may be pulled off during the rotation. Also, in order to narrow the thrust gap between the thrust plate and the thrust opposing surface thereby increasing the dynamic pressure in the thrust bearing, preferably the thrust opposing surface is biased downwardly to the thrust plate during the rotation.

Figure 40:
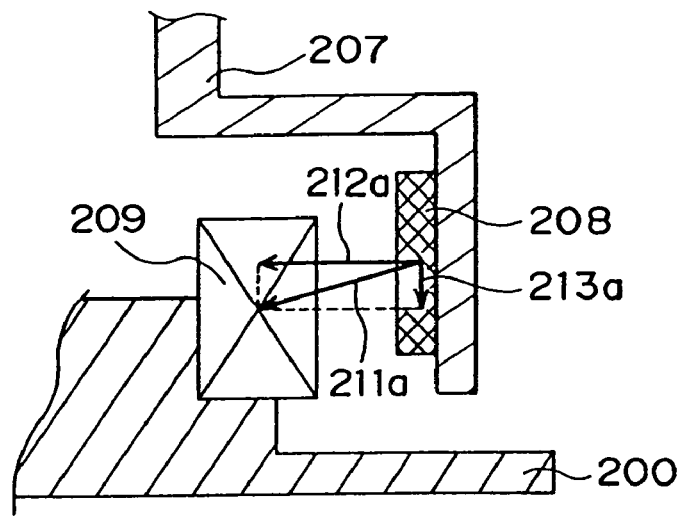
FIGS. 40(a) to 40(c) are cross sectional views of the spindle motor according to the present invention, illustrating the rotor magnet and the electromagnet.
Figure 40:
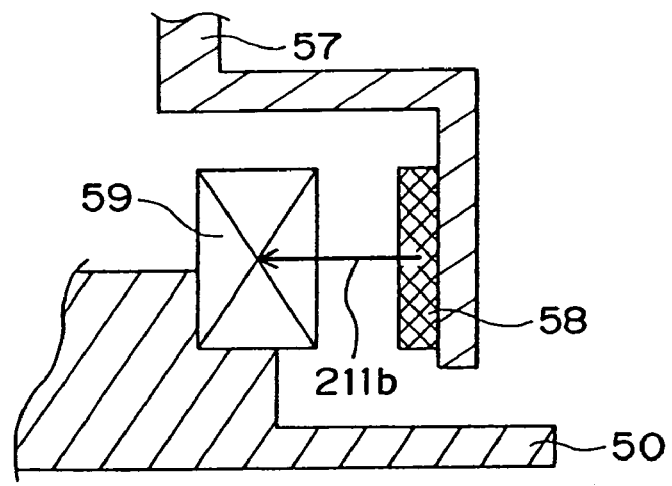
Figure 40:
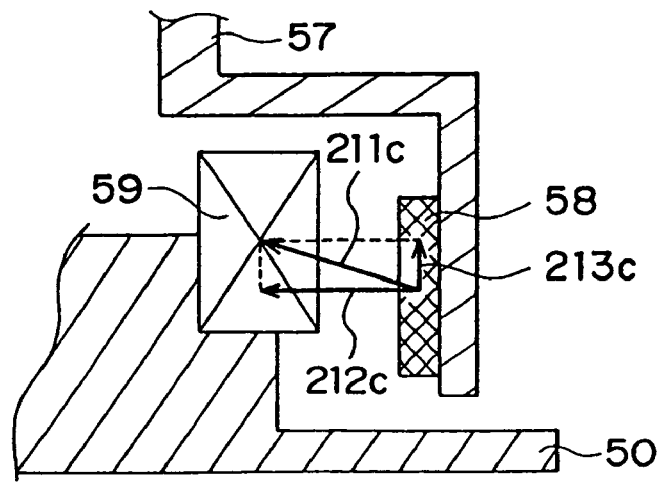

According to the prior arts, the rotor magnet is designed to have a center offset to that of the electromagnet as illustrated in FIG. 40(*a*), in order to prevent the pull-off and for narrow the thrust gap in the thrust bearing. FIG. 40(*a*) is an enlarged view of the rotor magnet 208 attached on the rotor 207 of the spindle motor shown in FIG. 42 and the electromagnet 209 secured on the base plate 200 opposing to the rotor magnet 208. In FIG. 40(*a*), the electromagnet 209 includes the core so that the attraction force is generated between the rotor magnet 208 and the electromagnet 209. According to the prior arts, the rotor magnet 208 is offset against the electromagnet 209 to generate the attraction force in the direction indicated by the arrow 211a, which has the horizontal component 212a and the vertical component 213a. The vertical component 213a directing downwardly biases the rotational member of the spindle motor such as rotor 207 to the stationary member. The downward bias prevents the rotational member from pulling off and keeps the thrust gap narrow for increasing the thrust dynamic pressure in the thrust bearing.

Meanwhile, in case where the rotor magnet is designed to have a center offset to that of the electromagnet, since the horizontal component 212a of the attraction force between the rotor magnet 208 and the electromagnet 209 is the force for driving the spindle motor, the driving force is not greater than the attraction force between the rotor magnet 208 and the electromagnet 209. This requires the larger volume of the rotor magnet 208 and the electromagnet 209 for the stronger attraction force. This eventually causes the whole dimension and weight of the spindle motor to be greater and heavier. To be even worse, the vertical component 213a always biases downwardly to increase the weight of the rotational member, thus to require higher rotation rate for floating the rotational member when the spindle motor is activated.

Contrary to this, since the hydrodynamic bearing assembly used for the spindle motor according to the present invention as illustrated in FIG. 23 are sandwiched by a pair of the thrust bearing, the rotational member cannot be pulled off. Further, the thrust bearings provided on the both ends in the axis direction require no external biasing force, and the hydrodynamic bearing assembly itself always keeps the gaps appropriately. Therefore, no particular means is required, for example, for offsetting the center of the electromagnet 209 relative to that of the rotor magnet 108, as shown in FIG. 40(*a*).

FIG. 40(*b*) is an enlarged view of a part of the spindle motor of the embodiment, illustrating the rotor magnet 58 attached on the rotor 57 shown in FIG. 23 and the electromagnet 59 secured on the base 50 opposing to the rotor magnet 58. The center of the rotor magnet 58 is aligned to that of the electromagnet 59 so that the attraction force can fully be utilized as the driving force. Thus, the activation feature is improved by effectively utilizing the attraction force between the rotor magnet 58 and the electromagnet 59. In addition, no vertical component of the attraction force biases the rotational member downwardly, the friction force is reduced in the thrust bearing defined by the thrust plate 53a and thrust opposing surface 54a as shown in FIG. 23. This prevents the seizure therebetween and improves the endurance of the spindle motor.

FIG. 40(*c*) is an enlarged view of a part of the spindle motor of the embodiment, illustrating the rotor magnet 58 having the center offset in the direction reverse to one of the prior arts. In the embodiment of the hydrodynamic bearing assembly according to the present invention as illustrated in FIG. 23, because the rotational member cannot be pulled off, such offsetting can be implemented. This cause the attraction force in the direction indicated by the arrow 211, which has the horizontal component 212c and the vertical component 213c. The vertical component 213c directing upwardly supports the rotational member such as the rotor magnet 58 and the rotor 57. Foe example, the distance between the rotor magnet 58 and the electromagnet 59 is 5 millimeters and the center offset is about 0.5 millimeters, then the weight of the rotational member appears to be reduced by approximately 1 to 5 newtons. The weight reduction effects the rotational member to readily float when the spindle motor is activated, so that the floating rotation rate is reduced. Thus, the friction force between the thrust plate 53a and thrust opposing surface 54a in the thrust bearing of FIG. 23 is advantageously further reduced.

The sixth aspect according to the present invention relates to the hydrodynamic bearing assembly having the reduced volume and weight, in particular, relates to using ceramics as the material for the various components of the hydrodynamic bearing assembly. The ceramics is good at the anti-abrasion, the endurance, and the rigidity, and also the weigh thereof is light.

Fifteenth Embodiment

Figure 41:
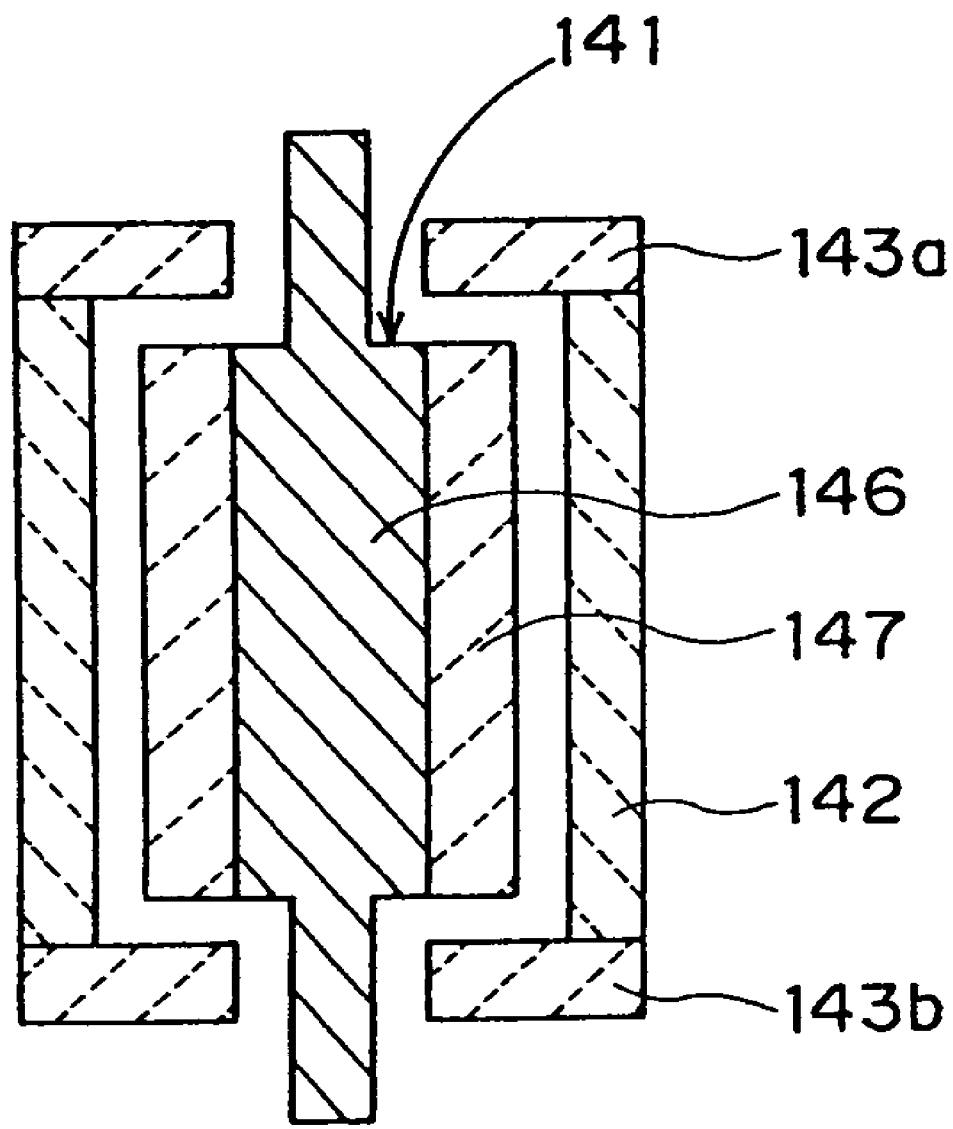
FIG. 41 is a cross sectional view of the alternative embodiment of the hydrodynamic bearing assembly according to the present invention.

The fifteenth embodiment of the hydrodynamic bearing assembly according to the present invention, which addresses reducing the volume and weight, will be described hereinafter, with reference to drawings. FIG. 41 is an enlarged view of the hydrodynamic bearing assembly incorporated with the spindle motor of FIG. 23. In FIG. 41, the hydrodynamic bearing assembly comprises a shaft 141, a sleeve 142 rotatably arranged surrounding the outer surface of the shaft 141, a first and second donut-like thrust plates 143a and 143b secured on each end of the sleeve 142. Either one of the first and second thrust plates 143a and 143b has the pump-out type thrust grooves for generating the thrust dynamic pressure, and the other one of them has either one of the pump-out type and the pump-in type thrust grooves.

It should be noted that the thrust grooves may be formed on the thrust opposing surfaces of the sleeve.

The shaft 141 of the embodiment includes a stepped core member 146 and a hollow cylindrical outer member 147, because of the process condition of the ceramics. The core member and the outer member 147, which are made of metal such as stainless and ceramics, respectively, are close fit to each other by shrink fitting, cooling fitting or bonding with the adhesive. The sleeve 142 and both thrust plates 143a and 143b may integrally be formed of ceramics, and preferably so it is. Portions relatively rotating in the radial and thrust bearings, at least, may be made of ceramics and other portions may be made of other materials such as metal. Ceramics materials which may be used for the portions are, for example, alumina, zirconia, silicon carbide, silicon nitride, sialon, and so on.

For example, an alumina-based ceramics has the Young's modulus within the range of approximately 300 to 400 giga-Pascals, which is about double to the steel, and the specific gravity of 3.9 which is about half of the steel. Thus, briefly speaking, the alumina-based ceramics provides the rigidity (rigidity) double with half mass in comparison with steel, in addition, shows the good anti-abrasion. If the bearing assembly is made of ceramics, it can reduce its volume and weight and can improve its anti-abrasion and endurance in comparison with stainless steel, for example. In the hydrodynamic bearing assembly, since the rotational member contacts with the stationary member when halted and then starts rotating, the friction and the seizure may be caused between the members. Making those members of ceramics showing the good anti-abrasion readily avoids such problems. The hydrodynamic bearing assembly used for the spindle motor incorporated in the HDD is required to be formed and assembled with high accuracy. Ceramics materials are less susceptible to the plastic deformation and the elastic deformation than metal materials. Thus, usage of the ceramics materials reduces the deformations in processing so as to provide a precise hydrodynamic bearing assembly.

Although this embodiment is described with reference to the hydrodynamic bearing assembly of FIG. 41, the present invention is not limited to this embodiment, rather applicable to any type of the hydrodynamic bearing assemblies, for example, as illustrated in FIGS. 17, 20, and 34. Also, each of opposing surfaces of the hydrodynamic bearing assembly is preferably made of ceramics materials, however, some of them may be formed of ceramics materials.

Sixteenth Embodiment

Each embodiment of the hydrodynamic bearing assemblies according to the present invention is described above in detail. The sixteenth embodiment according to the present invention relates to a spindle motor, and a memory device and bar code reader incorporating the spindle motor. As above, usage of the hydrodynamic bearing assemblies according to the present invention provides the spindle motor realizing the rotation at high rate and heavy load in a stable manner, and the good endurance against the external motion. Further, usage of the spindle motor provides the memory equipment and the bar code reader realizing the rotation at high rate and heavy load in a stable and reliable manner.

ADVANTAGES OF THE INVENTION

In the first embodiment of the hydrodynamic bearing assembly according to the present invention, the half-whirl can effectively be eliminated without reducing the radial dynamic pressure. This eliminates the possibility of the contact between the rotational member and the stationary member due to the reduction of the translation rigidity so that the hydrodynamic bearing assembly realizing the stable rotation without the half-whirl can be provided.

In the second embodiment of the hydrodynamic bearing assembly according to the present invention, an usage of the high dynamic pressure mainly generated in the radial bearing prevents the contact between the rotational member and the stationary member due to the external motion so that the robust hydrodynamic bearing assembly supporting itself against the external motions can be provided.

In the third embodiment of the hydrodynamic bearing assembly according to the present invention, a peak of the dynamic pressure can be formed at the circumference of the thrust bearing so that the robust hydrodynamic bearing assembly supporting itself against the external motions can be provided.

In the fourth embodiment of the hydrodynamic bearing assembly according to the present invention, the shaft and thrust plate can be secured to each other with a precise perpendicularity so that the bearing rigidity is improved and the undesired contact between members especially in the thrust bearing can be avoided.

In the fifth embodiment of the hydrodynamic bearing assembly according to the present invention, the activation torque at the beginning of the activation can be reduced, or the activation force can effectively be used fo the rotation so that the floating rotation rate can quickly be obtained. This contributes the endurance and the low energy consumption of the hydrodynamic bearing assembly.

In the sixth embodiment of the hydrodynamic bearing assembly according to the present invention, usage of the ceramics material can provide the compact and lightweight hydrodynamic bearing assembly, which has high endurance and the precise dimensions.

In the sixth embodiment of the hydrodynamic bearing assembly according to the present invention, a reliable spindle motor, a memory device, and bar code reader can be provided, which operates at high rotation rate in a stable manner and includes the robust bearing rigidity and the improved activation features.

The invention claimed is:

1. A hydrodynamic bearing assembly, comprising:
   a radial bearing including a column shaft having an outer surface parallel to a longitudinal axis of said shaft, and a hollow cylindrical sleeve having an inner surface rotatably arranged around the outer surface of said shaft, said radial bearing for generating a radial dynamic pressure due to a relative rotation between said sleeve and said shaft; and
   a thrust bearing including a thrust plate formed or secured onto either one of said shaft and said sleeve, and a thrust opposing surface formed or secured onto the other one of said shaft and said sleeve, said thrust bearing for generating a thrust dynamic pressure due to the relative rotation between said thrust plate and said thrust opposing surface;
   wherein said thrust bearing is a pump-out type, and conducts the fluid in the thrust bearing in the direction from the axis to circumference,
   wherein at least one longitudinal groove is formed on either one of the outer surface of said shaft and the inner surface of said sleeve, the longitudinal groove extending parallel or inclined to the axis between both ends along the axis, and wherein the at least one longitudinal groove has a depth ratio defined by a depth of the groove to a diameter of said shaft is within the range from approximately 0.0001 to not more than 0.0001.

2. The hydrodynamic bearing assembly according to claim 1,
wherein the at least one longitudinal groove is formed on the outer surface of said shaft and is interrupted in the mid portion of said shaft.

3. The hydrodynamic bearing assembly according to claim 2, further comprising:
at least one uninterrupted longitudinal groove is formed on the outer surface of said shaft, and extends uninterrupted through the mid portion of the shaft.

4. The hydrodynamic bearing assembly according to claim 1, wherein the at least one longitudinal groove is formed on the inner surface of said sleeve, and the at least one longitudinal groove is interrupted in the mid portion of said sleeve.

5. The hydrodynamic bearing assembly according to claim 4, further comprising:
at least one uninterrupted longitudinal groove is formed on the inner surface of said sleeve, and extends uninterrupted through the mid portion of said sleeve.

6. A hydrodynamic bearing assembly, comprising:
a radial bearing including a column shaft having an outer surface parallel to a longitudinal axis of said shaft, and a hollow cylindrical sleeve having an inner surface rotatably arranged around the outer surface of said shaft, said radial bearing for generating a radial dynamic pressure due to a relative rotation between said sleeve and said shaft; and
wherein at least one longitudinal groove is formed on the outer surface of said shaft, the at least one longitudinal groove extending parallel or inclined to the axis between both ends along the axis, and
wherein the at least one longitudinal groove has a depth ratio defined by a depth of the groove to a diameter of said shaft is within the range from approximately 0.0001 to not more than 0.001.

7. The hydrodynamic bearing assembly of claim 6, further comprising:
at least one uninterrupted longitudinal groove is formed on the outer surface of said shaft, and extends uninterrupted through the mid portion of said shaft.

8. A hydrodynamic bearing assembly, comprising:
a radial bearing including a column shaft having an outer surface parallel to a longitudinal axis of said shaft, and a hollow cylindrical sleeve having an inner surface rotatably arranged around the outer surface of said shaft, said radial bearing for generating a radial dynamic pressure due to a relative rotation between said sleeve and said shaft; and
wherein at least one longitudinal groove is formed on the inner surface of said sleeve, the at least one longitudinal groove extending parallel or inclined to the axis between both ends along the axis, and
wherein the at least one longitudinal groove has a depth ratio defined by a depth of the groove to a diameter of said shaft is within the range from approximately 0.0001 to not more than 0.001.

9. The hydrodynamic bearing assembly of claim 8, further comprising:
at least uninterrupted longitudinal groove is formed on the inner surface of said sleeve, and extends uninterrupted through the mid portion of said sleeve.

* * * * *